(12) United States Patent
Yokoi

(10) Patent No.: US 6,771,577 B2
(45) Date of Patent: Aug. 3, 2004

(54) INFORMATION RECORDING APPARATUS AND METHOD

(75) Inventor: Kenya Yokoi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 126 days.

(21) Appl. No.: 10/244,732

(22) Filed: Sep. 17, 2002

(65) Prior Publication Data

US 2003/0090981 A1 May 15, 2003

Related U.S. Application Data

(63) Continuation-in-part of application No. 09/655,912, filed on Sep. 5, 2000, now Pat. No. 6,459,666.

(30) Foreign Application Priority Data

| Sep. 6, 1999 | (JP) | ............................................ | 11-251060 |
| Oct. 14, 1999 | (JP) | ............................................ | 11-291864 |
| Oct. 14, 1999 | (JP) | ............................................ | 11-292111 |
| Feb. 24, 2000 | (JP) | ........................................ | 2000-047207 |
| Apr. 12, 2000 | (JP) | ........................................ | 2000-110401 |

(51) Int. Cl.$^7$ ............................................... G11B 7/00
(52) U.S. Cl. ................................ 369/59.11; 369/59.12; 369/47.5; 369/116; 369/53.1
(58) Field of Search ............................ 369/47.1, 47.28, 369/47.48, 47.5, 47.51, 47.52, 53.1, 53.11, 53.34, 59.1, 59.11, 59.12, 59.25, 116

(56) References Cited

U.S. PATENT DOCUMENTS

| 5,561,642 | A | * | 10/1996 | Saito et al. .................. 369/116 |
| 5,608,710 | A | * | 3/1997 | Minemura et al. ........ 369/47.51 |
| 5,732,062 | A | | 3/1998 | Yokoi et al. |
| 5,761,172 | A | * | 6/1998 | Minemura et al. ........ 369/59.18 |
| 5,790,482 | A | | 8/1998 | Saga et al. |
| 5,923,625 | A | | 7/1999 | Shimazaki et al. |
| 6,418,102 | B1 | | 7/2002 | Suga |

FOREIGN PATENT DOCUMENTS

| JP | 05-225570 | 9/1993 |
| JP | 05-274678 | 10/1993 |
| JP | 10-106008 | 4/1998 |

* cited by examiner

Primary Examiner—Muhammad Edun
(74) Attorney, Agent, or Firm—Dickstein Shapiro Morin & Oshinsky LLP

(57) ABSTRACT

An information recording method records information on an optical disk by a recording pulse signal of an optical beam that is emitted from an optical source. A recording channel clock period T is changed depending on a change of a recording linear velocity so that a recording linear density is maintained approximately constant. In addition, a shape of a pulse waveform of a top heating portion of the recording pulse signal which includes a rear heating portion, is changed at predetermined intervals depending on a desired recording linear velocity, so that a width of the top heating portion and a recording power thereof are changed.

24 Claims, 30 Drawing Sheets

FIG. 1A  FORMAT  
FIG. 1B  NUMBER OF REVOLUTIONS  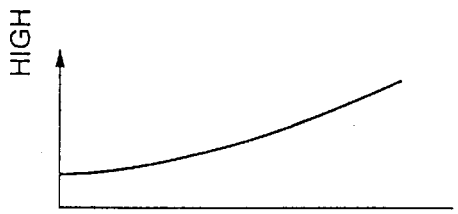
FIG. 1C  CHANNEL CLOCK FREQUENCY  
FIG. 1D  LINE DENSITY  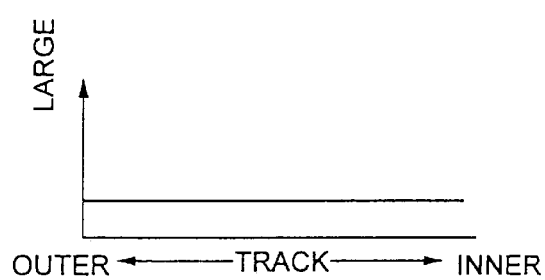

FIG.2A   FORMAT
FIG.2B   NUMBER OF REVOLUTIONS
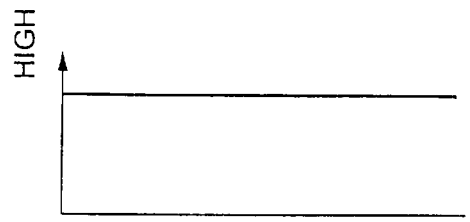
FIG.2C   CHANNEL CLOCK FREQUENCY
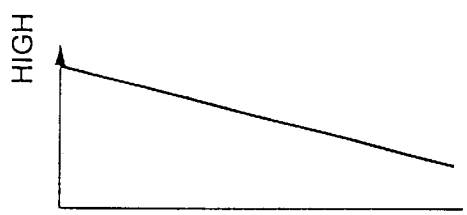
FIG.2D   LINE DENSITY
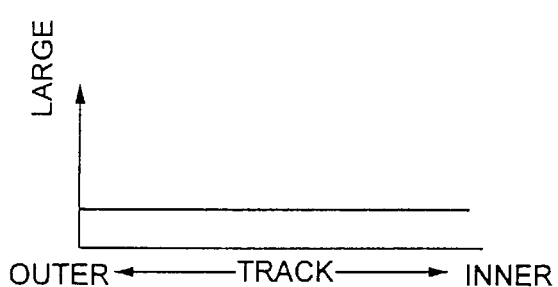
OUTER ←——TRACK——→ INNER

INNERMOST CIRCUMFERENCE
OUTERMOST CIRCUMFERENCE

INNERMOST CIRCUMFERENCE
OUTERMOST CIRCUMFERENCE

INNERMOST CIRCUMFERENCE

OUTERMOST CIRCUMFERENCE

INNERMOST CIRCUMFERENCE

OUTERMOST CIRCUMFERENCE

INNERMOST CIRCUMFERENCE POSITION

OUTERMOST CIRCUMFERENCE POSITION

INFORMATION RECORDING APPARATUS AND METHOD

This application is a Continuation-In-Part Application of a U.S. patent application Ser. No. 09/655,912 filed Sep. 5, 2000 U.S. Pat. No. 6,459,666.

BACKGROUND OF THE INVENTION

This application claims the benefit of Japanese Patent Applications No.11-251060 filed Sep. 6, 1999, No.11-291864 filed Oct. 14, 1999, No.11-292111 filed Oct. 14, 1999, No.2000-047207 filed Feb. 24, 2000 and No.2000-110401 filed Apr. 12, 2000, the disclosures of which are hereby incorporated by reference.

1. Field of the Invention

The present invention generally relates to information recording apparatuses and methods, and information processing apparatuses using such an apparatus or method. More particularly, the present invention is concerned with an information recording apparatus and method for an optical disk medium such as a DVD-R (Digital Video or Versatile Disk-Recordable) or a DVD-RW (DVD-ReWritable), these disks having a format compatibility with reproduction-dedicated DVD media such as a video DVD and a DVD-ROM.

2. Description of the Related Art

With the spread of multimedia, there has been considerable activity in the development of reproduction-dedicated media such as a video DVD and a DVD-ROM, and information recording media such as a DVD R and a DVD RW. The DVD-R utilizes a dye or coloring matter to form a recording layer. The DVD-RW utilizes a phase-change material in which a crystal phase and an amorphous phase are changed reversibly.

Information is recorded on a DVD as described above by a recording method as shown in FIGS. 1A through 1D, in which the horizontal axes represent the radial position on the DVD. FIG. 1A schematically shows a format of the DVD. As shown in FIG. 1D, data (sectors) are successively recorded on all tracks at a constant liner density.

In order to provide information recording media that have a format compatibility with the reproduction-dedicated media, the rotational velocity of the media is controlled by a CLV (Constant Linear Velocity) method in which the number of revolutions of the DVD is inversely proportional to the track radius as shown In FIG. 1B. Thus, as shown in FIG. 1C, information is recorded on the DVD at a constant channel clock frequency for recording while the linear velocity of the tracks is kept constant irrespective of the track position.

In order to control the rotational velocity by the CLV control, it is required to change the number of revolutions of the DVD in order to maintain the linear velocity of the tracks at a constant. More particularly, it is required to change the number of revolutions of a spindle motor which drives the DVD. Thus, the spindle motor requires a large revolution torque. Such a spindle motor is of a large size and is expensive. Additionally, it takes a long time to complete a change of the velocity of the spindle motor in seek operation. This leads to an extremely long access time, as compared to an HDD and an MO drive.

Under the above-mentioned circumstances, it is desired to record information on the media while keeping the number of revolutions thereof at a constant. With the above in mind, a recording method shown in FIGS. 2A through 2D has been proposed. As shown in FIG. 2C, the frequency of the channel clock for recording is changed in such a way as to be proportional to the track position in the radial direction. More particularly, the frequency proportionally increases as the track position moves from the inner circumference to the outer circumference. In this case, the recording linear velocity is comparatively low in the inner portion and is comparatively high in the outer portion. Thus, as shown in FIG. 2D, the recording linear density can be kept constant. Information can be recorded on the DVD by a CAV (Constant Angular Velocity) control in which the number of revolutions (rotational velocity) of the DVD is fixed, as shown in FIG. 2B.

Consequently, there is no need to perform the revolution changing control of the spindle motor, so that a compact, less-expensive spindle motor with a small revolution torque can be employed. Further, there is no need for the time necessary for completing a change of the rotational speed, so that the access time can be drastically reduced.

However, a specific attention should be drawn to the dye-based DVD-R media and DVD-RW media of phase-change type in which a pit (mark) is formed thereon in a heat mode. In these media, the pulse widths of a train of recording pulses of a laser beam at the time of recording and a recording power are respectively optimized at a particular recording linear velocity. Thus, for a different recording linear velocity, the mark formed by the pulse train and a space sandwiched by adjacent marks have different states. For example, a top heating pulse necessary for forming a mark may not have a sufficient thermal capacity, and the temperature obtained by heating thereof is different from the optimal decomposition temperature. As a result of the above, the average length of the marks may be dispersed and the pulse width of the tail pulse of the pulse train may deviate from the optimal pulse width so that the even mark width cannot be obtained. There is also a possibility that the mark may have a relatively wide or narrow width (a tear-like mark may be formed) depending on the mark length. The above-mentioned facts degrade the jitter characteristic.

With regard to the above-mentioned problems, a Japanese Laid-Open Patent Application No. 5-225570 proposes an improved method for obtaining the optimal amount of light for recording. The proposed method is particularly intended to obtain the optimal amount of light for recording that can be applied to all recordable areas of individual disks with a reduced time. More particularly, the optimal amounts of light for recording are obtained in at least two positions in a test writing area on the optical disk by using recording linear velocities equal to those at positions in the user recording section. The test writing area is located in one or both of the innermost and outermost circumference positions. Then, an interpolation routine is performed in which the two optimal amounts of light for the two recording linear velocities are subjected to an interpolation or extrapolation process. Thus, the optimal amounts of light for recording at all recording linear velocities can be obtained.

There is another proposal disclosed in a Japanese Laid-Open Patent Application No. 5-274678. The proposal is directed to reducing laser power necessary for recording without degrading the jitter characteristic. More particularly, the proposal projects, onto the optical disk, an optical beam that is intensity-modulated in accordance with information in synchronism with different reference clocks that depend on areas for recording while the optical disk is rotated at a constant velocity. Thus, information can be recorded on an outer-circumference area at a frequency higher than that at which information is recorded on an inner-circumference area. The optical beam is periodically emitted in a pulse formation at a frequency equal to an integer multiple of the frequency of the reference clock involved in the area on which information should be recorded. In addition, the duty ratio involved in pulse emission is larger in the outer-circumference portion than that in the inner-circumference portion.

Yet another proposed method is described in a Japanese Laid-Open Patent Application No. 10-106008. The application discloses an optical disk drive capable of recording information at an increased rate with high reliability, the drive being equipped with an optical disk, an optical head, synchronizing signal generating means, a VCO (Voltage-Controlled Oscillator), phase comparing means, a controller and recording signal generating means The pulse height and width of the recording signal are changed dependent on the recording linear velocity so that information can constantly be recorded in the optimized condition.

The proposals described in the above-identified applications control to change a factor involved in the recording pulses such as the duty ratio of pulse emission dependent on the recording linear velocity in the CAV control. However, the proposals yield only qualitative effects on the optical disk media, but do not yield sufficient effects on the DVD media. More specifically, variations in the characteristics of recording information (an RF signal), such as the jitter characteristic, depend on an interaction on a plurality of factors. In practice, the proposed method is not capable of recording information on the DVD media with uniform signal characteristics over the entire surface of the optical disk. Thus, the desired results may not be obtained. No quantitative consideration regarding the ways to change the values of the parameters of the recording pulses is given.

In a case where the parameter values with regard to the recording pulses consisting of the top heating pulse and subsequent heating pulses are changed, the modulation factor or asymmetry may be changed before and after the setting of the parameter values is changed Thus, a slice or threshold level for binarization cannot timely follow a change in the modulation factor or asymmetry, so that the jitter characteristic may be degraded.

SUMMARY OF THE INVENTION

It is a general object of the present invention to eliminate the above-mentioned problems.

A more specific object of the present invention is to record information on the entire recording surface of an optical disk with an even signal characteristic by means of a simple control without changing the rotational velocity of the optical disk while maintaining a compatibility with a recording format of conventional reproduction-dedicated media.

Another specific object of the present invention is to suppress variations in the slice level for binarization and prevent degradation of the jitter characteristic.

Yet another specific object of the present invention is to correct an edge shift of a mark due to heat accumulated in the optical disk with respect to all possible recording linear velocities in recording based on CAV control and thus accomplish jitter-reduced recording on the entire recording surface.

Still another object of the present invention is to provide an information recording method for recording information on an optical disk by a recording pulse train of an optical beam emitted by an optical source, said method comprising the steps of: (a) changing a recording channel clock period T in accordance with a change of a recording linear velocity so that a recording linear density is kept constant; and (b) updating values of parameters Ttop, Tmp and $\rho$ at intervals based on a desired recording linear velocity, where Ttop is a ratio of a width of a top heating pulse in the recording pulse train to the recording channel clock period T, Tmp is a duty ratio of each heating pulse in a multi-pulse section following the top heating pulse, and $\rho$ is a ratio of a recording power Pw at the desired linear velocity to an optimal recording power Pwmin at a minimum recording linear velocity ($\rho$=Pw/Pwmin).

A further object of the present invention is to provide an information recording method for recording information on an optical disk by a recording pulse train of an optical beam emitted by an optical source, said method comprising the steps of: (a) changing a recording channel clock period T in accordance with a change of a recording linear velocity so that a recording linear density is kept constant; and (b) updating a setting value of a pulse width of a top cooling pulse in the recording pulse train at intervals based on a desired recording linear velocity by changing a front edge position of the top cooling pulse so that the pulse width of the top cooling pulse is different from pulse widths of cooling pulses in a multi-pulse section of the recording pulse train following the top cooling pulse.

Another object of the present invention is to provide an information recording method for recording information on an optical disk by a recording pulse train of an optical beam emitted by an optical source, said method comprising the steps of: (a) changing a recording channel clock period T in accordance with a change of a recording linear velocity so that a recording linear density is kept constant; and (b) updating setting values of pulse widths and recording power of heating pulses included in the recording pulse train at intervals so that a front edge position of a top heating pulse included in the recording pulse train, a rear edge position of a tail heating pulse included therein, and a recording power of the heating pulses included therein are changed in accordance with a desired recording linear velocity.

Still another object of the present invention is to provide an information recording method for recording information on an optical disk by a recording pulse train of an optical beam that is emitted by an optical source, said method the steps of: (a) changing a recording channel clock period T in accordance with a change of a recording linear velocity so that a recording linear density is kept constant; and (b) updating setting values of a waveform of a first heating portion of the recording pulse train followed by a second heating portion at intervals in accordance with a desired recording linear velocity so that a width of the first heating portion and a recording power thereof are changed.

A further object of the present invention is to provide an information recording method for recording information on an optical disk having a recording layer in which a crystal phase and an amorphous phase are changed reversibly by a recording pulse train of an optical beam emitted by an optical source, said method comprising the steps of: (a) changing a recording channel clock period T in accordance with a change of a recording linear velocity so that a recording linear density is kept constant; and (b) updating values of at least two of parameters Ttop, Tecp and E at intervals based on a desired recording linear velocity, where Ttop is a ratio of a width of a top heating pulse in the recording pulse train to the recording channel clock period T, Tecp is a ratio of a width of an end cooling pulse in the recording pulse train, and E is a ratio of an erasing power Pe to a heating power Pw.

Another object of the present invention is to provide an information recording method for recording information on an optical disk by a recording pulse signal of an optical beam that is emitted from an optical source, comprising changing a recording channel clock period T depending on a change of a recording linear velocity so that a recording linear density is maintained approximately constant; and updating a shape of a pulse waveform of a top heating portion of the recording pulse signal which includes a rear heating portion, at predetermined intervals depending on a desired recording linear velocity, so that a width of the top heating portion and a recording power thereof are changed.

Still another object of the present invention is to provide an information recording method for recording information on an optical disk by a recording pulse signal of an optical beam that is emitted from an optical source, comprising changing a recording channel clock period T depending on a change of a recording linear velocity so that a recording linear density is maintained approximately constant; and updating setting values of a front edge position of a top heating portion of the recording pulse signal, a recording power of the top heating portion and a recording power of a rear heating portion of the recording pulse signal at predetermined intervals depending on a desired recording linear velocity, so that both Ttop and $\epsilon$ change, where Ttop denotes a ratio of a width of the top heating pulse to the recording channel clock period T, $\epsilon$ denotes a ratio Ptop/Prear, Ptop denotes a recording power of the top heating portion, and Prear denotes a recording power of the rear heating portion.

A further object of the present invention is to provide an information recording method for recording information on an optical disk by a recording pulse signal of an optical beam that is emitted from an optical source, comprising changing a recording channel clock period T depending on a change of a recording linear velocity so that a recording linear density is maintained approximately constant; and updating setting values of a pulse width and a recording power of a top heating portion of the recording pulse signal and a pulse width and a recording power of a rear heating portion of the recording pulse signal at predetermined intervals, so that a front edge position of the top heating portion, a rear edge position of the rear heating portion and the recording powers of the top and rear heating portions change at approximately constant rates depending on a desired recording linear velocity.

Another object of the present invention is to provide an information recording method for recording information on a recording layer of an optical disk by a recording pulse signal of an optical beam that is emitted from an optical source, comprising changing a recording channel clock period T depending on a change of a recording linear velocity so that a recording linear density is maintained approximately constant; and updating setting values of a ratio Ttop of a pulse width of a top heating portion of the recording pulse signal with respect to the recording channel clock period T, a ratio Ttail of a rear heating portion of the recording pulse signal with respect to the recording channel clock period T, and a recording power Pw of the top and rear heating portions so as to increase at predetermined intervals, depending on an increase in the recording linear velocity.

Still another object of the present invention is to provide an information recording apparatus for recording information on an optical disk by a recording pulse signal of an optical beam that is emitted from an optical source, wherein a recording channel clock period T is changed depending on a change of a recording linear velocity so that a recording linear density is maintained approximately constant, the information recording apparatus comprising an optical head having the optical source; and a control part updating a shape of a pulse waveform of a top heating portion of the recording pulse signal which includes a rear heating portion, at predetermined intervals depending on a desired recording linear velocity, so that a width of the top heating portion and a recording power thereof are changed.

A further object of the present invention is to provide an information recording apparatus for recording information on an optical disk by a recording pulse signal of an optical beam that is emitted from an optical source, wherein a recording channel clock period T is changed depending on a change of a recording linear velocity so that a recording linear density is maintained approximately constant, the information recording apparatus comprising an optical head having the optical source; and a control part updating setting values of a front edge position of a top heating portion of the recording pulse signal, a recording power of the top heating portion and a recording power of a rear heating portion of the recording pulse signal at predetermined intervals depending on a desired recording linear velocity, so that both Ttop and $\epsilon$ change, where Ttop denotes a ratio of a width of the top heating pulse to the recording channel clock period T, $\epsilon$ denotes a ratio Ptop/Prear, Ptop denotes a recording power of the top heating portion, and Prear denotes a recording power of the rear heating portion.

Another object of the present invention is to provide an information recording apparatus for recording information on an optical disk by a recording pulse signal of an optical beam that is emitted from an optical source, wherein a recording channel clock period T is changed depending on a change of a recording linear velocity so that a recording linear density is maintained approximately constant, the information recording apparatus comprising an optical head having the optical source; and a control part updating setting values of a pulse width and a recording power of a top heating portion of the recording pulse signal and a pulse width and a recording power of a tail heating portion of the recording pulse signal at predetermined intervals, so that a front edge position of the top heating portion, a rear edge position of the tail heating portion and the recording powers of the top and tail heating portions change at approximately constant rates depending on a desired recording linear velocity.

Still another object of the present invention is to provide an information recording apparatus for recording information on a recording layer of an optical disk by a recording pulse signal of an optical beam that is emitted from an optical source, wherein a recording channel clock period T is changed depending on a change of a recording linear velocity so that a recording linear density is maintained approximately constant, the information recording apparatus comprising an optical head having the optical source; and a control part updating setting values of a ratio Ttop of a pulse width of a top heating portion of the recording pulse signal with respect to the recording channel clock period T, a ratio Ttail of a tail heating portion of the recording pulse signal with respect to the recording channel clock period T, and a recording power Pw of the top and tail heating portions so as to increase at predetermined intervals, depending on an increase in the recording linear velocity.

Other objects and further features of the present invention will be apparent from the following detailed description when read in conjunction with the accompanying drawings.

BRIEF DESCRIPTION OF THE DRAWINGS

FIGS. 1A through 1D are diagrams that show CLV-control-based recording method;

FIGS. 2A through 2D are diagrams that show CAV-control-based recording method;

DESCRIPTION OF THE PREFERRED EMBODIMENTS

A description will be given, FIGS. 3 through 7, of a first embodiment of the present invention.

Figure 3:
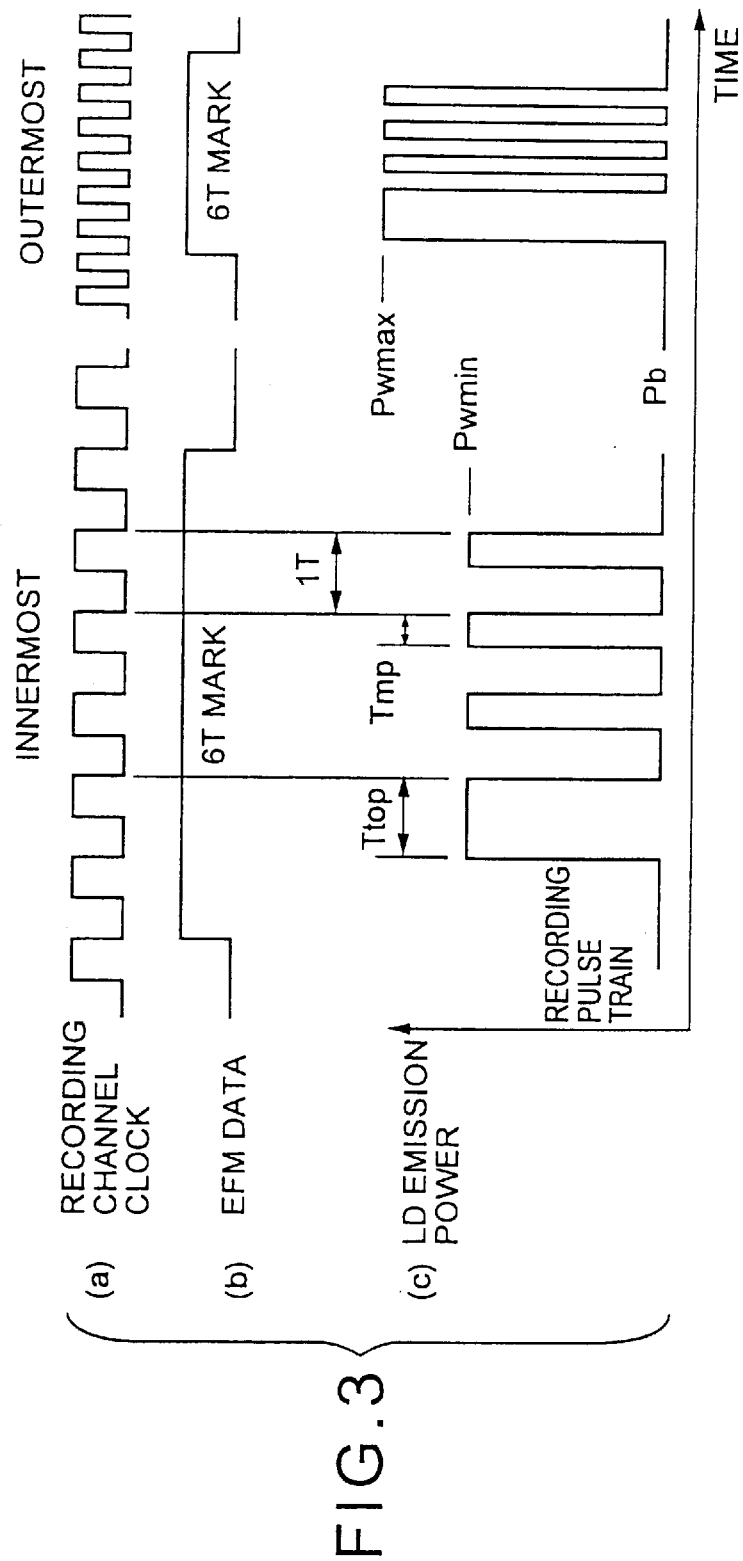
FIG. 3 is a waveform diagram of signals including a recording pulse train controlled by a first embodiment of the present invention.

As shown in FIG. 3, first through third parameters are defined with regard to the basic setting of a recording pulse train used for a dye-based optical disk. The first parameter is a number (n−x) of pulses forming a recording pulse train, the number (n−x) corresponding to a mark data length nT, in which n is an integer, x is equal to 1 or 2, and T is the period of a recording channel clock. The second parameter is a ratio Ttop of the width of the top heating pulse to the period T of the recording channel clock. The third parameter is a duty ratio Tmp of each pulse located in a multi-pulse section following the top heating pulse. Further, two parameters, namely a recording power Pw and a bias power Pb are defined with regard to the basic setting of the recording power. Generally, the recording power Pw is described by another parameter ρ because the shape of a mark formed by laser projection has a strong correlation with the recording linear velocity Lv. The symbol ρ denotes a ratio of a recording power Pw in a radial position (recording linear velocity) to an optimal recording power Pwmin at the minimum recording linear velocity (ρ=Pw/Pwmin) that is obtained in the innermost circumference position.

The first embodiment of the present invention is intended to control the setting of the ratio Ttop, the duty ratio Tmp and the ratio ρ in more detail by a unique manner.

When recording in a dye-based DVD having a diameter of 120 mm is made by the CAV control, the recording linear velocity is equal to 3.5 m/s in the innermost circumference of the disk and 8.5 m/s in the outermost circumference thereof, and the recording channel clock frequency is equal to 26.2 MHz in the innermost circumference and 63.7 MHz in the outermost circumference. It will be noted that the following problems arise when a recording which requires a change of the recording linear velocity as large as approximately 2.4 times is performed by a recording pulse train and a recording power which are uniform over the entire recording area. As the recording linear velocity becomes high, pre-heating by the top heating pulse becomes insufficient. Thus, the modulation factor of the RF signal may fluctuate and an increased diE5persion of the asymmetry of the RF signal occurs, as the recording linear velocity becomes high (as the position moves towards the outer circumference). Further, the duty ratio-of the heating pulses in the following multi-pulse section may deviate from the optimal value, so that the recording mark does not have an even width.

The first embodiment of the present invention is intended to achieve jitter-reduced recording in which even signal characteristics are obtained in the entire recording range between the innermost circumference and the outmost circumference.

Figure 4:
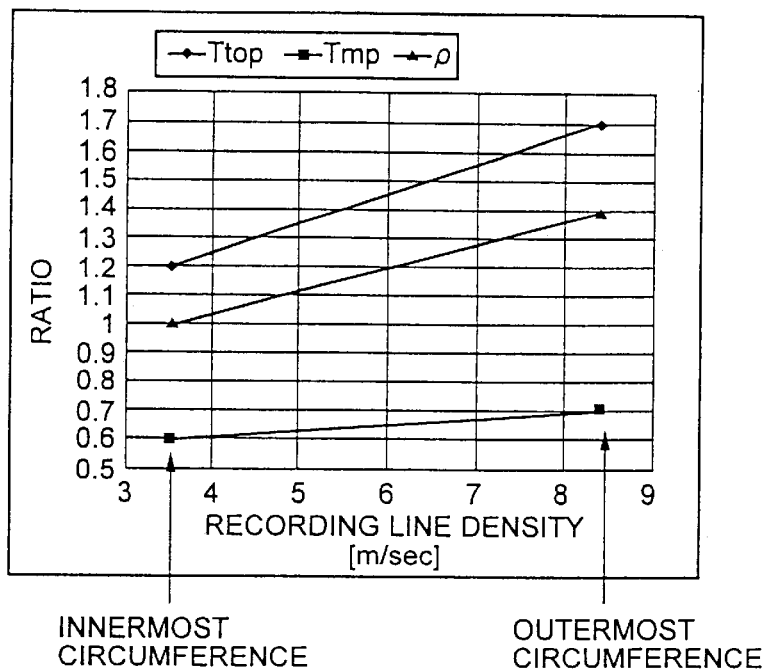
FIG. 4 is a graph showing the relationship between parameters Ttop, Tmp and ρ and the recording linear velocity involved in the first embodiment of the present invention.

As shown in FIG. 4, at the minimum recording linear velocity in the innermost circumference position, the number of pulses forming the recording pulse train is set to n−2 (n is the mark data length), the ratio Ttop is set to 1.20 T, the duty ratio Tmp is set to 0.60 T, and the optimal recording power Pwmin is set to 10 mW. The setting values of the parameters mentioned above are typical numerical values for the dye-based optical disks. A variety of tuning and different recording materials have respective, different optimal values. As shown in FIG. 4, by increasing the setting values of the ratio Ttop and the duty ratio Tmp and the setting value of the ratio $\rho$ (=Pw/Pwmin) as the recording linear velocity increases, it becomes possible to apply the optimal amount of heat to the mark head portion and to record information with the optimal recording power Thus, the uniform mark width can be obtained, so that the good jitter characteristic can be maintained.

Figure 5:
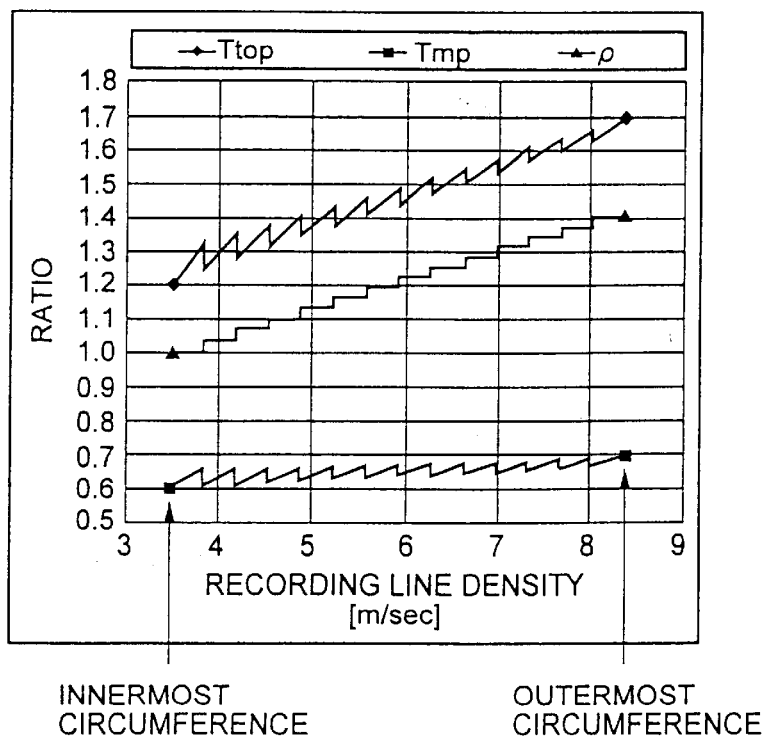
FIG. 5 is a graph showing of a practical way to vary the values of the parameters Ttop, Tmp and ρ.

In the recording based on the CAV control in which the recording linear velocity depends on the radial position, the setting values of the parameters can be updated as follows. For example, as shown in FIG. 5, the ratio Ttop of the width of the top heating pulse to the recording channel clock period T is changed from 1.2 T (approximately equal to 46 ns) in the innermost circumference position to 1.7 T (approximately equal to 27 ns) in the outermost circumference position. In this case, the value of the ratio Ttop can be changed so that the pulse width of the top heating pulse to the recording channel clock period T is lengthened by 0.5 T in total. The value of the ratio Ttop is intermittently updated at intervals of approximately 0.35 m/s.

The sawtooth-like changes of the values of the parameters Ttop and Tmp are practically obtained by using a multi-stage delay element which acts as a pulse edge generator, which will be described later with reference to FIG. 9.

Similarly, the duty ratio Tmp of heating pulses in the multi-pulse section following the top heating pulse is changed from 0.60 T (approximately equal to 23 ns) in the innermost circumference position to 0.7 T (approximately equal to 11 ns) in the outermost circumference position, so that the pulse width to the recording channel clock period T is lengthened by 0.1 T in total. The value of the duty ratio Tmp may be intermittently updated at the same intervals as those for the ratio Ttop.

The recording power Pw is changed from 10 mW in the innermost circumference position to 14 mW in the outermost circumference position. Thus, the ratio $\rho$ of the recording power to the maximum recording power Pwmin in the innermost circumference position changes from 1 to 1.4 and thus increases by 0.4. The value of the recording power Pw may be intermittently updated at the same intervals as those for the ratio Ttop.

As described above, the ratio Ttop, the duty ratio Tmp and the ratio $\rho$ are updated so as to have respective increasing values as the radial position goes towards the outermost circumference position. As a result of the above updating, the reproduced RF signal has reduced degradations with regard to the modulation factor, asymmetry and jitter, so that improved reproduction can be made.

It will be noted that the above-mentioned values set in the parameters can be typically applied to optical disks that are different in terms of the dye material and turning of the groove formation for tracking servo. Information can be recorded on a dye-based optical disk by forming a mark thereon due to a mechanism in which a laser beam is projected onto the disk so that a thermal decomposition and a resultant substrate deformation occur, the optical characteristics being thus changed. The above mechanism of forming the mark is called heat mode. The first embodiment of the present invention can suitably be applied to the heat mode recording. Typical examples of organic dyes are a polymethylene dye, cyanine-based, naphthalocyanine-based, phthalocyanine-based, squarylium-based, pyrylium-based, naphthoquinone-based, anthraquinone-based (indanthrene), xanthene-based, triphenylmethane-based, azulene-based, phenanthrene-based, and triphenothiazin-based coloring matters, and azoic color, which is a metal complex compound. The above dyes may be mixed or stacked with another organic dye, a metal or a metal compound in order to improve the optical characteristics, recording sensitivity and/or signal characteristics. Examples of metals and metal compounds used for the above purpose are In, Te, Bi, Se, Sb, Ge, Sn, Al, Be, $TeO_2$, SnO, As and Cd. The recording layer of the disks may be formed by evaporation, sputtering, CVD or solvent coating. When the solvent coating is used, materials including the above-mentioned dye are solved in an organic solvent, which is coated on the underlying layer by spray, roller coating, dipping or spin coating.

It is to be noted that that the optical disks made of different dyes have respective, optimal setting values of the parameters. However, in the recording by the CAV control, the setting of the values of the ratio Ttop, the duty ratio Tmp, and the ratio $\rho$ can be optimized with respect to the recording linear velocity Lv in the same manner.

More particularly, the increasing values of the ratio Ttop, the duty ratio Tmp, and the ratio $\rho$ in the outermost circumference position with respect to the innermost circumference position are respectively selected so as to fall within respective ranges of 0.3 T to 0.7 T, 0.05 T to 0.2 T and 0.3 to 0.5. Under the above conditions, information can be suitably recorded on the various dye-based recordable DVDS having a diameter of 120 mm by the CAV control.

A more detailed description will be given of the setting values of the parameters according to the first embodiment of the present invention.

It is known that, in a case where information is recorded on dye-based optical disks at a recording linear velocity, the recording power is approximately proportional to a square root of the recording linear velocity (see, for example, Japanese Laid-Open Patent Application No.10-106008 mentioned before). That is, the following equation stands:

$$Pw = Klv\sqrt{Lv}$$

where Pw is the recording power, Lv is the recording linear velocity, and Klv is a constant. In contrast, as has been described previously, according to the first embodiment of the present invention, the values of the parameters Ttop and Tmp are optimized with respect to the recording linear velocity Lv. In this case, the recording power obtained by a linear approximation using an equation $\rho = Klv \times Lv + Kpw$, to which the optimal recording powers respectively at the minimum and maximum recording linear velocities are applied, has an adequate value based on the recording linear velocity over the recording range. Also, the use of similar linear approximations makes it possible to optimize the values of the ratio Ttop and the duty ratio Tmp with respect to the recording linear velocity Lv in the recordable area.

Examples of the linear approximation equations are as follows:

$$Ttop = 0.1 \times Lv + 0.85$$

$$Tmp = 0.02 \times Lv + 0.53$$

$$Pw = Pwmin \times (0.08 \times Lv + 0.72)$$

By using the method of updating the values of the parameters Ttop, Tmp and Pw ($\rho$) using the linear approximation equations, it is possible to easily obtain the optimal values thereof with respect to the arbitrary recording linear velocity.

Figure 6:
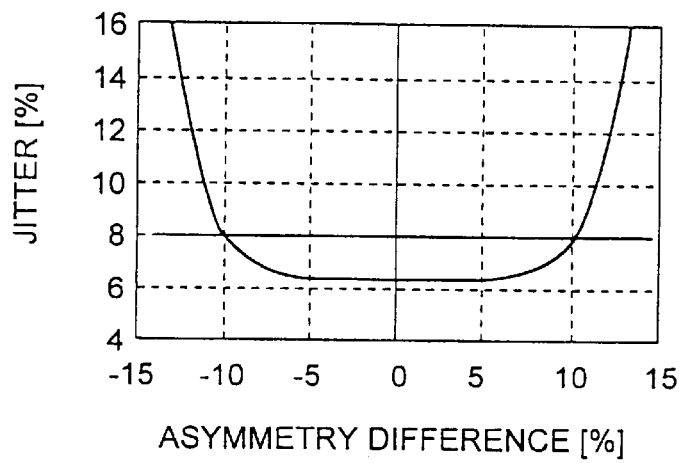
FIG. 6 is a graph of a jitter versus asymmetry difference characteristic.

Principally, it is desired to update the values of the parameters Ttop, Tmp and Pw ($\rho$) as frequently as possible in response to an increase in the recording linear velocity Lv in order to obtain the excellent RF signal characteristics. However, the frequent updating causes a controller to have an increased load. The error rate of the reproduced information is greatly affected by the difference in asymmetry between the maximum length data of the RF signal and the minimum length data thereof before and after the setting values of the parameters are updated. As shown in FIG. 6, the asymmetry indicates a value obtained by normalizing the difference between the average level of the maximum data amplitude of the RF signal and the average level of the minimum length data amplitude thereof by the maximum length data amplitude, and is thus indicative of an asymmetry between the mark length and the space length. In an EFM (Eight Fourteen Modulation) pulse modulation, when a 14 T space level is denoted as $I_{14H}$, a 14 T mark level is denoted as $I_{14L}$, a 3 T space level is denoted as $I_{3H}$, and a 3 T mark level is denoted as $I_{3L}$, the asymmetry is described as follows:

$$\text{Asymmetry} = [(I_{14H} + I_{14L})/2 - (I_{3H} + I_{3L})/2]/(I_{14H} - I_{14L})$$

Figure 7:
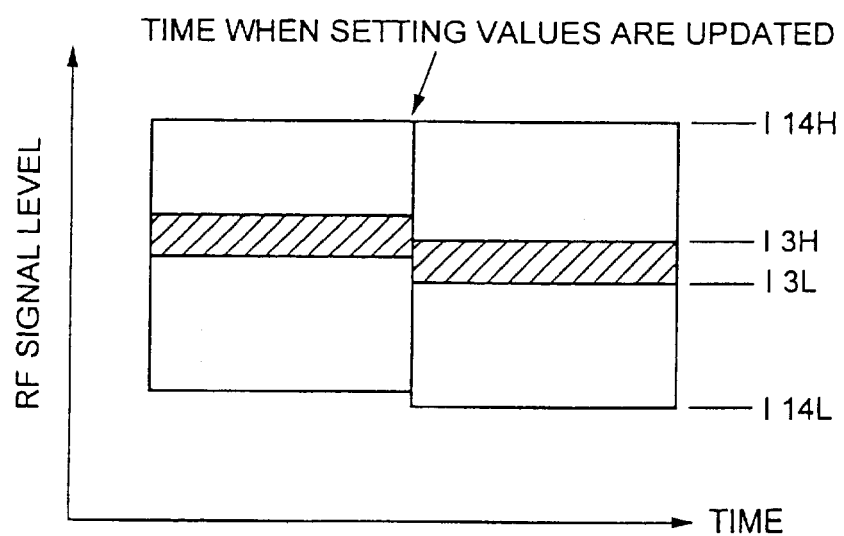
FIG. 7 is a diagram showing a variation in an RF signal level when the values of the parameters are updated.

As shown in FIGS. 6 and 7, if the asymmetry difference before and after the setting values of the parameters are updated exceeds ±10%, the jitter characteristic will be abruptly degraded. Hence, the asymmetry difference should fall within the range of ±10%. A slice circuit which binarizes the RF signal of an ordinary DVD reproduction apparatus does not have a time constant that follows the asymmetry difference, and cannot binarize the RF signal accurately. Thus, a large edge shift occurs in the RF signal. In some cases, a PLL (Phase-Locked Loop) circuit for generating the reproduction clock may shift to an out-of-phase state. When the jitter characteristic and the PLL operating stability are taken into consideration, it is more preferable that the setting values of the parameters are updated while the asymmetry difference falls within the range of ±5%.

The updating of the value of each of the three parameters Ttop, Tmp and $\rho$ yields the respective effect. However, the variations in the characteristics of the RF signal interact on each other. Thus, it is preferable to update the values of at least two parameters by the above-mentioned method. Of course, it is possible to obtain the greatest effect when the values of all the three parameters Ttop, Tmp and $\rho$ are updated.

A description will be given of a first modification of the first embodiment of the present invention.

It is effective in correcting the ratio Ttop of the width of the top heating pulse to the recording channel clock period T in accordance with the data length to be recorded in order to record information on a dye-based optical disk with a reduced jitter. Generally, the recording layer containing a dye material has a property such that the amount of heat accumulated in the recording layer depends on the space length immediately preceding the mark to be recorded. Due to such a property the front edge of the mark may shift. The above phenomenon is particularly conspicuous when the space immediately preceding the mark has the minimum space length. The first modification of the first embodiment of the present invention is directed, taking into account the above phenomenon, to correcting the width of the top heating pulse and thus achieving a further reduction of jitter. More particularly, Table 1 shows the amounts of correction of the width of the top heating pulse by which the front edge position of the top heating pulse is corrected.

TABLE 1

|  |  | Mark Length To Be Recorded | |
| --- | --- | --- | --- |
|  |  | 3T | 4T~14T |
| Space Length Immediately Preceding Mark | 3T | −0.02T | −0.05T |
|  | 4T~14T | +0.02T | ±0T |

The first modification uses recording data that is EFM modulated. In this case, the front edge position of the top heating pulse is corrected so that the width of the top heating pulse is reduced by 0.05 T (lengthened by −0.05 T) only when the immediately previous space length is 3 T and the mark length is any of 4 T~14 T. When the immediately previous space is 3 T and the mark length is also 3 T, the width of the top heating pulse is corrected so as to be reduced by 0.02 T because the edge of the top heating pulse slightly shifts. The above-mentioned edge correction is particularly effective in the combinations of the immediately previous space length and the mark length shown in Table 1. The edge correction for combinations other than those shown in Table 1 does not reduce the jitter as greatly as that for the combinations shown in Table 1.

The edge correction shown in Table 1 is effective in all the possible values of the recording linear velocity Lv. More particularly, the amount of correction at the minimum recording linear velocity in the innermost circumference position is approximately equal to −0.02 T (approximately equal to −0.75 ns) for a combination of 3 T—3 T (the immediately previous space length—mark length), and −0.05 T (approximately equal to −1.9 ns) for a combination of 3 T–4 T~14 T. The amount of correction at the maximum recording linear velocity in the outermost circumference position is approximately equal to −0.3 ns for a combination of 3 T–3 T, and to −0.8 ns for a combination of 3 T–4 T~14 T. When the space length immediately previous to the mark to be formed has the minimum length, the front edge position of the top heating pulse is corrected by the same amount of correction with respect to variations in the recording linear velocity in the CAV-control-based recording so that the top heating pulse has a reduced width. As a result of the above edge correction, jitter-reduced recording can be made over the whole optical disk.

The amount of correction ranging from −0.02 T to −0.07 T can be applied to optical disks that are different in terms of the dye material and tuning of the groove formation.

A description will be given, with reference to FIG. 8, of a sequence of implementing the first embodiment of the present invention, which may be executed by a controller or the like provided in an information recording apparatus.

Generally, the optical disks such as CDs and DVDs have a groove for obtaining a tracking error signal (push-pull signal). A wobble signal retrieved by movement of a scan beam on the groove in a zigzag direction is superimposed. At each of the recording linear velocities, the wobble signal is detected by a programmable BPF (Band-Pass Filter). Information encoded by a frequency modulation or a phase modulation is decoded by using the wobble signal. Thus, address information and disk information inherent in an individual disk can be read from a virgin disk. Alternatively, the information mentioned above can also be reproduced from pits intermittently arranged in a land section (a land-prepit signal; preformatted information).

The first embodiment of the present invention utilizes the superimposed or preformatted information in order to record the recommended values of the parameters Ttop, Tmp and Pw. More particularly, on the disk, superimposed or preformatted are the optimal or recommended values of Ttop, Tmp and Pw for a plurality of recording linear velocities including the minimum linear velocity (in the innermost circumference position), the maximum linear velocity (in the outermost circumference position), and an intermediate linear velocity (in an intermediate position).

Figure 8:
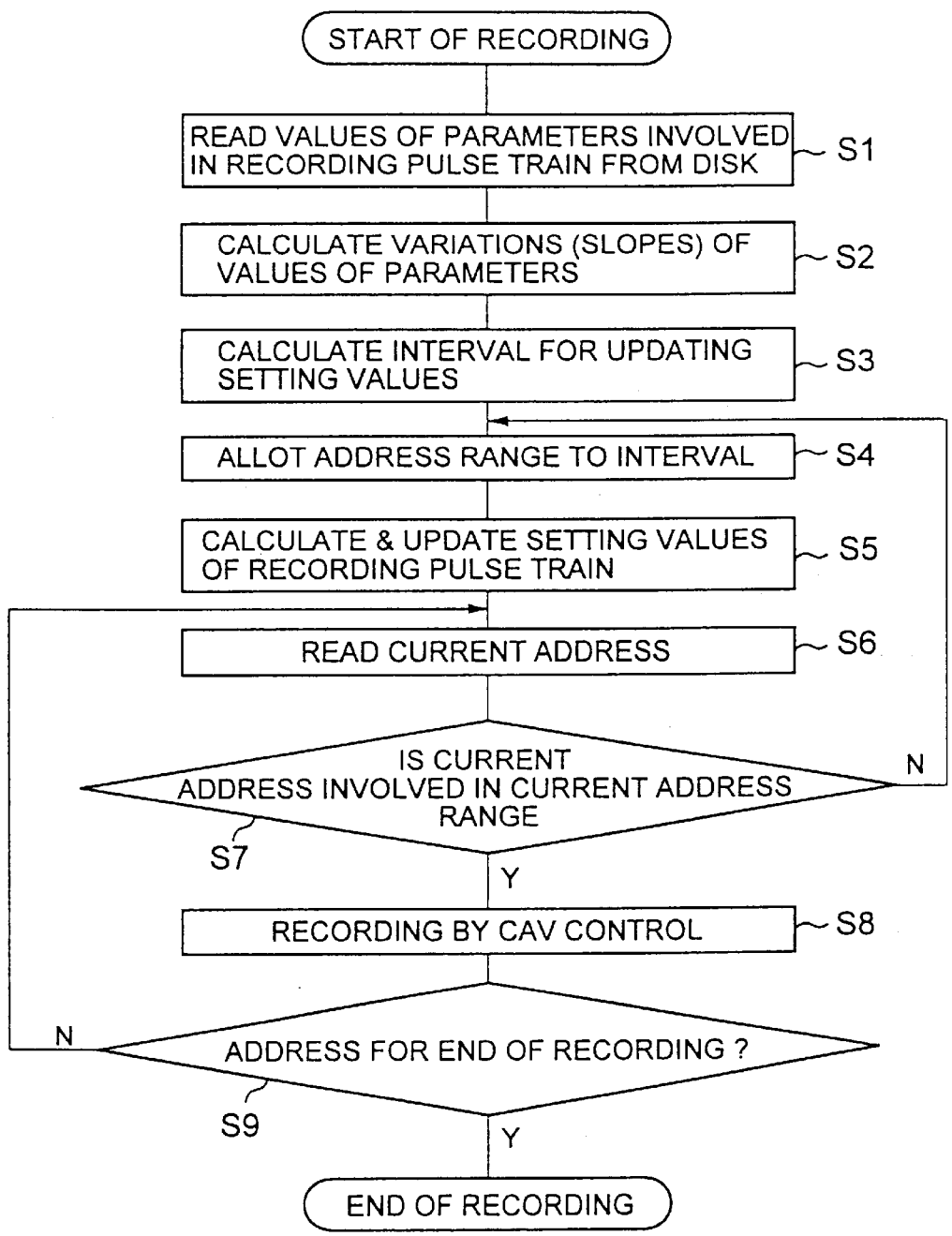
FIG. 8 is a flowchart of an information recording method according to the first embodiment of the present invention mentioned later.

At step S1 of the sequence shown in FIG. 8, the optimal values of Ttop, Tmp and Pw are read from the disk. At step S2, variations of the values of Ttop, Tmp and Pw with respect to a change in the recording linear velocity (or the slopes of the respective approximation equations connecting the optimal values) are calculated from the optimal values thereof read at step S1 by the aforementioned linear approximation. At step S2, the aforementioned approximation equations may be used. Alternatively, the variations or slopes may be obtained by other approximation equations, such as polynomial approximation equations, suitable for the property of the optical disk.

At step S3, the interval for updating the setting values of the parameters is calculated from the setting range of the recording linear velocity based on the CAV control. For example, the setting values of the parameters are updated at intervals of approximately 0.35 m/s.

The variations of the setting values of the parameters thus obtained are those with respect to change of the recording linear velocity. In practice, it is necessary to recognize the variations of the setting values by address information obtained by demodulating the wobble signal or PLL signal. Particular address values are predetermined over the recording range or area from the innermost circumference position to the outermost circumference position, and are thus made to correspond to the recording linear velocities.

At step S4, an appropriate address range is allotted to the time interval for updating. When the address reaches a value at which the setting values of the parameters should be updated, the setting values of the parameters are updated at step S5. In recording based on the CAV control, the current address can be read at step S6. Then, at step S7, it is determined whether the current address read at step S6 is involved in the current address range. When the answer of step S7 is YES, information is recorded by the CAV control at step S8. Then, it is determined, at step S9, whether the current address coincides with the address for the end of recording. When the answer of step S9 is YES, recording is ended. When it is determined, at step S7, that the current address is out of the current address range, the process returns to step S4.

The above-mentioned sequence contributes to a considerable reduction in the load of controlling and managing the recording pulse train by the controller.

The optimal values of the recording power can be determined more accurately as follows. One or both of the test writing areas respectively arranged in the innermost and outermost circumference positions are used to obtain the recording power for the minimum recording linear velocity and that for the maximum recording linear velocity. Trial writing is performed at two or more different recording linear velocities including the minimum and maximum recording linear velocities. The optimal values of the recording power thus obtained are used to correct the values of the recording power obtained from the wobble signal or to replace them.

A description will be given, with reference to FIG. 9, of an information recording apparatus according to the first embodiment of the present invention, in which information is recorded on an optical disk medium while the setting values of the ratio Ttop, the duty ratio Tmp and the ratio ρ are updated at given intervals.

Figure 9:
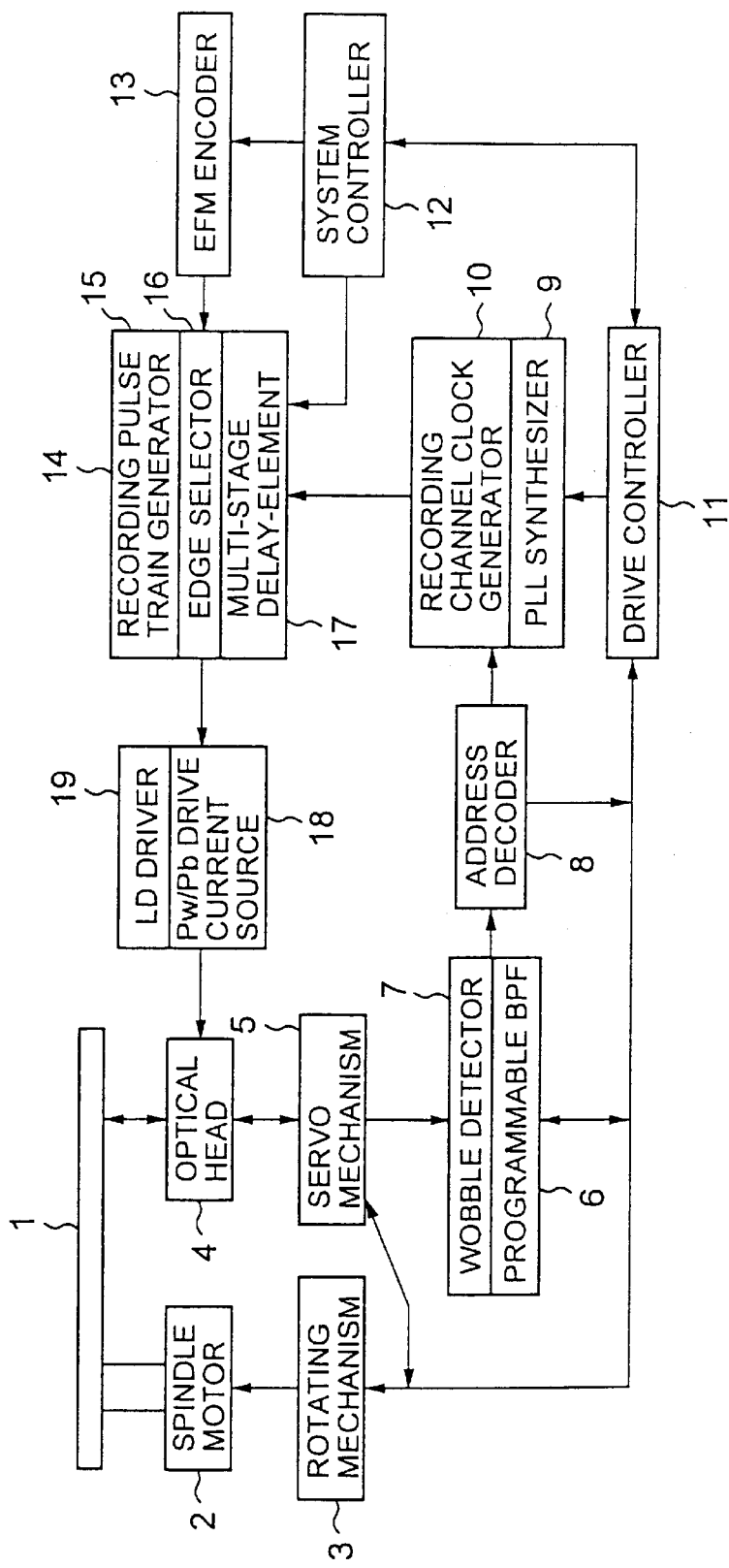
FIG. 9 is a block diagram of an information recording apparatus according to the first embodiment of the present invention.

Referring to FIG. 9, a spindle motor 2 rotates an optical disk 1 under the control of a rotating mechanism 3. An optical head 4 is provided so as to move in the radial direction of the optical disk 1. The optical head 4 includes an optical source such as a laser diode, and an objective lens which focuses a light beam emitted by the optical source on the optical disk 1. Further, the optical head 4 includes an objective lens driving device, which is connected to a servo mechanism 5. A wobble detector 7 including a programmable BPF 5 is connected to the servo mechanism 5. An address demodulator 8, which is connected to the wobble detector 7, demodulates address information from a wobble signal detected by the wobble detector 7. A recording channel clock generator 10 including a PLL synthesizer 9 is connected to the address demodulator 8. A drive controller 11 is connected to the PLL synthesizer 9. A system controller 12 is connected to the drive controller 11 to which the rotating mechanism 3 the servo mechanism 5, the wobble detector 7, and the address demodulator 8 are connected. An EFM encoder 13 and a recording pulse train controller 14 are connected to the system controller 12. The recording pulse-train controller 14 includes a recording pulse train generator 15, which generates a heating pulse control signal corresponding to the recording pulse train including the top heating pulse and following heating pulses in the multi-pulse section. Also, the recording pulse train controller 14 includes an edge selector 16 of a multiplexer configuration, and a multi-stage delay element 17, which includes gate elements and acts as an edge signal generator for generating a large number of edge signals. The recording pulse train generator 15 includes the edge selector 15 and the multi-stage delay element 17. An LD (Laser Diode) driver 19 is connected to the output side of the recording pulse train controller 14. A Pw/Pb drive current source 18 includes a drive current source for recording power Pw and another drive current source for bias power Pb. The LD driver 19 selectively uses the two drive current sources and thus drives the semiconductor laser diode provided in the optical head 4.

The central frequency corresponding to the recording linear velocity is set in the programmable BPF 6 by the drive controller 11. The address information is demodulated by the address demodulator 8 from the wobble signal detected by the wobble detector 7. The basic clock frequency of the PLL synthesizer 9 is changed by the drive controller 11. Thus, the recording channel clock which depends on the arbitrary recording linear velocity is generated and output to the recording pulse train controller 14.

In order to emit the recording pulse train by the semiconductor laser, the recording pulse train controller 14 is supplied with the recording channel clock and EFM data to be recorded on the optical disk 1 from the recording channel clock generator 10 and the EFM encoder 13, respectively. The recording pulse train generator 15 generates the heating pulse control signal, which corresponds to the recording pulse train and includes the top heating pulse and the following heating pulses in the multi-pulse section. The LD driver 19 selectively uses the drive current sources for the recording power Pw and the bias power Pb provided in the Pw/Pb drive current source 18. At the time of recording the LD driver 19 uses the current source for biasing and causes the semiconductor laser in the optical head 4 to constantly emit light with the bias power Pb corresponding to a reproduction power. Then, the LD driver 19 uses the current source for recording in accordance with the heating pulse control signal generated by the recording pulse train generator 15, so that the recording pulse train as shown in part (c) of FIG. 3 can be generated.

The multi-stage delay element 17 has a first multi-stage delay part, which has a unit delay of approximately 0.5 ns and receives the recording channel clock from the recording channel clock generator 10. Further, the multi-stage delay element 17 has a second multi-stage delay part, which has a unit delay of approximately 0.5 ns and receives EFM data from the EFM encoder 13.

The first multi-stage delay part generates a plurality of delayed recording channel clocks having respective, different delay times. The delayed recording channel clocks are applied to the edge selector 15, which also receives select information from the system controller 12. The select information indicates one of the delayed recording channel clocks based, on the data length of a mark to be recorded and the lengths of spaces immediately preceding and following the above mark. The edge selector 15 includes an AND gate which performs an AND operation on the selected recording channel clock and the EFM data, so that a recording pulse control signal for controlling the drive current source 18 can be generated.

The second multi-pulse delay part of the multi-stage delay element 17 generates a plurality of items of EFM data. The edge selector 16 has another AND gate which performs an AND operation on a selected one of the plurality of items of EFM data and the original EFM data. The selected delayed EFM data has been delayed by a time amounting to, for example, two clocks. The resultant signal of the AND operation is a top recording pulse control signal for controlling the top heating pulse, and is applied to the drive current source 18 of the LD driver 19.

The recording pulse train generator 15 having the edge selector 16 and the multi-stage delay element 17 is not limited to the above-mentioned circuit configuration and may be formed with various kinds of gate circuits. Also, as will be described later, a PLL circuit may be substituted for the multi-stage delay element 17.

According to the first embodiment of the present invention, it is possible to realize CAV-control-based recording with a simple and compact circuit configuration in which the setting values of the parameters Ttop, Tmp and ρ are updated by the aforementioned method.

A description will be given of a second embodiment of the present invention.

Figure 10:
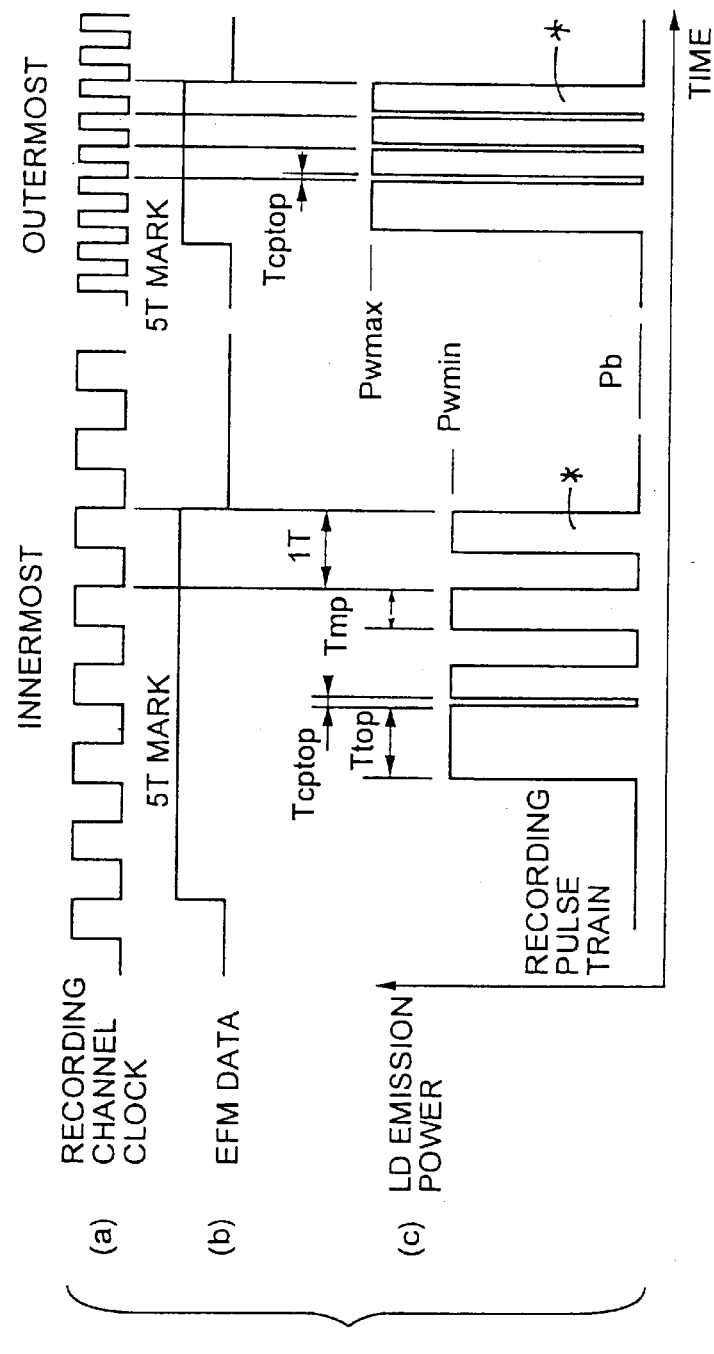
FIG. 10 is a timing chart of signals including the recording pulse train controlled by a second embodiment of the present invention.

FIG. 10 is a waveform diagram of the recording channel clock, the EFM data and the recording pulse train involved in the second embodiment of the present invention. As shown in FIG. 10, the second embodiment of the present invention is directed to controlling a parameter Tcptop in addition to the parameters Ttop, Tmp and ρ controlled in the first embodiment of the present invention. The parameter Tcptop is a ratio of the width of a top cooling pulse to the recording channel clock period T.

Referring to FIG. 10, at the minimum recording linear velocity in the innermost circumference position, the number of pulses forming the recording pulse train is set to n−1 (n is the mark data length), the ratio Ttop is set to 0.80 T, the duty ratio Tmp is set to 0.60 T, the optimal recording power Pwmin is set to 10 mW, and the width of the top cooling pulse is set to 0.05 T. The setting values of the parameters mentioned above are typical numerical values for the dye-based optical disks. A variety of tuning and different recording materials have respective, different optimal values.

Figure 11:
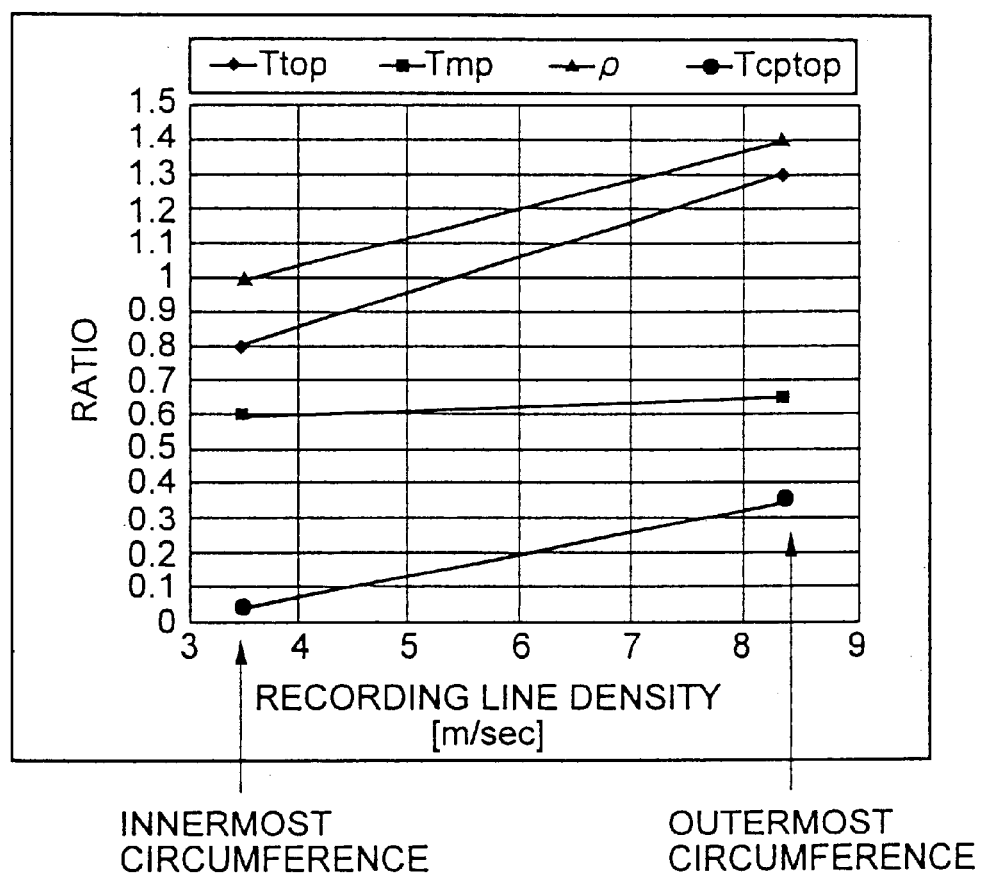
FIG. 11 is a graph showing the relationship between parameters Ttop, Tmp, ρ and Tcptop and the recording linear velocity involved in the second embodiment of the present invention.

As shown in FIG. 11, by increasing the setting values of the ratio Ttop, the duty ratio Tmp, the ratio ρ (=Pw/Pwmin), and the ratio Tcptop as the recording linear velocity increases, it becomes possible to apply the optimal amount of heat to the mark head portion and to record information with the optimal recording power. Thus, the uniform mark width can be obtained, so that jitter-reduced recording can be made.

Figure 12:
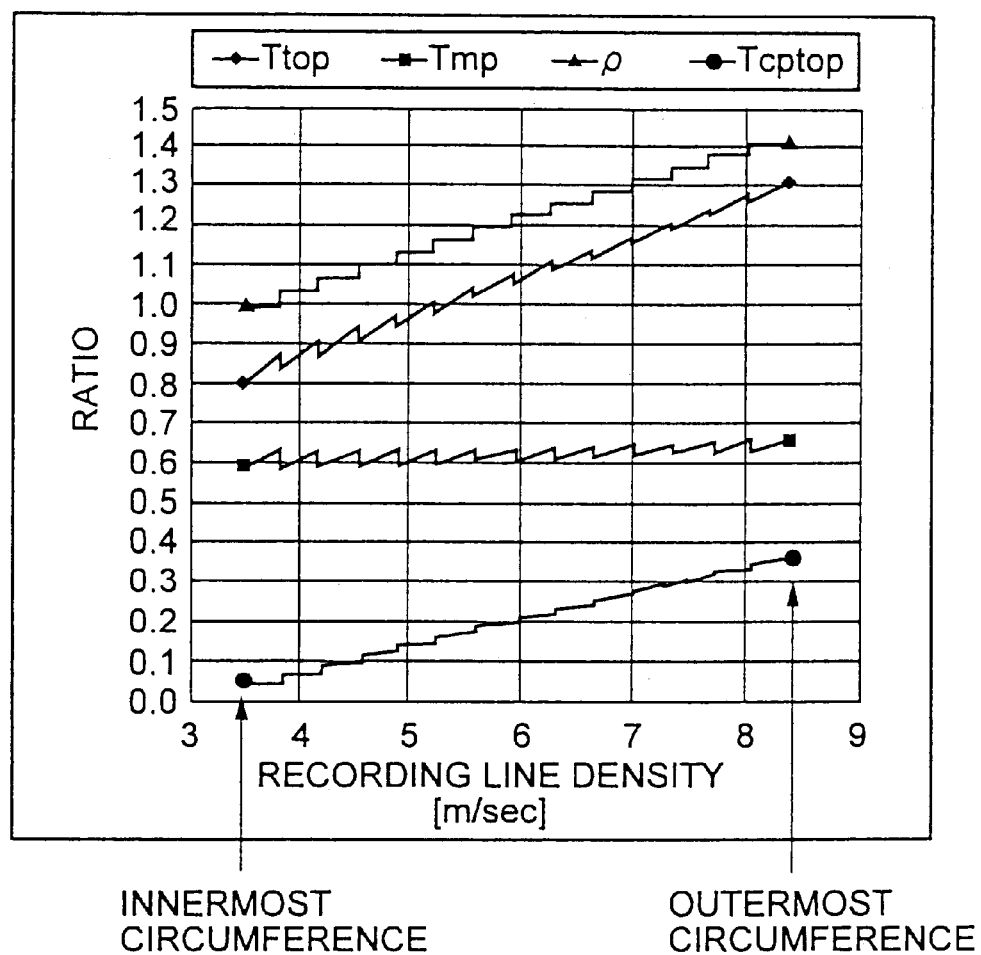
FIG. 12 is a graph showing a practical way to vary the values of the parameters Ttop, Tmp, ρ and Tcptop.
Figure 13:
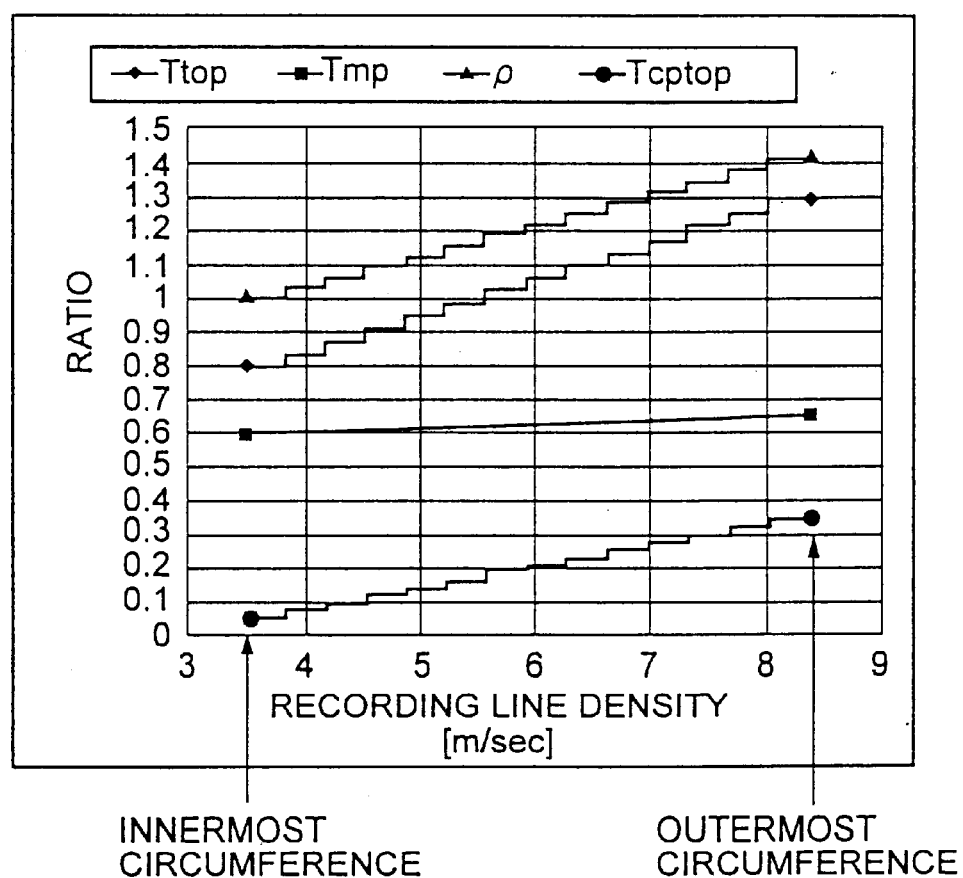
FIG. 13 is a graph showing another practical way to vary the values of the parameters Ttop, Tmp, ρ and Tcptop.

In the recording based on the CAV control in which the recording linear velocity depends on the radial position, the setting values of the parameters can be updated as follows. For example, as shown in FIGS. 12 and 13, the ratio Ttop of the width of the top heating pulse to the recording channel clock period T is changed from 0.8 T (approximately equal to 30.6 ns) in the innermost circumference position to 1.3 T (approximately equal to 20.5 ns) in the outermost circumference position. In this case, the value of the ratio Ttop can be changed so that the pulse width of the top heating value to the recording channel clock period T is lengthened by 0.5 T in total. The value of the ratio Ttop is intermittently updated at intervals of approximately 0.35 m/s.

It will be noted that FIG. 12 shows variations of the values of the parameters obtained when the multi-stage delay element 17 shown in FIG. 9 is used, and FIG. 13 shows the variations thereof obtained when a PLL circuit is used as will be described later.

Similarly, the duty ratio Tmp of heating pulses in the multi-pulse section following the top heating pulse is changed from 0.60 T (approximately equal to 22.9 ns) in the innermost circumference position to 0.65 T (approximately equal to 10.3 ns) in the outermost circumference position, so that the pulse width thereof to the recording channel clock period T is lengthened by 0.05 T in total. The value of the duty ratio Tmp may be intermittently updated at the same intervals as those for the ratio Ttop.

The recording power Pw is changed from 10 mW in the innermost circumference position to 14 mW in the outermost circumference position. Thus, the ratio ρ of the recording power to the maximum recording power Pwmin in the innermost circumference position is changed from 1 to 1.4 and thus increases by 0.4. The value of the recording power Pw may be intermittently updated at the same intervals as those for the ratio Ttop.

The ratio Tcptop of the width of the top cooling pulse to the recording channel clock period T is changed from 0.05 T (approximately equal to 1.9 ns) in the innermost circumference position to 0.35 T (approximately equal to 5.6 ns). Thus, the ratio Tcptop increases by 0.30 T in total. In order to cause the front edge position of the top cooling pulse to shift, the top heating pulse has a timing in such a way as to shift forwardly with respect to the edge-of the recording channel clock.

As described above, the setting values of the ratio Ttop, the duty ratio Tmp, the ratio $\rho$ and the ratio Tcptop are updated so as to have respective increased values as the radial position goes towards the outermost circumference position. As a result of the above updating, the reproduced RF signal has reduced degradations with regard to the modulation factor, asymmetry and jitter, so that improved reproduction can be made even with a 14 T modulation factor or a 3 T modulation factor.

The increasing values of the parameters Ttop, Tmp, $\rho$ and Tcptop in the outermost circumference position with respect to the innermost circumference position are respectively selected so as to fall within respective ranges of 0.3 T to 0.7 T, 0.03 T to 0.07 T, 0.3 to 0.6 and 0.2 T to 0.5 T. The lengthened pulse width of the top cooling pulse is shorter than that of each of the cooling pulses in the multi-pulse section. Under the above condition, information can be suitably recorded, on the various dye-based recordable DVDs having a diameter of 120 mm by the CAV control.

In the second embodiment of the present invention, the following linear approximation equations using the aforementioned concept of equation $\rho = Klv \times Lv + Kpw$ may be used to obtain values to the parameters Ttop, Tmp, Pw and Tcptop with respect to all the possible recording power velocities Lv:

$$Ttop = 0.10 \times Lv + 0.44$$

$$Tmp = 0.01 \times Lv + 0.56$$

$$Pw = Pwmin \times (0.08 \times Lv + 0.72)$$

$$Tcptop = 0.06 \times Lv - 0.16$$

By using the method of updating the values of the parameters Ttop, Tmp, Pw ($\rho$) and Tcptop using the linear approximation equations, it is possible to easily obtain the optimal values thereof with respect to the arbitrary recording linear velocity.

The updating of the value of each of the three parameters Ttop, Tmp, $\rho$ and Tcptop yields the respective effect. However, the variations in the characteristics of the RF signal interact on each other. Thus, it is preferable to update the values of at least two parameters among the four parameters by the above-mentioned method. Of course, it is possible to obtain the greatest effect when the values of all the three parameters Ttop Tmp, $\rho$ and Tcptop are updated.

The aforementioned first modification of the first embodiment of the present invention can be applied to the second embodiment thereof. That is, the width of the top heating pulse may be corrected in accordance with Table 1 mentioned before.

The optimal or recommended values of the ratio Tcptop at the minimum, maximum and intermediate recording linear velocities may be preformatted in the optical disk or super- imposed on the information embedded in the groove formed therein in addition to the aforementioned parameters Ttop, Tmp and Pw.

The flowchart of FIG. 8 can be applied to the control of the second embodiment of the present invention. It will be noted that the parameter Tcptop to be controlled is added to the parameters Ttop, Tmp and $\rho$ used in the first embodiment of the present invention.

Figure 14:
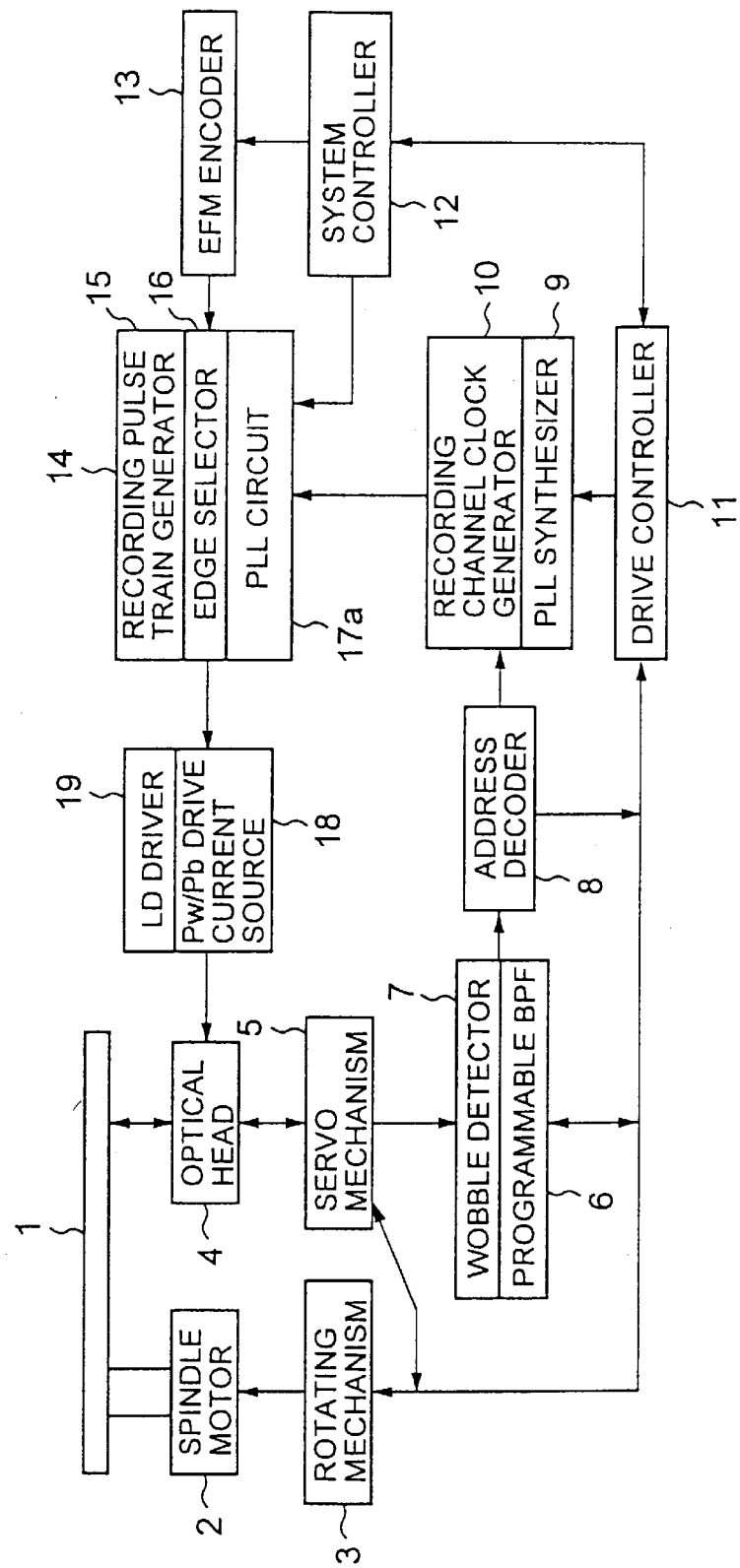
FIG. 14 is a block diagram of an information recording apparatus according to the second embodiment of the present invention.

The block configuration of an information recording apparatus according to the second embodiment of the present invention is the same as shown in FIG. 9. In the configuration shown in FIG. 9 equipped with the multi-stage delay element 17 acting as the pulse edge generator, the values of the parameters Ttop, Tmp, $\rho$ and Tcptop are updated as shown in FIG. 12. Alternatively, the multi-stage delay circuit 17 may be replaced by a PLL circuit 17a as shown in FIG. 14. The block configuration shown in FIG. 14 is the same as that shown in FIG. 9 except for the PLL circuit 17a. When the PLL circuit 17a is used, the values of the parameters Ttop, Tmp, $\rho$ and Tcptop are updated as shown in FIG. 13.

The PLL circuit 17a has two circuits respectively associated with the top heating pulse generating part and the heating multi-pulse generating part provided in the recording pulse train generator 15. Each of the two circuits has a PLL structure made up of a phase comparator, a loop filter, and a voltage-controlled oscillator. A high-resolution clock is generated by multiplying the frequency of the recording channel clock by 32 by means of the PLL circuit 17a. The pulse edge signal has a resolution of 0.03 T, that is, 1.1 ns to 0.5 ns. The multi-stage pulse edge signal thus generated is input to the edge selector 16 of the multiplexer configuration. Under the control of the system controller 12, the edge selector 16 selects one of the edge pulses. With the selected edge pulse, the top heating pulse generating part generates the top heating pulse control signal which varies the front and rear edges of the top heating pulse. Similarly, the heating multi-pulse generating part including the PLL circuit generates a multi-stage pulse edge signal. The edge selector 16 selects edge pulses from the multi-stage pulse edge signal. With the selected edge pulses, the heating multi-pulse generating part generates the heating multi-pulse control signal.

When the PLL circuit 17a is used, the updated values of the parameters are constant during each of the updating sections (address ranges), as shown in FIG. 13. When the multi-stage delay element 17 is used, the values of the parameters changes gradually in each updating section, as shown in FIG. 12.

Figure 15:
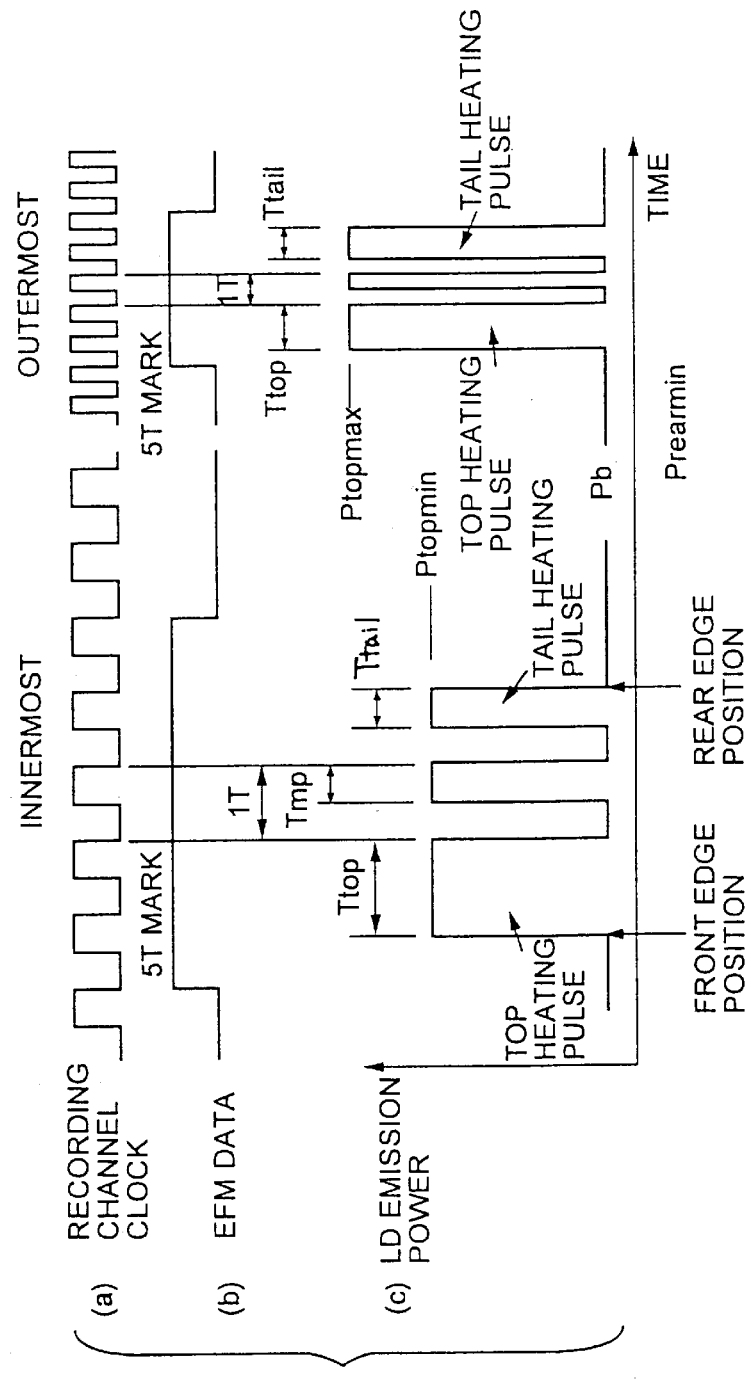
FIG. 15 is a waveform diagram of signals including a recording pulse train controlled by a third embodiment of the present invention.

A description will be given of a third embodiment of the present invention. FIG. 15 is a waveform diagram of the recording channel clock, the EFM data and the recording pulse train involved in the third embodiment of the present invention. As shown in FIG. 10, the third embodiment of the present invention is directed to controlling a parameter Ttail in addition to the parameters Ttop and $\rho$ controlled in the first embodiment of the present invention. The parameter Ttail is a ratio of the width of a tail heating pulse to the recording channel clock period T. Additionally, the duty ratio Tmp controlled in the first embodiment of the present invention may be controlled by the third embodiment thereof. It is also possible to control the front edge position of the top heating pulse and the rear edge position of the tail heating pulse in accordance with the length of the mark to be recorded and the space lengths immediately preceding and following the above mark.

Referring to FIG. 15, at the minimum recording linear velocity in the innermost circumference position, the number of pulses forming the recording pulse train is set to n−1 (n is the mark data length), the ratio Ttop is set to 1.30 T, the duty ratio Tmp is set to 0.65 T, the ratio Ttail is set to 0.67 T, and the optimal recording power Pwmin is set to 9.0 mW. The setting values of the parameters mentioned, above are typical numerical values for the dye-based optical disks. A variety of tuning and different recording materials have respective, different optimal values.

Figure 16:
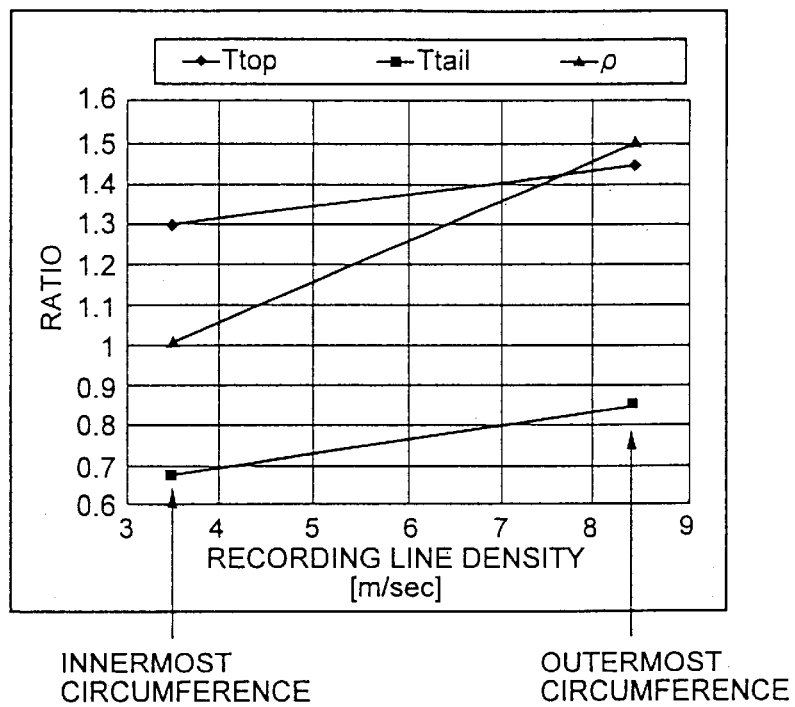
FIG. 16 is a graph showing the relationship between parameters Ttop, Ttail and ρ and the recording linear velocity involved in the third embodiment of the present invention.

As shown in FIG. 16, by increasing the setting values of the ratios Ttop and Ttail, and the ratio ρ (=Pw/Pwmin) as the recording linear velocity increases, it becomes possible to apply the optimal amount of heat to the mark head and tail portions and to record information with the optimal recording power. Thus, the uniform mark width can be obtained, so that jitter-reduced recording can be made.

Figure 17:
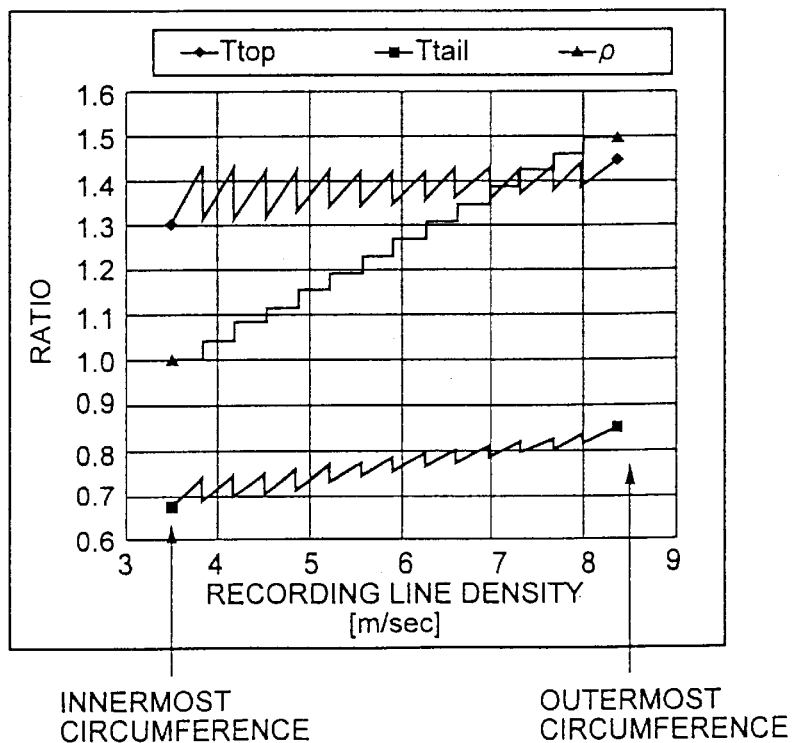
FIG. 17 is a graph showing a practical way to vary the values of the parameters Ttop, Ttail and ρ.
Figure 18:
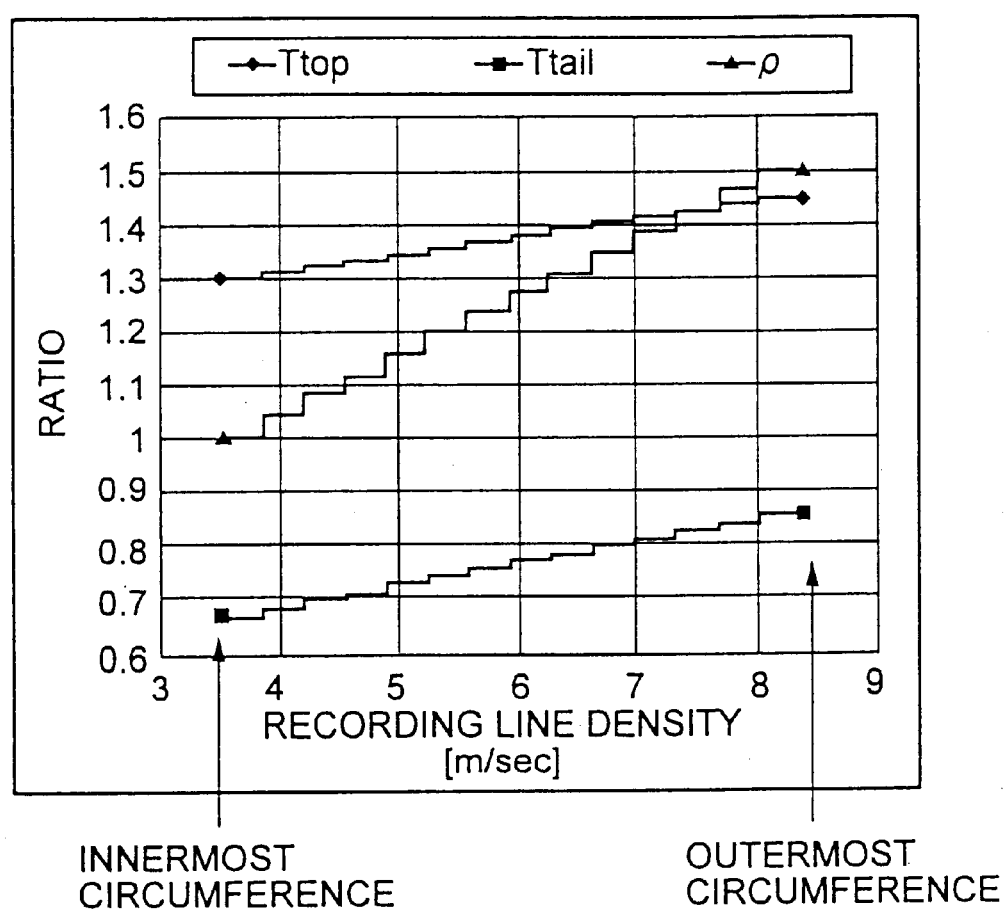
FIG. 18 is a graph showing another practical way to vary the values of the parameters Ttop, Ttail and ρ.

In the recording based on the CAV control in which the recording linear velocity depends on the radial position, the setting values of the parameters can be updated as follows. For example, as shown in FIGS. 17 and 18, the ratio Ttop of the width of the top heating pulse to the recording channel clock period T is changed from 1.30 T (approximately equal to 49.7 ns) in the innermost circumference position to 1.45 T (approximately equal to 22.8 ns) in the outermost circumference position. It will be noted that the FIG. 17 shows variations of the values of the parameters obtained when the multi-stage delay element 17 shown in FIG. 9 is used, and FIG. 18 shows the variations thereof obtained when the PLL circuit 17a is used.

The ratio Ttail of the width of the tail heating pulse to the recording channel clock period T is changed from 0.67 T (approximately equal to 33.3 ns) in the innermost circumference position to 0.85 T (approximately equal to 19.3 ns) in the outermost circumference position, so that the pulse width of the tail heating pulse to the recording channel clock period T is lengthened by 0.17 T in total. The rear edge of the top heating pulse and the rear edges of the pulses in the multi-pulse sections are constantly synchronized with the recording channel clock.

As for the setting of the recording power, the ratio ρ of the recording power to the maximum recording power Pwmin in the innermost circumference position changes from 1.0 to 1.50 and thus increases by 0.50 in total as the recording linear velocity increases.

Figure 19:
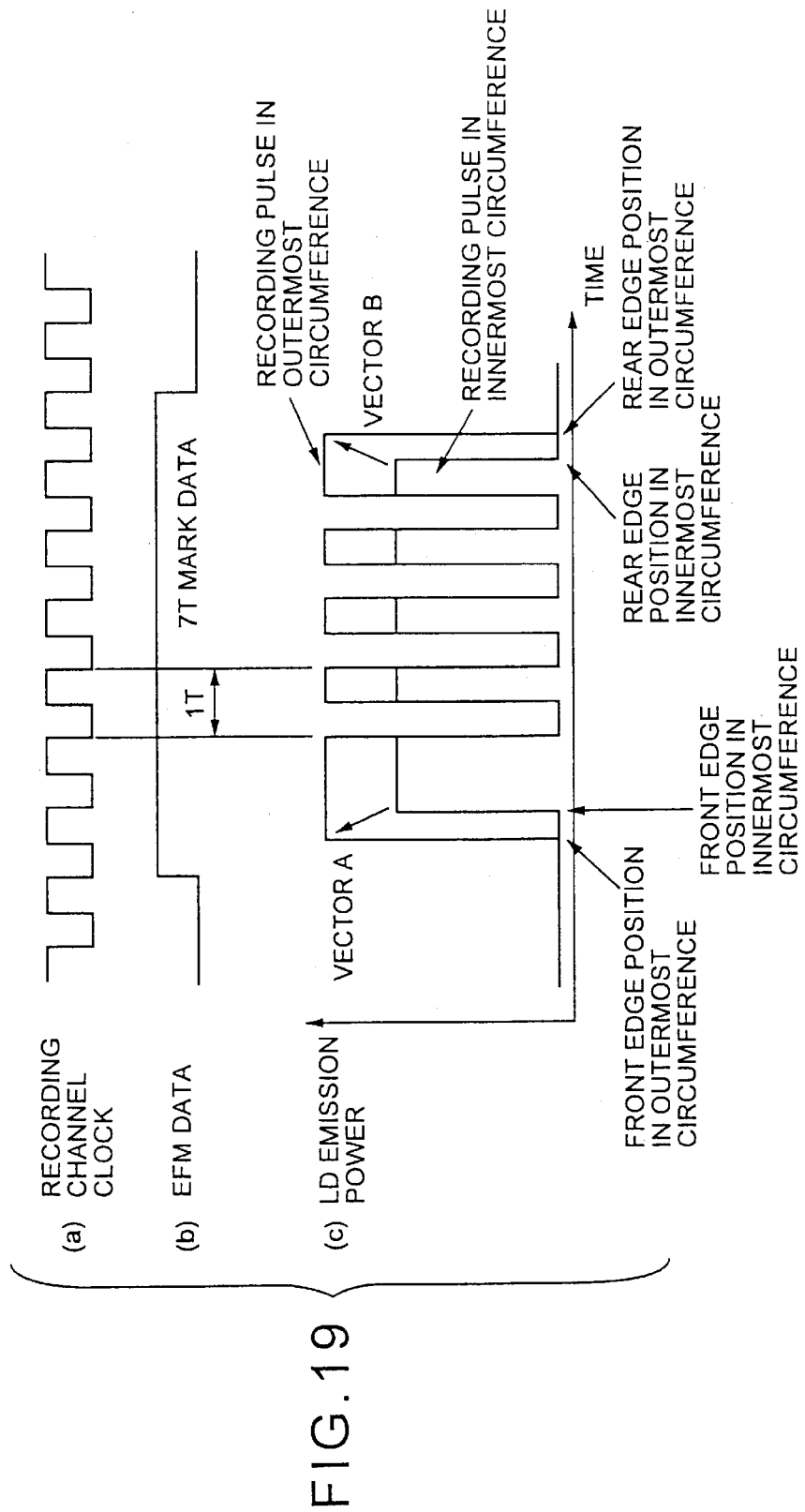
FIG. 19 is a waveform diagram showing how to modify the waveforms of the top and tail heating pulses according to the third embodiment of the present invention.

FIG. 19 shows a waveform diagram of two recording pulse trains (part (c)) associated with the recording channel clock (part (a)) and EFM data (part (b)) according to the third embodiment of the present invention. One of the two recording pulse trains, which are illustrated on the same time axis, is used in the innermost circumference position, and the other is used in the outermost circumference position. The EFM data shown in part (b) of FIG. 19 includes 7 T mark data.

According to the third embodiment of the present invention, the setting values of the front edge position of the top heating pulse, the rear edge position of the tail heating pulse, and the recording power Pw are updated in accordance with the recording linear velocity in order to change the setting values of the three ratios Ttop, Ttail and ρ. As indicated in vectors or arrows A and B in FIG. 19, the above-mentioned updating process is accomplished by, for example, changing the pulse width of the top heating pulse and the recording power thereof as well as the width of the tail heating pulse and the recording power thereof in accordance with the recording linear velocity so that the waveforms of these pulses are changed. It can be seen from the vectors A and B that the ratio of change of the pulse width of the top heating pulse and the direction thereof are different from those of the heating tail pulse.

Besides changing of the front edge position of the top heating pulse and the rear edge position of the tail heating pulse, it may be possible to change the rear edge position of the top heating pulse, the front edge position of the tail heating pulse, and the front and rear edge positions of each pulse in the intermediate section. However, this alternative may require a comparatively complex control process.

As to the setting of the recording power, in a case where an optimal recording power (Pwmin) of 9.0 mW is obtained by test writing at the minimum recording linear density in the innermost circumference position, a recording power of 13.6 mW can be obtained as the optimal recording power (Pwmax) at the maximum recording linear density in the outermost circumference position by increasing the ratio ρ up to 1.50 (ρ max).

By using the above-mentioned method of setting the recording power, it is possible to easily obtain the optimal values of the recording power at any recording point for optical disks having different sensitivity levels and to thus realize jitter-reduced uniform recording.

A further description will be given of the edge shift.

In the DVDs, data is recorded by EFM pulses. The minimum data length is 3 T, and the maximum data length is 14 T. When the mark data length is recorded, the front and rear edges of the mark are liable to shift due to a thermal accumulation depending on the mark data length. The edge shift is conspicuous when the mark data length is short as compared with the spot size ($1/e^2$) of the light beam. The greatest edge shift takes place when the recording data length is 3 T.

The spot size ($1/e^2$) of the light beam, where "e" is the base of natural logarithm, is obtained from an intensity distribution I of the light (laser) beam described by the following formula, where r denotes a distance from a center of the light beam, ω denotes a radius of the light beam ($1/e^2$ of the center intensity), and P denotes the power of the light beam (laser power).

$$I=(2P/\pi\omega^2))exp(-2r^2/\omega^2)$$

In the case where the recording layer is made of a dye material, a thermal interference between the neighboring marks depends on the space lengths immediately preceding and following the mark to be recorded. In this case, the front and rear edges of the mark may shift. The greatest edge shift takes place when the, minimum space length is 3 T.

Thus, according to the third embodiment of the present invention, the front and rear edges of the recording pulses are corrected so that the lengths of all recorded marks and those of all recorded spaces are accurately equal to an integer multiple of the recording channel clock period T.

Figure 20:
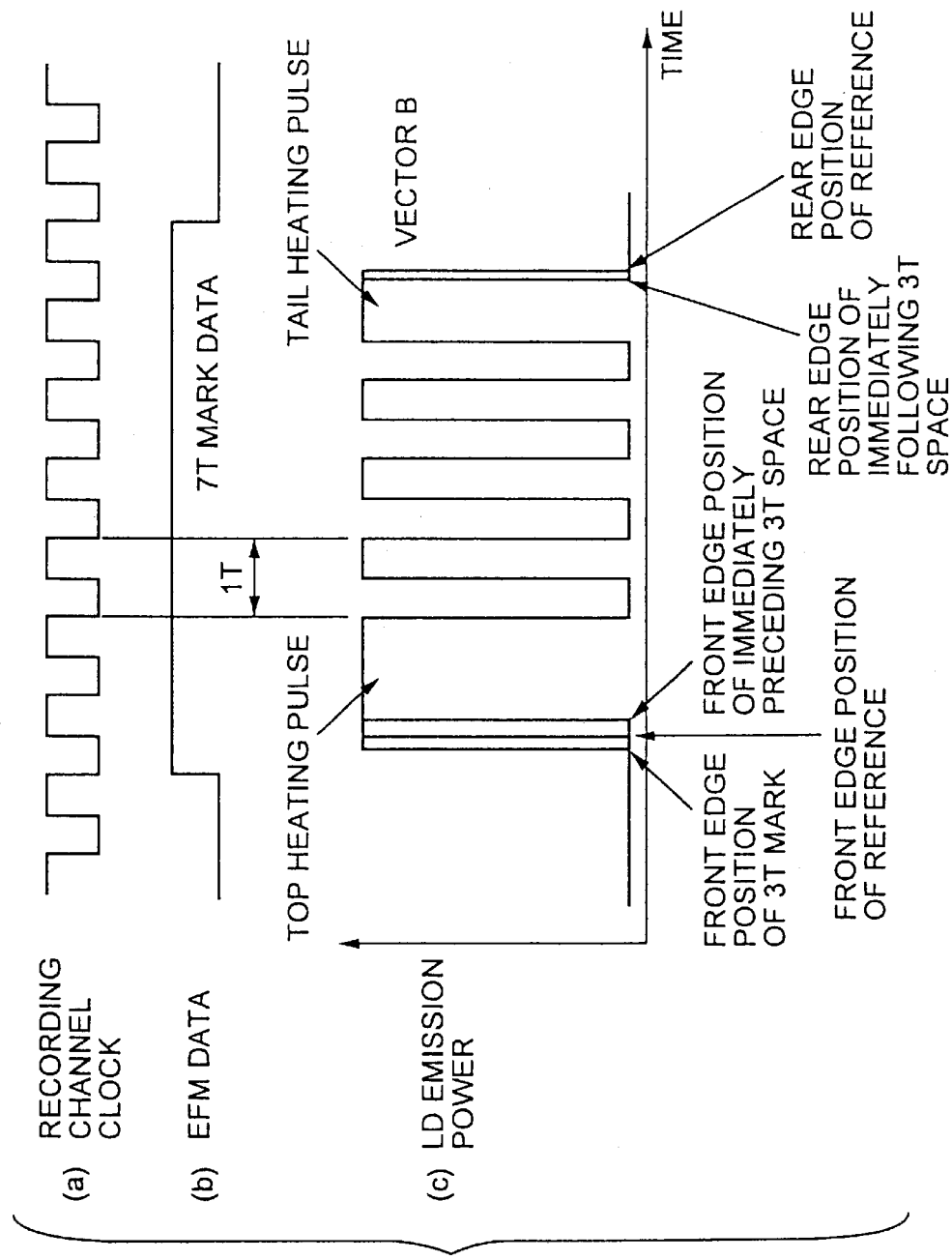
FIG. 20 is a waveform diagram showing corrections of the front edge position of the top heating pulse and the rear edge position of the tail heating pulse.

More specifically, as shown in FIG. 20, at the minimum recording linear velocity (in the innermost circumference position), the front edge position of the top heating pulse having the setting value equal to 1.30 T is corrected so that the pulse width of the top heating pulse to the recording channel clock period T is lengthened by +0.03 T and becomes equal to 1.33 T when the space length immediately preceding the mark to be formed is any of 4 T~14 T and the above mark is the minimum data length 3 T. In contrast, when the space immediately preceding the mark to be recorded has the minimum length 3 T and the length of the above mark is any of 4 T~14 T, the front edge position of the top heating pulse having the setting value equal to 1.30 T is corrected so that the pulse width of the top heating pulse is shortened by 0.05 T (lengthened by −0.05,T) and becomes equal to 1.25 T.

At the maximum recording linear velocity (in the outermost circumference position), the front edge position of the top heating pulse having the setting value equal to 1.45 T is corrected so that the pulse width of the top heating pulse is lengthened by +0.03 T and becomes equal to 1.48 T when the space length immediately preceding the mark to be formed is any of 4 T~14 T and the above mark is the minimum data length 3 T. In contrast, when the space immediately preceding the mark to be recorded has the minimum length 3 T and the length of the above mark is any of 4 T~14 T, the front edge position of the top heating pulse having the setting value equal to 1.45 T is corrected so that the pulse width of the top heating pulse is shortened by 0.07 T (lengthened by −0.07 T) and becomes equal to 1.38 T.

The degree of correction of the front edge position of the top heating pulse depends on the dye material forming the recording layer of the optical disk. However, the edge shift can be satisfactorily reduced when the edge shift dependent on the mark data length is corrected for only the following eight combinations (sT, mT) of the immediately length sT of the space immediately preceding the mark to be recorded and the length of the mark mT; (3 T, 3 T), (3 T, 4 T), (3 T, 5 T–14 T), (4 T, 3 T), (4 T, 4 T), (5 T–14 T, 3 T), (5 T–14 T, 4 T), (5 T–14 T, 5 T–14 T).

At the minimum recording linear velocity (in the innermost circumference position), the rear edge position of the tail heating pulse having the setting value equal to 0.67 T is corrected so that the pulse width of the tail heating pulse is shortened by 0.02 T and becomes equal to 0.65 T when the space following immediately the mark to be formed has the minimum length 3 T and the above mark is any of 4 T~14 T.

At the maximum recording linear velocity (in the outermost circumference position), the rear edge position of the tail heating pulse having the setting value equal to 0.85 T is corrected so that the pulse width of the tail heating pulse is shortened by 0.03 T and becomes equal to 0.82 T when the space following immediately the mark to be formed has the minimum length 3 T and the above mark is any of 4 T~14 T.

The degree of correction of the rear edge position of the tail heating pulse depends on the dye material forming the recording layer of the optical disk. However, the edge shift dependent on the mark data length can be satisfactorily reduced when the edge shift is corrected for only the following four combinations (sT, mT) of the immediately length sT of the space immediately preceding the mark to be recorded and the length of the mark mT; (3 T, 3 T), (3 T, 4 T), (3 T, 5 T–14 T), (4 T–14 T, 4 T–14 T).

As described above, it is possible to prevent the edge shift dependent on the mark data length and accomplish jitter-reduced recording by correcting the front and rear edge positions of the recording pulses in accordance with the data length of the mark to be recorded.

It is possible to correct the space length immediately following the tail heating pulse by an identical amount of correction with respect to a change of the recording linear velocity. Even in this case, jitter-reduced recording can be made over the entire optical disk surface. However, when the amount of correction of the pulse width of the tail heating pulse can be more suitably updated in accordance with the recording linear velocity or the combination of the mark length and the immediately following space length, it is possible to further reduce jitter.

Tables 2 through 5 show the setting values of the front heating pulse and the tail heating pulse suitable for correction of the front and rear edge positions.

TABLE 2

Top Heating Pulse Width
(Innermost Circumference: Minimum Linear Velocity)

| | | Mark Length To Be Recorded | |
|---|---|---|---|
| | | 3T | 4T~14T |
| Space Length Immediately Preceding Mark | 3T 4T~ 14T | 1.30T 1.33T | 1.25T 1.30T |

TABLE 3

Top Heating Pulse Width
(Outermost Circumference: Maximum Linear Velocity)

| | | Mark Length To Be Recorded | |
|---|---|---|---|
| | | 3T | 4T~14T |
| Space Length Immediately Preceding Mark | 3T 4T~ 14T | 1.45T 1.48T | 1.38T 1.45T |

TABLE 4

Tail Heating Pulse Width
(Innermost Circumference: Minimum Linear Velocity)

| | | Mark Length To Be Recorded | |
|---|---|---|---|
| | | 3T | 4T~14T |
| Space Length Immediately Preceding Mark | 3T 4T~ 14T | 0.67T 0.67T | 0.65T 0.67T |

TABLE 5

Tail Heating Pulse Width
(Outermost Circumference: Maximum Linear Velocity)

| | | Mark Length To Be Recorded | |
|---|---|---|---|
| | | 3T | 4T~14T |
| Space Length Immediately Preceding Mark | 3T 4T~ 14T | 0.85T 0.85T | 0.82T 0.85T |

The setting values of the parameters mentioned above are typically applied to the dye-based optical disks. A variety of tuning and different recording materials have respective, different optimal values. However, in recording by the CAV control, the values of the parameters Ttop, Ttail, ρ and Pw can be optimized with respect to the recording linear velocity irrespective of the dye material.

More particularly, the above-mentioned setting values of the parameters are those most typical to optical disks having the recording layers made of azo-based dye material. The inventors studied the setting of the values of the parameters for optical disks made of different dye material. It follows that an increase of the ratio Ttop obtained in the outermost circumference position with respect to that obtained in the innermost circumference position ranges from 0.05 T to 0.25

T. Similarly, Ttail increases within a range of 0.10 T to 0.30 T from the innermost circumference position to the outermost circumference position. With the above setting values of the parameters being used, comparatively good results are obtained with a large number of optical disks having different setting values of the parameters or different recording sensitivities (heating powers) when the increase of the ratio ρmax of the recording power Pw to that of the heating pulse at the maximum, recording linear velocity in the outermost circumference position ranges from 0.4 to 0.6.

The front edge position of the top heating pulse is corrected so that the pulse width of the top heating pulse is lengthened within a range of +0.02 T to +0.06 T with respect to the minimum mark data length 3 T and the front edge position of the top heating pulse is shortened by 0.02 T to 0.12 T when the space immediately preceding the above mark to be recorded has the minimum length 3 T. As to the correction of the pulse width of the tail heating pulse, the rear edge position thereof is corrected so that the pulse width thereof is shortened within a range of 0.02 T to 0.12 T when the space length immediately following the space length is the minimum 3 T. With the setting of the parameter values, it is possible to make jitter-reduced uniform recording on a large number of optical disks having different degrees of the thermal interference dependent on the dye material.

In the third embodiment of the present Invention, the following linear approximation equations using the aforementioned concept of equation ρ=Klv×Lv+Kpw may be used to obtain the values to the parameters Ttop, Ttail and Pw with respect to all the possible recording power velocities Lv:

$$Ttop = 0.030 \times Lv + 1.195$$

$$Ttail = 0.036 \times Lv + 0.544$$

$$Pw = Pwmin \times (0.100 \times Lv + 0.650)$$

Alternatively, it is possible to update the setting of the recording pulse as a function of the radial position. Even in the above alternative, it is possible to easily obtain the optimal values of the parameters with respect to any recording linear velocity Lv.

The interval for updating the parameter values used in the third embodiment of the present invention should be determined taking into account the difference in asymmetry before and after the parameter values are updated. More particularly, the interval is determined so that the asymmetry difference preferably falls within the range of +10%, and more preferably +5%.

The updating of the value of each of the four parameters Ttop, Ttail, ρmax and Pw yields the respective effect. However, the variations in the characteristics of the RF signal interact on each other. Thus, it is preferable to update the values of all of the four parameters. Of course, it is possible to obtain the greatest effect when the values of all the four parameters Ttop, Ttail, ρmax and Pw are updated.

In the third embodiment of the present invention, the values of the parameters may be updated at intervals of approximately 0.35 m/s as in the case of the first and second embodiments of the present invention. As the intervals for updating are reduced, the jitter characteristic can be improved. It is also possible to update the parameter values in a stepwise formation having a step equal to the minimum resolution level of the pulse edge generator made of the aforementioned multi-stage delay element 17.

The flowchart of FIG. 8 can be applied to the control of the third embodiment of the present invention. It will be noted that the parameters Ttop, Ttail and Pw(ρ) are controlled by the sequence shown in FIG. 8.

The block configuration of an information recording apparatus according to the third embodiment of the present invention may be the same as shown in FIG. 9 or FIG. 14. In the configuration shown in FIG. 9 equipped with the multi-stage delay element 17 acting as the pulse edge generator, the values of the parameters Ttop, Ttail and Pw(ρ) are updated as shown in FIG. 17. When the PLL circuit 17a shown in FIG. 14 is used, the values of the parameters Ttop, Ttail and Pw(ρ) are updated as shown in FIG. 18.

The multi-stage delay element 17 used in the third embodiment of the present invention includes a multi-stage delay part, which delays the EFM data from the EFM encoder 13. The edge selector 16 has an AND gate which performs an AND operation on the delayed EFM data and the original EFM data. The resultant signal of the AND operation is a tail heating pulse control signal (rear edge signal).

The PLL circuit 17a used in the third embodiment of the present invention includes a PLL circuit part which generates the tail heating pulse control signal. This part generates a high-resolution clock by multiplying the frequency of the recording channel clock by 20. The pulse edge signal has a resolution of 0.05 T, that is, 1.9 ns to 0.8 ns. The PLL circuit part for generating the top heating pulse control signal has the same resolution level as mentioned above.

The optimal or recommended values of the parameters Ttop, Ttail and power Pw at the minimum, maximum and intermediate recording linear velocities may be preformatted in the optical disk or superimposed on the information embedded in the groove formed therein.

Also, the aforementioned manner using trail write can be used to obtain the optimal recording power. More particularly, the optimal values of the recording power can be determined more accurately as follows. One or both of the test writing areas respectively arranged in the innermost and outermost circumference positions are used to obtain the recording power for the minimum recording linear velocity and that for the maximum recording linear velocity. Trial writing is performed at two or more different recording linear velocities including the minimum and maximum recording linear velocities. The optimal values of the recording power thus obtained are used to correct the values of the recording power obtained from the wobble signal or to replace them.

A description will be given of a fourth embodiment of the present invention, which is directed to dye-based optical disks as in the case of the first through third embodiments thereof.

FIG. 20 shows a recording pulse train used in the fourth embodiment of the present invention. As shown in FIG. 20, the recording pulse train with respect to the mark data length nT includes to a top (first) heating portion and a subsequent (second) or rear heating portion.

As shown in FIG. 20 one mark is formed by a single pulse of the recording pulse train.

Two parameters are defined with respect to the waveform widths of the top heating portion and the rear heating portion of the recording pulse train shown in FIG. 20. That is, the first parameter is a ratio Ttop of the width of the top heating portion to the recording channel clock period T. The second parameter is a ratio of the pulse width of the rear heating portion to the recording channel clock period T. The setting of the recording power is controlled by a recording power Ptop of the top heating portion and a recording power Prear of the rear heating portion where Ptop>Prear. Further, a bias power Pb for the space between the adjacent marks is defined. The recording power forming the mark has a strong correlation with the recording linear velocity Lv. More specifically, as the recording linear velocity Lv increases, the optimal value of the recording power increases. Now, two parameters are defined with regard to the recording power. The first parameter is a ratio ρ of the recording power in a radial position (a recording linear velocity) to the optimal recording power Prearmin at the minimum recording linear velocity (ρ=Prear/Prearmin). The second parameter is a ratio ε of the recording power of the top heating portion to that of the rear heating portion (ε=Ptop/Prear).

According to the fourth embodiment of the present invention, the setting values of the parameters Ttop and ε are controlled in a unique method as described below. It is also possible to control the front edge position of the top heating portion and the rear haring portion in accordance with the length of the mark to be recorded and the space lengths immediately preceding and following the above mark.

As has been described previously, problems such as fluctuations of the modulation factor and asymmetry arise when a recording which requires a change of the recording linear velocity as large as approximately 2.4 times is performed by a recording pulse train and a recording power which are uniform over the entire recording area. Further, the ratio ε of the top heating portion and the rear heating portion deviates from the optimal value. This causes the recording mark width to be uneven and thus degrades the jitter characteristic. With the above in mind, the fourth embodiment of the present invention is directed to realize the uniform signal characteristics over the recording area between the innermost circumference position and the outermost circumference position and to improve the jitter characteristic.

Figure 22:
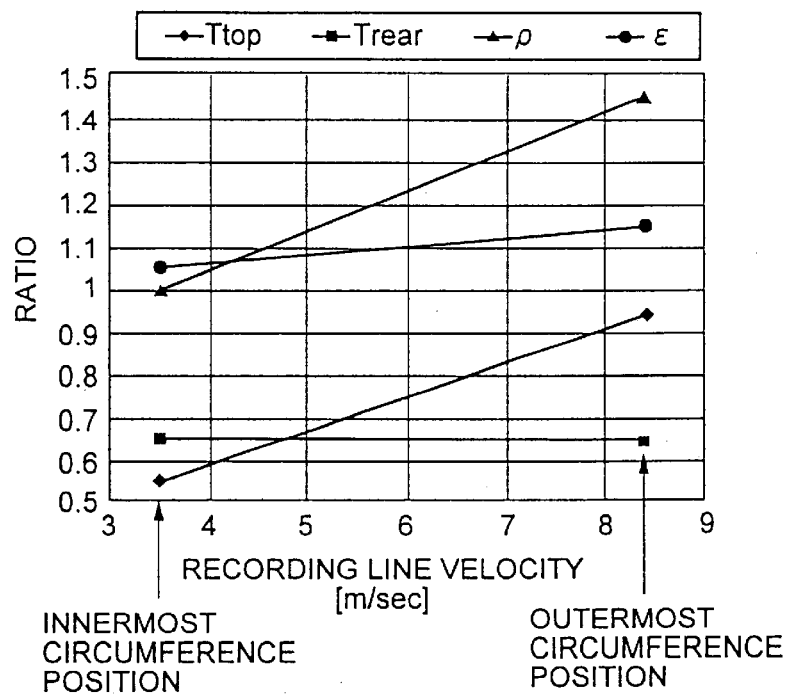
FIG. 22 is a graph showing the relationship between parameters Ttop, Trear, ρ and ε the recording linear velocity involved in the fourth embodiment of the present invention.

As shown in FIG. 22, at the minimum recording linear velocity in the innermost circumference position, with respect to the mark data length nT, the ratio Ttop is set to 0.55 T, the ratio Trear is set to 0.65 T+(n−3)T, and the total pulse length (the length of the top heating portion and that of the rear heating portion) is set to (n−1.8)T, the recording power Ptop for the top heating portion is set to 8.2 mW, and the recording power Prear for the rear heating portion is set to 7.8 mW. The setting values of the parameters mentioned above are typically applied to the dye-based optical disks. A variety of tuning and different recording materials have respective, different optimal values. As shown in FIG. 22, by increasing the setting values of the ratios Ttop and ρ (=Ptop/Prear) as the recording linear velocity increases, it becomes possible to apply the optimal amount of heat to the mark head portion and to record information with the optimal recording power. Thus, the uniform mark width can be obtained, so that jitter-reduced recording can be made.

Figure 23:
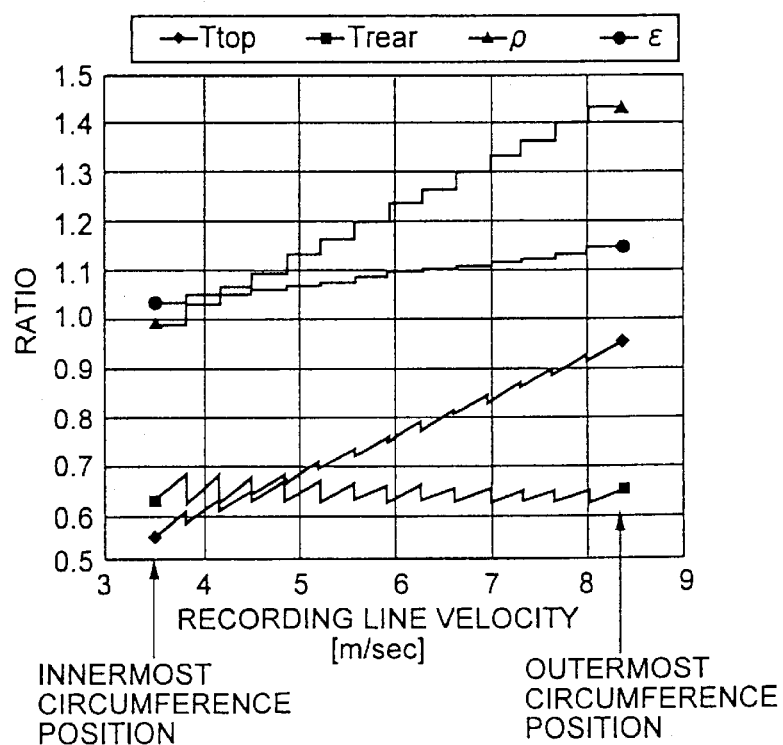
FIG. 23 is a graph showing a practical way to vary the values of the parameters Ttop, Trear, ρ and ε.
Figure 24:
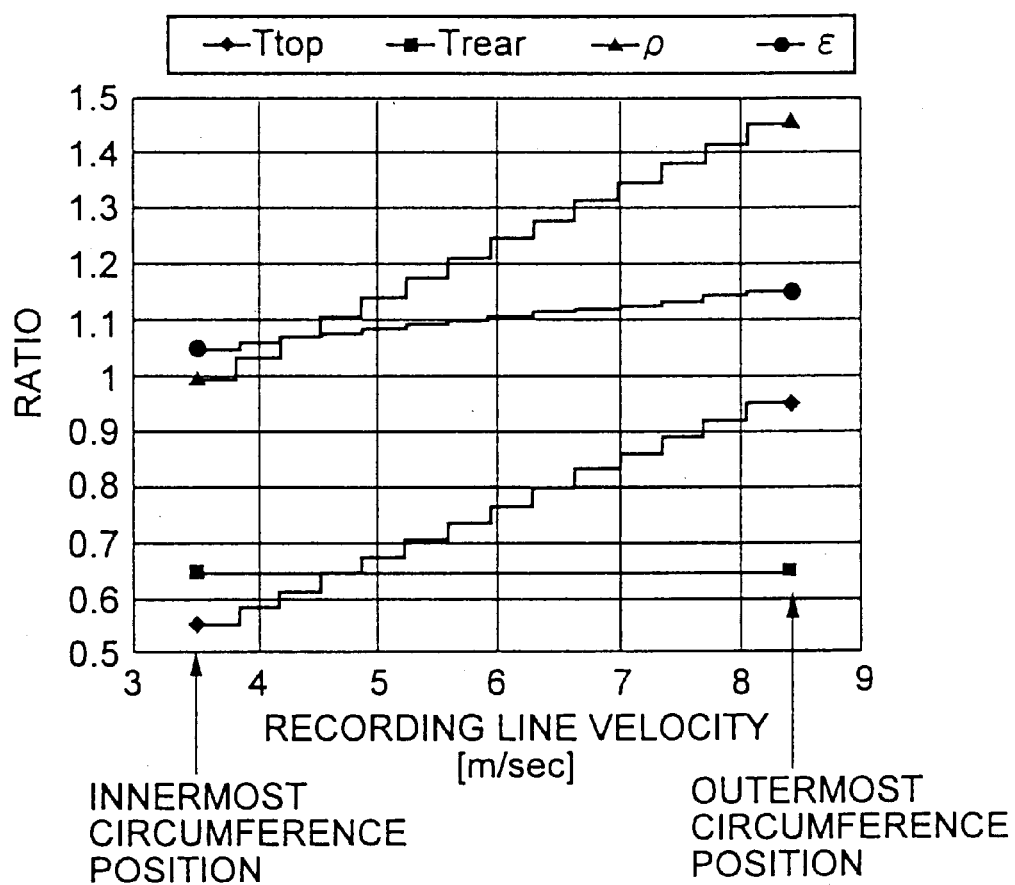
FIG. 24 is: a graph showing another practical way to vary the values of the parameters Ttop, Trear, ρ and ε.

In the recording based on the CAV control in which the recording linear velocity depends on the radial position, the setting values of the parameters can be updated as follows. For example, as shown in FIGS. 23 and 24, the ratio Ttop of the width of the top heating portion to the recording channel clock period T is changed from 0.55 T (approximately equal to 21.0 ns) in the innermost circumference position to 0.95 T (approximately equal to 14.9 ns) in the outermost circumference position. Thus, the pulse width of the top heating portion to the recording channel clock period T is increased by 0.4 T from the innermost circumference position to the outermost circumference position. It will be noted that FIG. 23 shows variations of the values of the parameters obtained when the multi-stage delay element 17 shown in FIG. 9 is used, and FIG. 18 shows the variations thereof obtained when the PLL circuit 17a shown in FIG. 14 is used.

The ratio Trear of the width of the rear heating portion to the recording channel clock period T is set equal to a fixed value of 0.65 T (approximately equal to 24.8 ns) independently of the recording linear velocity Lv. Further, the rear edge of the top heating portion (which is also the front edge of the rear heating portion) is set so as to be constantly synchronized with the recording channel clock.

As for the setting of the recording power, the ratio ρ (=Prear/Prearmin) of the recording power to the maximum recording power Prear in a radial position to the optimal recording power Prearmin at the minimum recording linear velocity in the innermost circumference position changes from 1.0 to 1.45 and thus increases by 0.45. The ratio ε (=Ptop/Prear) of the recording power Ptop of the top heating portion to the recording power Prear of the rear heating portion is set to 1.05 at the minimum recording linear velocity in the innermost circumference position and is set to 1.15 at the maximum recording linear velocity in the outermost circumference position. Thus, the ratio ε of the recording power increases by 0.10 from the innermost circumference position to the outermost circumference position.

Figure 25:
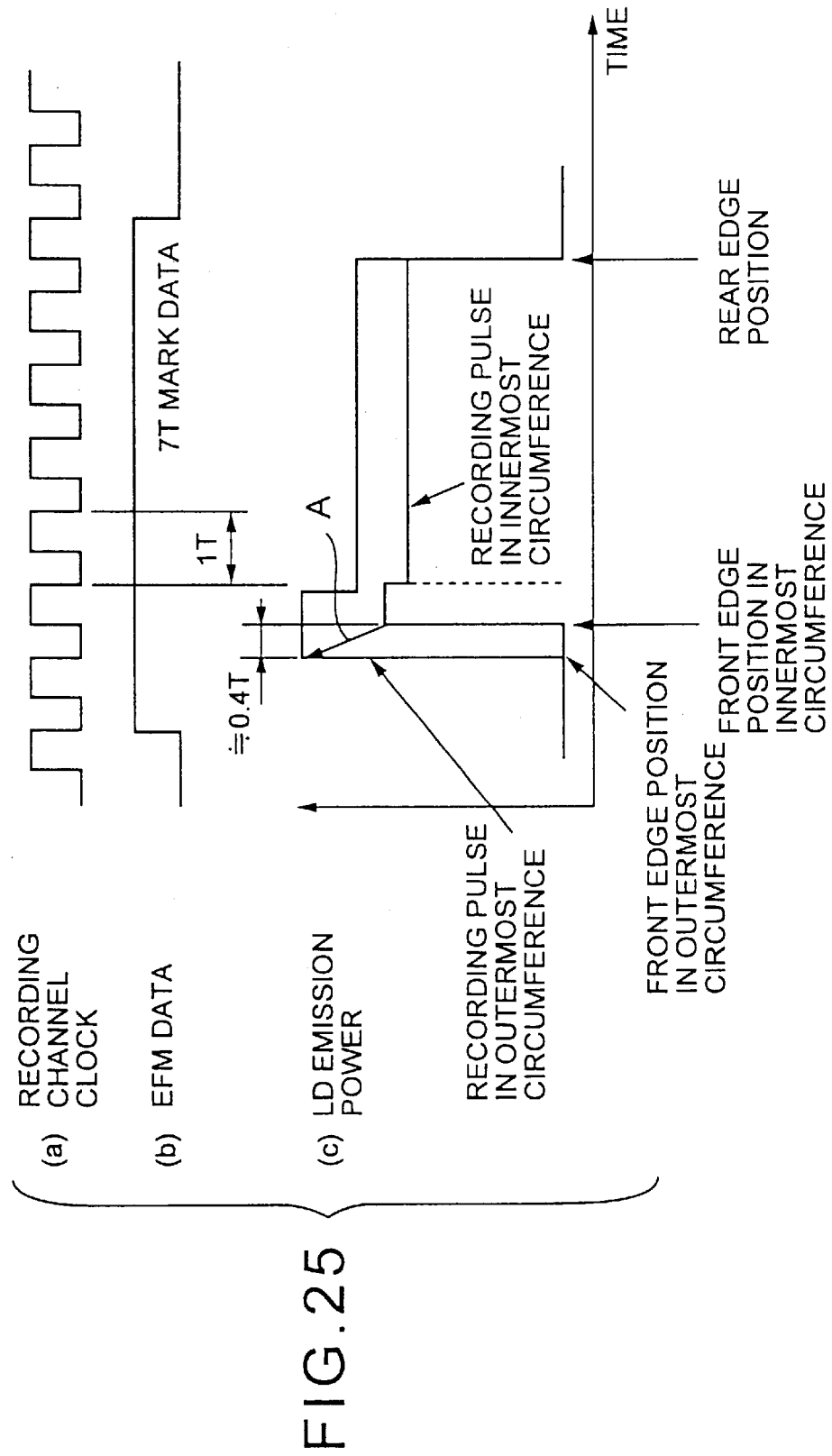
FIG. 25 is a waveform diagram showing how to modify the waveforms of the top (first) and rear (second) portions of: the recording pulse train according to the fourth embodiment of the present invention.

FIG. 25 shows a waveform diagram of two recording pulse trains (part (c)) associated with the recording channel clock (part (a)) and EFM data (part (b)) according to the fourth embodiment of the present invention. One of the two recording pulse trains which are illustrated on the same time axis, is used in the innermost circumference position, and the other is used in the outermost circumference position. The EFM data shown in part (b) of FIG. 25 includes 7 T mark data. As shown in FIG. 25, the front edge position of the top heating portion and the setting values of the recording powers Ptop and Prear are updated in accordance with the recording linear velocity so that the ratios Ttop and ε are changed.

As indicated in a vector or arrow A in FIG. 25, the above-mentioned updating process is accomplished by changing, at least, the pulse width of the top heating portion and the recording power thereof in accordance with the recording linear velocity so that the waveform of the pulse is changed. It can be seen from the vector A that the ratio of change of the width of the top heating portion and the ratio of change of the recording power thereof are different from each other.

Besides changing of the front edge position of the top heating portion while the rear edge positions of the top and rear heating portions, it may be possible to change the rear edge position of the rear heating portion in order to change the pulse width of the top heating portion. However, this alternative may require a comparatively complex control process.

As to the setting of the recording power, in a case where the optimal recording powers Ptopmin and Prearmin are respectively obtained as 8.2 mW and 7.8 mW by test writing at the minimum recording linear density in the innermost circumference position, the recording powers Ptopmax and Prearmax are respectively obtained as 13.0 mW and 11.3 mW at the maximum recording linear density in the outermost circumference position in accordance with the aforementioned ratios ρ and ε.

By using the above-mentioned method of setting the recording power, it is possible to easily obtain the optimal values of the recording power at any recording point for optical disks having different sensitivity levels and to thus realize jitter-reduced uniform recording.

As has been described previously, in the DVDs, data is recorded by EFM pulses. The minimum data length is 3 T, and the maximum data length is 14 T. When the mark data length is recorded, the front and rear edges of the mark is liable to shift due to a thermal accumulation depending on the mark data length. The edge shift is conspicuous when the mark data length is short as compared with the spot size ($1/e^2$) of the light beam. The greatest edge shift takes place when the recording data length is 3 T.

Thus, according to the fourth embodiment of the present invention, the front and rear edges of the recording pulses are corrected so that the lengths of all recorded marks and those of all recorded spaces are equal to an integer multiple of the recording channel clock period T.

Figure 26:
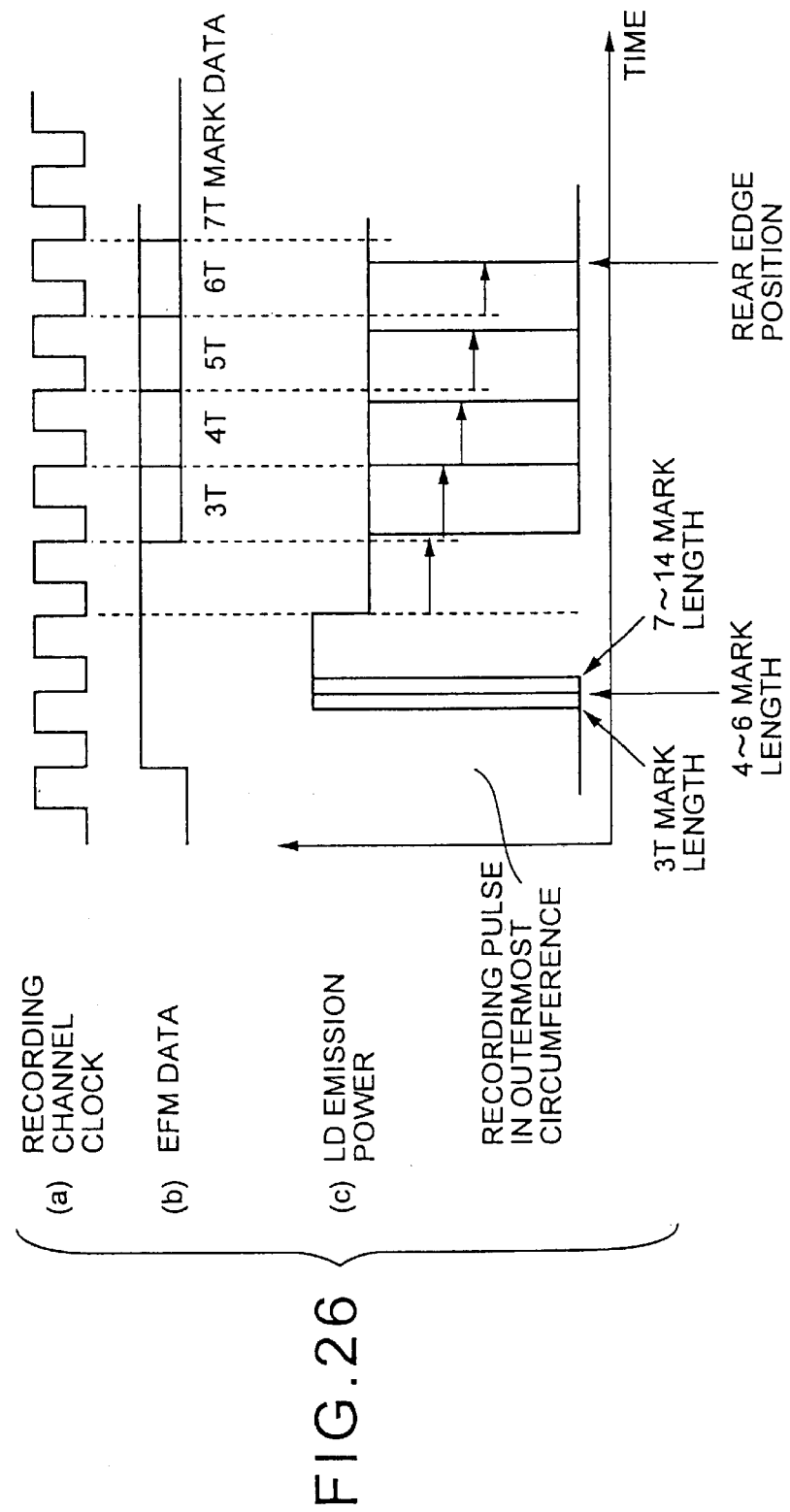
FIG. 26 is a waveform diagram showing corrections of the front edge position of the top heating portion and the rear edge position of the rear heating portion.

More specifically, as shown in FIG. 26, the front edge position of the top heating portion having the setting value equal to 0.55 T is corrected so that the width of the top heating portion to the recording channel clock period T is lengthened by +0.25 T and becomes equal to 0.80 T when the mark to be formed has the minimum data length 3 T, and is lengthened by +0.10 T and becomes equal to 0.65 T when the mark to be formed has a data length of 4 T or 5 T. Further when the mark to be formed has a data length of 6 T, the front edge position of the top heating portion is corrected so that the pulse width is lengthened by +0.10 T and is thus increased to 0.65 T in order to realize finer correction.

Similarly, the rear edge portion of the rear heating portion having the setting value equal to 0.65 T+(n−3)T is corrected so that the pulse width of the rear heating portion is lengthened by +0.45 T and becomes equal to 1.10 T+(n−3)T=1.10 T when the mark to be formed has the minimum data length 3 T, and is lengthened by +0.20 T and becomes equal to 0.85 T+(n−3)T=1.85 T when the mark to be formed has a data length of 4 T. Similarly, the rear edge portion of the rear heating portion having the setting value equal to 0.65 T+(n−3)T is corrected so that the pulse width of the rear heating portion is lengthened by +0.10 T and becomes equal to 0.75 T+(n−3)T=2.75 T when the mark to be formed has a length of 5 T. In order to make a finer edge correction, the rear edge portion of the rear heating portion having the setting value equal to 0.65 T+(n−3)T is corrected so that the pulse width of the rear heating portion is lengthened by +0.05 T and becomes equal to 0.70 T+(n−3)T=3.70 T when the mark to be formed has a length of 6 T.

In practice, such a finer edge correction may not be necessarily required. However, the finer edge correction for 6 T mark data will contribute to further suppressing the edge shift.

As described above, it is possible to prevent the edge shift dependent on the mark data length and accomplish jitter-reduced recording by correcting the front and rear edge positions of the recording pulses in accordance with the data length of the mark to be recorded.

Tables 6 through 9 show the setting values of the front heating portion and the rear heating portion suitable for making correction of the front and rear edge positions.

TABLE 6

Waveform Width Of Top Heating Portion
(Innermost Circumference: Minimum Linear Velocity)
Length Of Mark To Be Recorded

| 3T | 4T | 5T | 6T | 7T~14T |
|---|---|---|---|---|
| 0.80T | 0.65T | 0.65T | 0.60T | 0.55T |

TABLE 7

Waveform Width Of Rear Heating Portion
(Innermost Circumference: Minimum Linear Velocity)
Length Of Mark To Be Recorded

| 3T | 4T | 5T | 6T | 7T~14T |
|---|---|---|---|---|
| 1.10T + (n − 3)T | 0.85T + (n − 3)T | 0.75T + (n − 3)T | 0.70T + (n − 3)T | 0.65T + (n − 3)T |

TABLE 8

Waveform Width Of Top Heating Portion
(Outermost Circumference: Maximum Linear Velocity)
Length Of Mark To Be Recorded

| 3T | 4T | 5T | 6T | 7T~14T |
|---|---|---|---|---|
| 1.20T | 1.00T | 1.00T | 1.00T | 0.95T |

TABLE 9

Waveform Width Of Rear Heating Portion
(Outermost Circumference: Maximum Linear Velocity)
Length Of Mark To Be Recorded

| 3T | 4T | 5T | 6T | 7T~14T |
|---|---|---|---|---|
| 1.05T + (n − 3)T | 0.85T + (n − 3)T | 0.75T + (n − 3)T | 0.70T + (n − 3)T | 0.65T + (n − 3)T |

The setting values of the parameters mentioned above are typically applied to the dye-based optical disks. A variety of tuning and different recording materials have respective, different optimal values. However, in recording by the CAV control, the pulse widths and the setting values of recording power ($\rho$, $\epsilon$, Ptop, Prear) can be optimized with respect to the recording linear velocity irrespective of the dye material.

The above-mentioned setting values of the parameters are those most typical to optical disks having the recording layers made of a particular dye material. The Inventors studied the setting of the values of the parameters for optical disks made of different dye material. It follows that an increase of the ratio Ttop obtained in the outermost circumference position with respect to that obtained in the innermost circumference position ranges from 0.3 T to 0.5 T. similarly, the ratio $\epsilon$ (=Ptop/Prear) increases within a range of 0.05 to 0.15 from the innermost circumference position to the outermost circumference position. With the above setting values of the parameters being used, good results are obtained with a large number of optical disks having different setting values of the parameters or different recording sensitivities (heating powers).

The front edge position of the top heating portion is corrected so that the pulse width of the top heating portion to the recording channel clock period T is lengthened by +0.15 T to +0.35 T with respect to the minimum mark data length 3 T, and is lengthened by +0.05 T to +0.15 T with respect to a mark data length of 4 T or 5 T. The rear edge of the rear heating portion is corrected. so that the pulse width thereof to the recording channel clock period T is lengthened by +0.35 T to +0.65 T with respect to the minimum mark data length 3 T, and is lengthened by +0.05 T to +0.35 T. With the setting of the parameter values, it is possible to make uniform recording on a large number of optical disks made of different dye materials.

The front edge position of the top heating portion of the recording pulse which forms a mark to be located immediately following a space having the minimum space length 3 T is corrected so that the pulse width of the top heating portion to the recording channel clock period T is changed by −0.05 T to +0.05 T in accordance with a variation in the recording linear velocity. With the setting of the parameter values, it is possible to make jitter-reduced uniform recording on a large number of optical disks having different degrees of the thermal interference dependent on the dye material.

In the fourth embodiment of the present invention, the following linear approximation equations using the aforementioned concept of equation ρ=Klv×Lv+Kpw may be used to obtain the values to the parameters Ttop, Prear and ε with respect to all the possible recording power velocities Lv:

$$Ttop = 0.08 \times Lv + 0.26$$

$$Prear = Prearmin \times \rho$$

$$= Prearmin \times (0.09 \times Lv + 0.68)$$

$$\varepsilon = 0.02 \times Lv + 0.98$$

Alternatively, it is possible to update the setting of the recording pulse as a function of the radial position. Even in the above alternative, it is possible to easily obtain the optimal values of the parameters with respect to any recording linear velocity Lv.

Alternatively, it is possible to update the setting of the recording pulse as a function of the radial position. Even in the above alternative, it is possible to easily obtain the optimal values of the parameters with respect to any recording linear velocity Lv.

It is preferable to correct the front edge position of the top heating portion so that the ratio Ttop changes in accordance with the data length to be recorded on the dye-based optical disks, as in the case of the first through third embodiments of the present invention. As has been described previously, generally, the recording layer containing a dye material has a property such that the amount of heat accumulated in the recording layer depends on the space length immediately preceding the mark to be recorded. Due to such a property, the front edge of the mark may shift. The above phenomenon is particularly conspicuous when the space immediately preceding the mark has the minimum space length 3 T. The fourth embodiment of the present invention can be modified so as to correct the front edge position of the top heating portion in accordance with the space length immediately preceding the mart to be recorded. More particularly, as shown in Tables 10 and 11, there is a difference of 0.10 T between the front edge position of the top heating portion used when the space length immediately preceding the mark to be formed is 3 T and that used when the space length immediately preceding the mark to be formed is any of 4 T to 14 T. With the above, reduction in jitter can be facilitated. The setting of the pulse width of the rear heating portion is as shown in Tables 6 through 9.

TABLE 10

Pulse Width Of Top Heating Portion
(Innermost Position: Minimum Recording Linear Velocity)

| | | Mark Length To Be Recorded | | | | |
|---|---|---|---|---|---|---|
| | | 3T | 4T | 5T | 6T | 7T~14T |
| Space Length | 3T | 0.70T | 0.55T | 0.55T | 0.50T | 0.45T |
| Immediately Preceding Mark | 4T~14T | 0.80T | 0.65T | 0.65T | 0.60T | 0.55T |

TABLE 11

Pulse Width Of Top Heating Portion
(Innermost Position: Minimum Recording Linear Velocity)

| | | Mark Length To Be Recorded | | | | |
|---|---|---|---|---|---|---|
| | | 3T | 4T | 5T | 6T | 7T~14T |
| Space Length | 3T | 1.10T | 0.90T | 0.90T | 0.90T | 0.85T |
| Immediately Preceding Mark | 4T~14T | 1.20T | 1.00T | 1.00T | 1.00T | 0.95T |

The fourth modification of the present invention uses recording data that is EFM modulated. In this case, the front edge position of the top heating portion is corrected so that the width of the top heating portion is reduced by 0.10 T when the immediately preceding space length is 3 T and the mark to be recorded is any of the mark lengths 3 T~14 T. It is possible to obtain satisfactory effects by applying the identical amount of correction to any of the possible mark lengths 4 T~14 T. Alternatively, if the front edge positions are differently corrected for the combinations of (3 T, 3 T), (3 T, 4 T) and (3 T, 5 T), further improved results will be obtained. The correction of the front edge of the top heating portion can be made for all the combinations of the mark length and its immediately preceding space length. However, there are not considerable improvement in jitter reduction for an immediately preceding space length of 4 T or longer.

The above-mentioned front edge correction is suitable for any possible value of the recording linear velocity Lv in the recording by the CAV control. The amount of correction of the front edge position of the top heating portion of the recording pulse at the minimum recording linear velocity in the innermost circumference position is approximately equal to −0.38 ns (−0.10 T). The amount of correction of the front edge position at the maximum recording linear velocity in the outermost circumference position is approximately equal to −0.16 ns (−0.10 T). It will be noted that the amount of correction with respect to the recording channel clock period T at the minimum recording linear velocity is the same as that at the maximum recording linear velocity. When the space immediately preceding the mark to be recorded has the minimum length, the front edge position of the top heating portion of the recording pulse for forming the mark is corrected by an identical amount of correction with respect to a change of the recording linear velocity in the CAV recording so that the pulse width thereof is reduced. Thus, it is possible to realize jitter-reduced uniform recording over the entire optical disk surface. It is possible to further reduce jitter by optimizing the amount of correction in accordance with the combination of the mark and the immediately preceding mark.

The amount of correction ranging from −0.05 T to −0.15 T can be applied to optical disks that are different in terms of the dye material and tuning of the groove formation.

The interval for updating the parameter values used in the fourth embodiment of the present invention should be determined taking into account the asymmetry difference before and after the parameter values are updated. More particularly, the interval is determined so that the asymmetry difference preferably falls within the range of ±10%, and more preferably ±5%.

In the fourth embodiment of the present invention, the values of the parameters may be updated at intervals of approximately 0.35 m/s as in the case of the first through third embodiments of the present invention. As the interval for updating is reduced, the jitter characteristic can be improved. It is also possible to update the parameter values in a stepwise formation having a step equal to the minimum resolution level of the pulse edge generator made of the aforementioned multi-stage delay element 17.

The updating of the value of each of the three parameters Ttop, Trear, ρ and ε yields the respective effect. However, the variations in the characteristics of the RF signal interact on each other. Thus, it is preferable to update the values of all the four parameters by the above-mentioned method.

The flowchart of FIG. 8 can be applied to the control of the fourth embodiment of the present invention. It will be noted that the parameters processed in accordance with the flowchart of FIG. 8 are Ttop, Trear, ρ and ε.

The block configuration of an information recording apparatus according to the fourth embodiment of the present invention may be the same as shown in FIG. 9 or FIG. 14. In the configuration shown in FIG. 9 equipped with the multi-stage delay element 17 acting as the pulse edge generator, the values of the parameters Ttop, Trear, ρ and ε are updated as shown in FIG. 23. When the PLL circuit 17a shown in FIG. 14 is used, the values of the parameters Ttop, Trear, ρ and ε are updated as shown in FIG. 24.

The multi-stage delay element 17 used in the third embodiment of the present invention includes a multi-stage delay part, which delays the EFM data from the EFM encoder 13. The edge selector 16 has an AND gate which performs an AND operation on the delayed EFM data and the original EFM data. The resultant signal of the AND operation is a rear heating portion control signal.

The PLL circuit 17a used in the third embodiment of the present invention includes a PLL circuit part which generates the rear heating portion control signal. This part generates a high-resolution clock by multiplying the frequency of the recording channel clock by 20. The pulse edge signal has a resolution of 0.05 T, that is, 1.9 ns to 0.8 ns. The PLL circuit part for generating the top heating pulse control signal has the same resolution level as mentioned above.

The optimal or recommended values of the parameters Ttop and Trear at the minimum, maximum and intermediate recording linear velocities may be preformatted in the optical disk or superimposed on the information embedded in the groove formed therein. Also, the recommended or optical values of Ptop, Prear, ρ and ε are also preformatted or superimposed.

A description will now be given, with reference to FIGS. 27 and 28, of a fifth embodiment of the present invention, which is directed to a phase-change type optical disk such as a DVD-RW.

Figure 27:
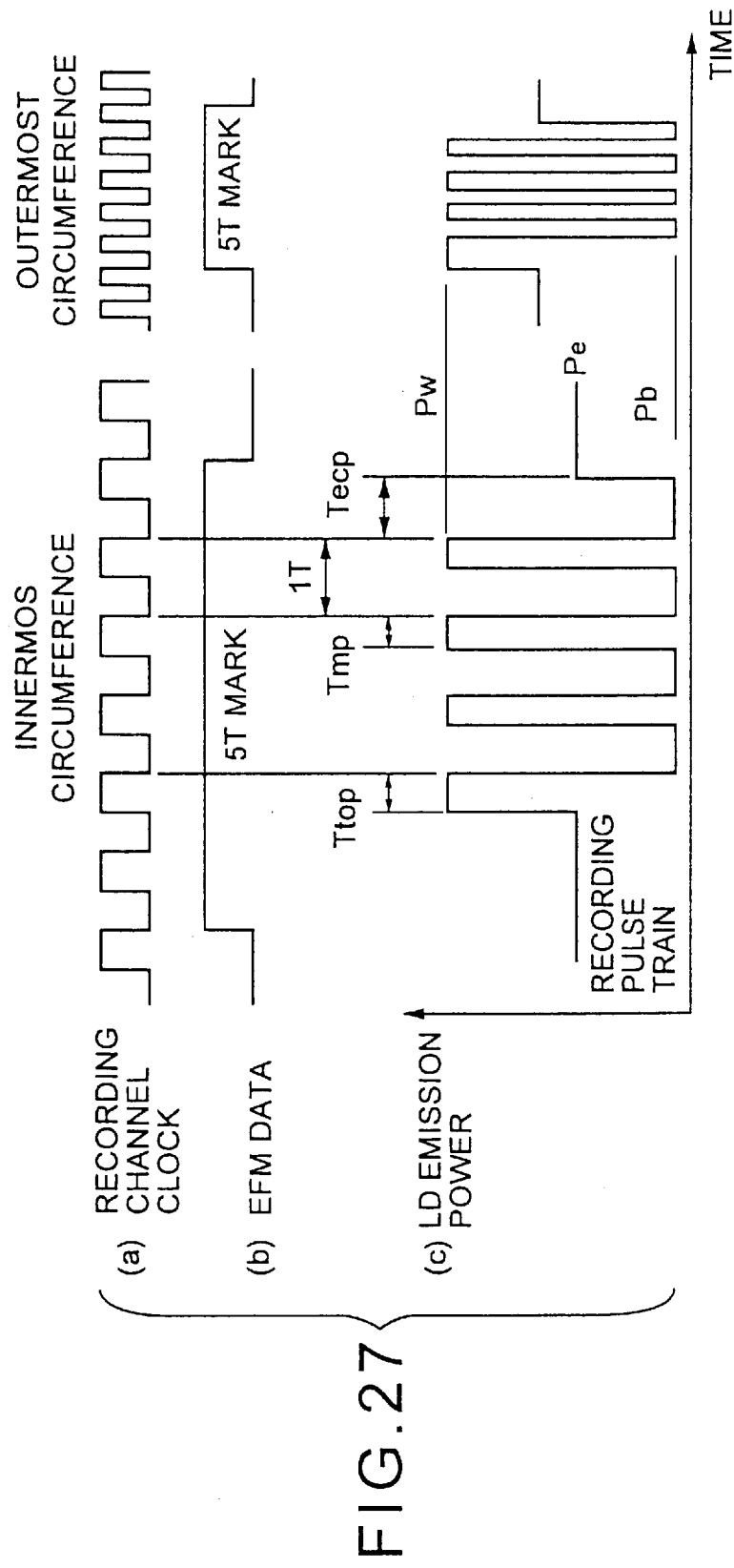
FIG. 27 is a waveform diagram of signals including a recording pulse train controlled by a fifth embodiment of the present invention.
Figure 28:
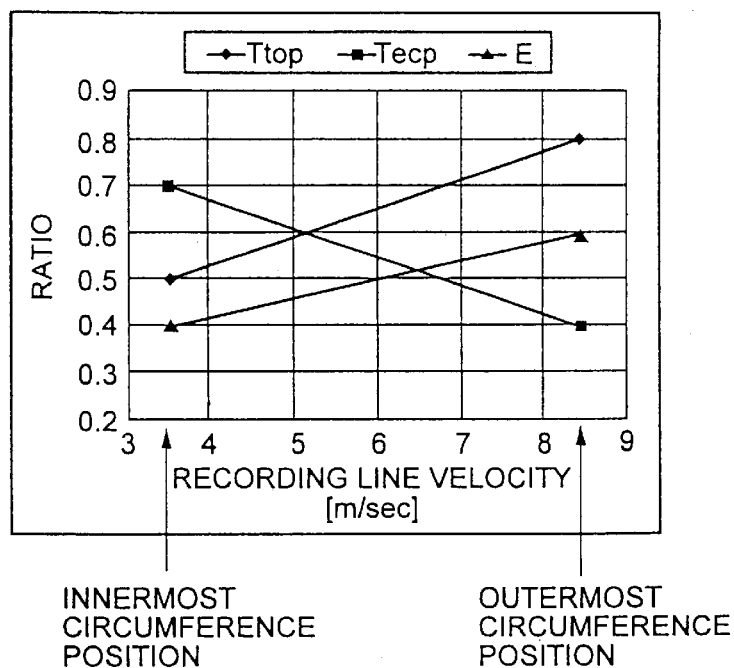
FIG. 28 is a graph showing the relationship between parameters Ttop, Tecp and E and the recording linear velocity involved in the fourth embodiment of the present invention.

The phase-change type optical disk uses a recording pulse train as shown in part (c) of FIG. 27. The following three parameters are involved in the setting of the pulse widths of the recording pulse train. The first parameter is the aforementioned ratio Ttop of the pulse width of the top heating pulse of the recording pulse train to the recording channel clock period. The second parameter is the aforementioned ratio Tmp of each pulse located in a multi-pulse section following the top heating pulse. The third parameter is a ratio Tecp of the pulse width of an end cooling pulse to the recording channel clock period T.

Further, the following parameters are involved in the setting of the recording power of the recording pulse train. The first and second parameters of the recording power are the aforementioned heating power Pw and bias power Pb. The third parameter of the recording power is an erasing power Pe. The mark formation has a strong correlation with the erasing power Pe and the heating power Pw. Thus, a ratio E of the erasing power to the heating power Pw is defined. According to the fifth embodiment of the present invention, the parameter values Ttop, Tecp and E are updated by a unique method as will be described below.

When recording in a phase-change type DVD having a diameter of 120 mm is made by the CAV control, the recording linear velocity is equal to 3.5 m/s in the innermost circumference of the disk and 8.5 m/s in the outermost circumference thereof, and the recording channel clock frequency is equal to 26.2 MHz in the innermost circumference and 63.7 MHz in the outermost circumference. It will be noted that the following problems arise when a recording which requires a change of the recording linear velocity as large as approximately 2.4 times is performed by a recording pulse train and a recording power which are uniform over the entire recording area. As the recording linear velocity becomes high, pre-heating by the top heating pulse becomes insufficient. Thus, the modulation factor of the RF signal may fluctuate, and an increased dispersion of the asymmetry of the RF signal occurs, as the recording linear velocity becomes high (as the position moves towards the outer circumference). Thus, as shown in FIG. 28, the setting value of the parameter Ttop is updated so as to increase as the recording linear velocity increases. Thus, a sufficient amount of heat can be applied, so that the mark can be formed reliably.

Also, the erasing power needed at the time of overwrite reduce and becomes insufficient as the recording linear velocity increases. Thus, the jitter-characteristic may be degraded due to a failure in erasing. Hence, as shown in FIG. 28, the setting value of the erasing power ratio E is updated so as to increase as the recording linear velocity increases. Thus, a sufficient amount of erasing power can be applied, so that the mark can be formed reliably.

Further, the cooling rate increases as the recording linear velocity increases. Thus, the average length of the mark formed becomes long, so that the asymmetry of the RF signal increases. With the above in mind, as shown in FIG. 28, the setting value of the ratio Pecp is updated so as to decrease as the recording linear velocity increases. As a result of the updating mentioned above, it is possible to obtain the uniform RF signal characteristic at different recording linear velocities.

Figure 29:
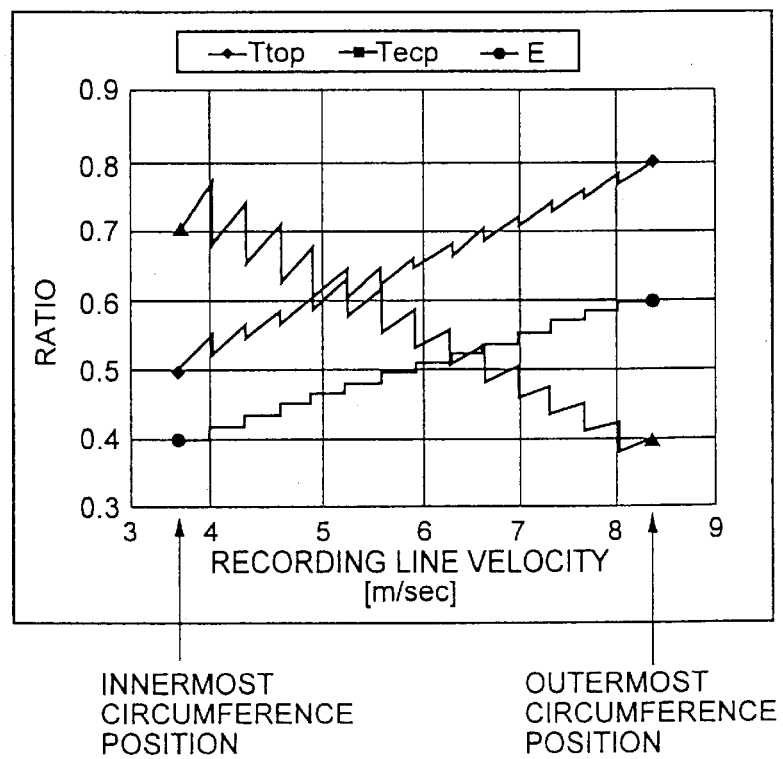
FIG. 29 is a graph showing a practical way to vary the values of the parameters Ttop, Tecp and E.

In practice, the setting values of the parameters Ttop, Tecp and E are updated as shown in FIG. 29 in which the aforementioned PLL circuit 17a shown in FIG. 14 is used. As shown in FIG. 29, the setting value of the ratio Ttop of the pulse width of the top heating pulse to the recording linear velocity is updated so as to change from 0.5 T (approximately equal to 19.1 ns) in the innermost circumference position to 0.8 T (approximately equal to 12.6 ns) in the outermost circumference position, so that the pulse width of the top heating pulse is lengthened by 0.3 T in total.

The interval for updating the setting value of the ratio Ttop is approximately equal to 0.35 m/s in a stepwise formation.

Similarly, the setting value of the ratio Tecp is updated so as to change from 0.7 T (approximately equal to 26.7 ns) in the innermost circumference position to 0.4 T (approximately equal to 6.3 ns), so that the pulse width of the end cooling pulse is shortened by 0.3 T in total. The setting value of the ratio Tecp may be updated at intervals of approximately 0.35 m/s.

The erasing power Pe is updated so as to change from 0.4 in the innermost circumference position to 0.6 in the outermost circumference position by controlling the laser diode in the optical head 4 by means of the LD driver 19 shown in FIG. 9 or FIG. 14.

By increasing the setting values of the parameters Ttop, Tecp and E as the recording linear velocity increases as described above, the reproduced RF signal has a suppressed degradation of the modulation factor, asymmetry and jitter. Thus, it is possible to realize a large number of times that information is overwritten.

The above-mentioned setting values of the parameters Ttop, Tecp and E are typically applied to an AgInSbTe-based phase-change optical disk. When information is recorded on the AgInSbTe-based phase-change optical disk, amorphous formation highly depends on a variation in the rapid cooling condition of heating to cooling due to a change of the recording linear velocity. Hence, the parameters Ttop, Tecp and E involved in the front and rear edges of the mark have an influence on the shape of the edges and the size of the mark. Hence it is required to accurately control the edges and shape of the mark. The optimal values of the parameters of the recording pulse train can be obtained from a linear approximation. It is comparatively ease to control the mark length when the AgInSbTe-based recording material is used.

However, it is possible to select different parameter values by taking into consideration the tuning and material composition used. There are known phase-change DVDs-RW containing GeSbTe, GeTeSbS, TeGeSnAu, GeTeSn, SbSe, SbSeTe, SnSeTe, GaSeTe, GaSeTeGe, InSe, InSeTe, or AgInSbTe. The setting values of the parameters of the recording pulse train used for the above-mentioned phase-change DVDs-RW can be carried out in the same manner as that for AgInSbTe-based phase-change DVD-RW. This is because the relationship between emission power and jitter, the overwrite characteristic and the relationship between the recording pulse width and the mark length of the AgInSbTe-based DVD-RW are basically the same as those of the DVDs-RW using the above-mentioned other materials.

In the recording by the CAV control, it is preferable that the setting values of the parameters Ttop, Tecp and E are updated so as to range from 0.2 T to 1.0 T, 1.0 T to 0.2 T and 0.3 to 0.7, respectively. The values of the parameters Ttop and E are increased, and the value of the parameter E is decreased as the recording linear velocity increases.

The interval for updating the parameter values used in the fifth embodiment of the present invention should be determined taking into account the difference in asymmetry before and after the parameter values are updated. More particularly, the interval is determined so that the asymmetry difference preferably falls within the range of ±10%, and more preferably ±5%.

The updating of the value of each of the four parameters Ttop, Tecp and E yields the respective effect. However, the variations in the characteristics of the RF signal interact on each other. Thus, it is preferable to update the values of two of the three parameters. Of course, it is possible to obtain the greatest effect when the values of all the four parameters Ttop, Tecp and E are updated.

The optimal or recommended values of the parameters Ttop, Tecp and E at the minimum, maximum and intermediate recording linear velocities may be preformatted in the optical disk or superimposed on the information embedded in the groove formed therein.

The flowchart of FIG. 8 can be applied to the control of the third embodiment of the present invention. It will be noted that the parameters Ttop, Tecp and E are controlled by the sequence shown in FIG. 8.

The block configuration of an information recording apparatus according to the fifth embodiment of the present invention may be the same as shown in FIG. 9 or FIG. 14. In the configuration shown in FIG. 9 equipped with the multi-stage delay element 17 acting as the pulse edge generator, the values of the parameters Ttop, Tecp and E are updated as shown in FIG. 29. In addition to the current sources that generate the heating power Pw and the bias power Pb, the drive current source 18 includes a current source which generates the erase power Pe controlled according to the fifth embodiment of the present invention. The recording pulse train generator 15 includes a part for generating an erase pulse control signal.

In addition to the updating of the setting values of the parameters Ttop, Tecp and E, it is possible to update the parameter value of the duty ratio Tmp of the pulse width of each heating pulse in the multi-pulse section to the recording channel clock period T. It is also possible to substitute the duty ratio Tmp for the ratio E.

Figure 30:
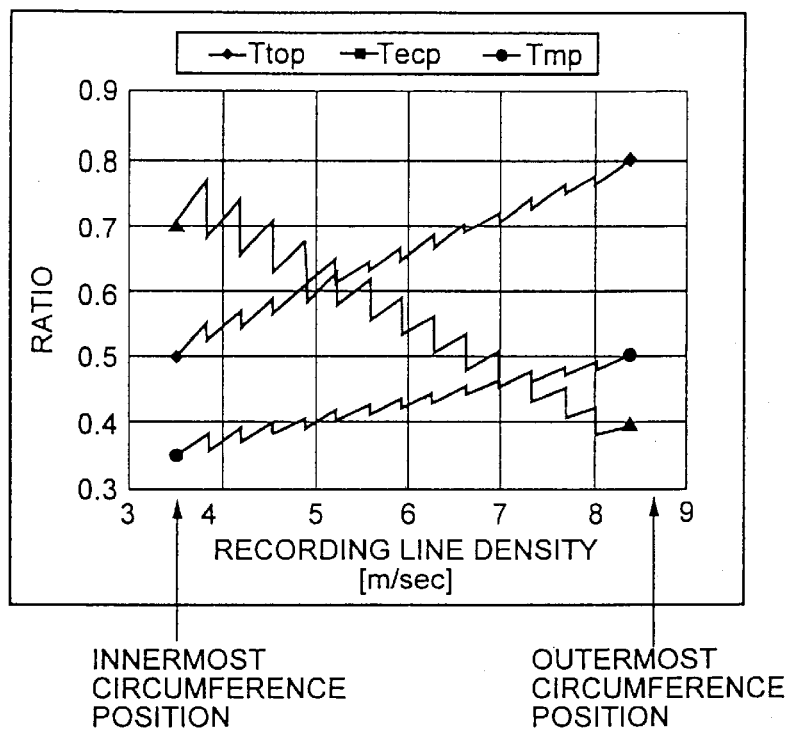
FIG. 30 is a graph showing another practical way to vary the values of the parameters Ttop, Tmp and E in which Tmp is substituted for Tecp shown in FIG. 29.

As shown in FIG. 30, the setting value of the duty ratio Tmp is changed from 0.35 T (approximately equal to 13.4 ns) in the innermost circumference position to 0.50 T (approximately equal to 7.9 ns) in the outermost circumference position, so that the pulse width of each heating pulse in the multi-pulse section is lengthened by 0.15 T in total. Preferably, the total variation of the setting value of the duty ratio Tmp ranges from 0.15 T to 0.20 T in recording by the CAV control to the phase-change optical disks. The interval for updating the setting value of the duty ratio Tmp is, for example, approximately 0.35 m/s. Thus, it is possible to determine the optical values of the pulse widths of the heating pulses in the multi-pulse section and to thus make the jitter-reduced recording over the entire disk surface.

Figure 31:
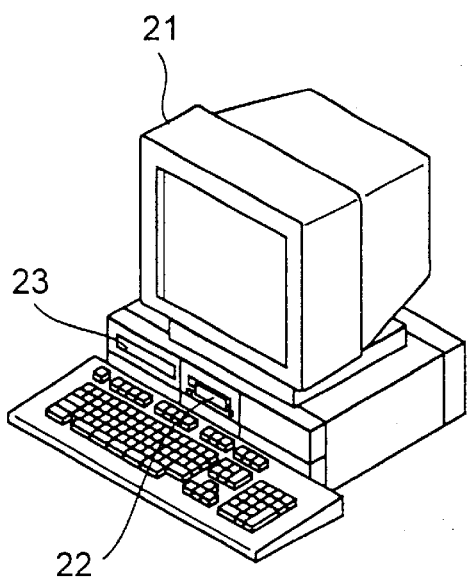
FIG. 31 is a perspective view of an information processing apparatus to which the information recording method of the present invention is applied.

FIG. 31 is a perspective view, of an information processing apparatus to which the information recording method and apparatus of the present invention is applied. The information processing apparatus shown in FIG. 31 is a personal computer 21 equipped with a display main body, and a keyboard. A floppy-disk drive 22 and a DVD drive 23 are attached to the main body of the personal computer 21. The DVD driver 23 employs any of the first through fifth embodiments of the present invention. The DVD driver 23 is a DVD-R drive or DVD RW drive and is configured as shown in FIG. 9 or FIG. 14. The optical disk 1 illustrated in FIG. 9 or FIG. 14 is inserted into the DVD driver 23, and is controlled in accordance with the sequence of any of the first through fifth embodiments of the present invention shown in FIG. 8. The rotational velocity of the optical disk 1 is maintained constant by the CAV control. Information can be recorded on the entire recording surface of the optical disk 1 in accordance with the regulated uniform signal characteristics while the compatibility with the existing reproduction-dedicated media is ensured.

The aforementioned preformatted or superimposed information may be stored in a memory built in the personal computer 21.

The present invention is not limited to the specifically disclosed embodiments and modifications, and various variations and other modifications may be made without departing from the scope of the present invention.

It is possible to arbitrarily combine the first through fifth embodiments of the present invention. For example, the third embodiment of the present invention can be applied to the second embodiment thereof. More particularly, it is possible to control the tail heating pulse shown in FIG. 10 in the same manner as shown in FIG. 15. In this case, the setting value of the ratio Ttail of the pulse width of the tail heating pulse (indicated by symbol * in FIG. 10) to the recording channel clock period T in addition to the parameters Ttop, Tmp, Tcptop and ρ originally controlled in the second embodiment of the present invention. The ratio Ttail is controlled to increase within a range of 0.10 T to 0.30 T from the innermost circumference position to the outermost circumference position.

According to the above combined arrangement, it is possible to realize further improved jitter-reduced recording.

Next, a description will be given of the demands to be satisfied by a sixth embodiment of the present invention which will be described later.

According to the CAV-control-based recording method, the setting value of an element of the recording pulse signal, such as a duty ratio of the optical beam emitted from the optical source, is variably controlled depending on the recording linear velocity. However, this kind of control has a fixed effect on the optical disk, and is insufficient with respect to optical media such as the DVD. In addition, as in the case of the CD-R which can make a recording at a higher velocity (X-times speed recording or multi-speed recording) with respect to a reference recording velocity, there are demands to similarly make a high-speed recording on the DVD by realizing the X-times speed recording in a wide range of X, where X is 1, 2, 4, 5, 8, 10 or the like.

However, the change in characteristic of the recording information (RF signal), such as the jitter characteristic, is caused by interaction of a plurality of factors. For this reason, it is not always possible to record the recording information with a uniform signal characteristic on the entire recording surface of the optical disk using the known recording method. In addition, it is not always possible to obtain the desired effects when the recording velocity is set within a wide range.

Accordingly, when recording information on the rotating optical disk using the recording pulse signal having a top heating portion and a rear heating portion, the sixth embodiment records the information with a uniform signal characteristic on the entire recording surface of the optical disk using a simple method, without variably controlling the rotational speed of the optical disk and while maintaining compatibility with the recording format of the conventional reproduction-dedicated (or read-only) optical recording media. Moreover, the sixth embodiment carries out the recording at a recording velocity which is selected within a wide range, so that the information is recorded with a good signal characteristic for each recording velocity that is selected within the wide range.

The sixth embodiment of the present invention will now be described with reference to FIGS. 32 through 36. The block configuration of an information recording apparatus according to the sixth embodiment of the present invention may be similar to that shown in FIG. 9, and a description thereof will be omitted.

Figure 21:
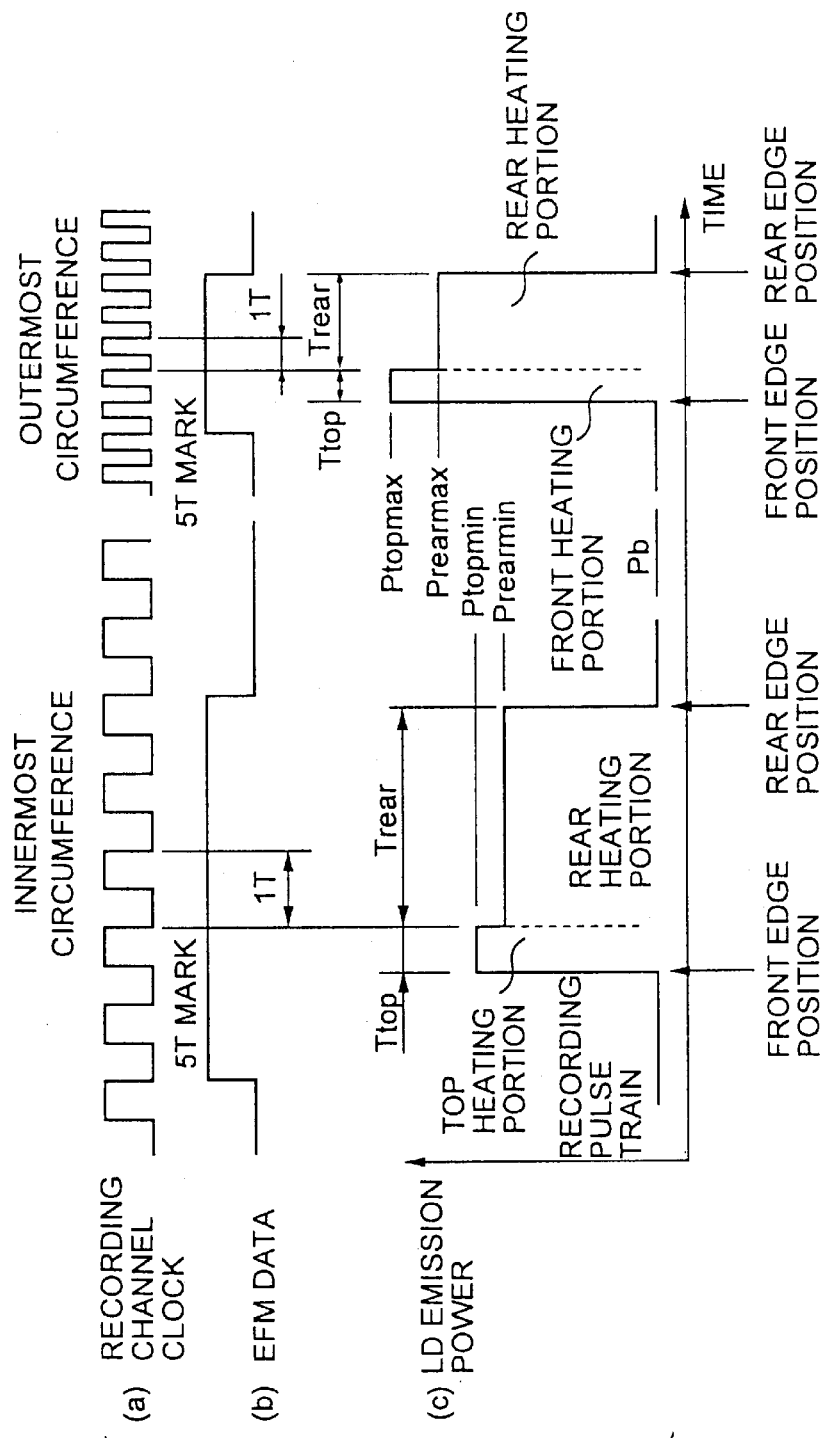
FIG. 21 is a waveform diagram of signals including a recording pulse train controlled by a fourth embodiment of the present invention.
Figure 32:
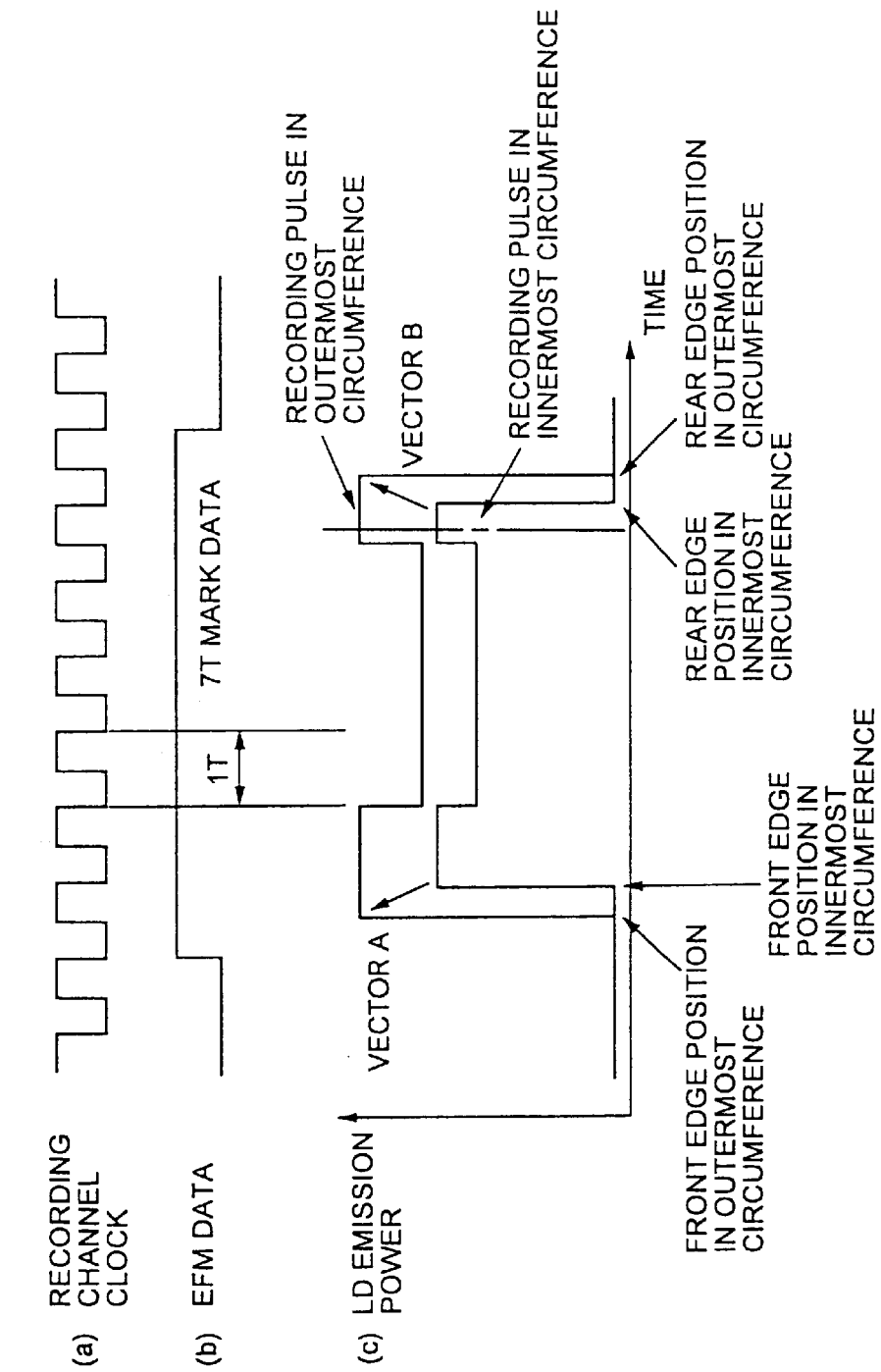
FIG. 32 is a waveform diagram showing how to modify the waveforms of the top and tail heating pulses according to a sixth embodiment of the present invention.
Figure 33:
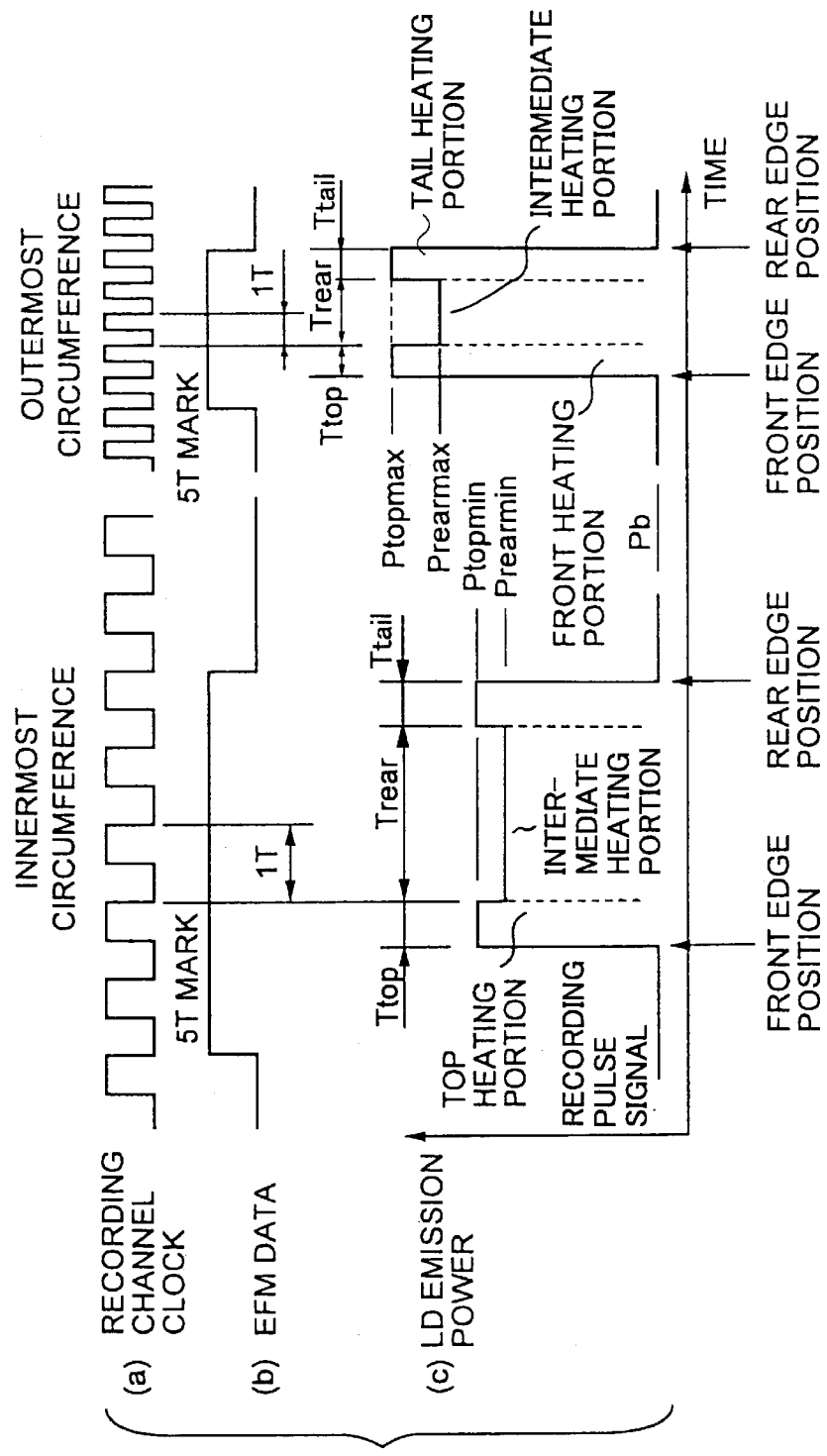
FIG. 33 is a waveform diagram of signals including a recording pulse signal controlled by the sixth embodiment of the present invention.

FIG. 32 is a waveform diagram showing how to modify the waveforms of the top and tail heating pulses (portions) according to the sixth embodiment of the present invention. In addition, FIG. 33 is a waveform diagram of signals including a recording pulse signal controlled by the sixth embodiment of the present invention. In FIGS. 32 and 33, those parts which are the same as those corresponding parts in FIGS. 19 and 21 are designated by the same reference numerals, and a description thereof will be omitted. As may be seen from FIGS. 32 and 33, the recording pulse signal does not have a continuous multi-pulse waveform between the top (first) heating portion and the tail (second or end) heating portion.

In the sixth embodiment, the recording pulse signal of the light beam emitted from the optical source, with respect to a mark data length nT, includes a top heating portion and a tail heating portion, as shown in FIGS. 32 and 33. A ratio of a pulse width of the top heating portion with respect to the recording channel clock period T is denoted by Ttop, a ratio of a pulse width of the intermediate heating portion of the recording pulse signal with respect to the recording channel clock period T is denoted by Trear, and a ratio of a pulse width of the tail heating portion with respect to the recording channel clock period T is denoted by Ttail. The recording power is set so that the top and tail heating portions have a recording power Ptop, and the intermediate heating portion has a recording power Prear, where Ptop>Prear. Further, a bias power Pb for the space between the adjacent marks is defined.

The recording power forming the mark has a strong correlation with the recording linear velocity Lv. More specifically, as the recording linear velocity Lv increases, the optimal value of the recording power increases. Now, two parameters are defined with regard to the recording power. The first parameter is a ratio ρ (ρ=Ptop/Prearmin) of the recording power in an arbitrary radial position (recording linear velocity) to an optimal recording power Prearmin at a minimum circumference position, that is, a minimum recording linear velocity. The second parameter is a ratio ε (ε=Ptop/Prear) of the recording power of the top and tail heating portions to that of the intermediate heating portion.

According to the sixth embodiment of the present invention, the setting values of the parameters Ttop, Ttail, ρ and ε are finely controlled as described below.

When recording in a dye-based DVD having a diameter of 120 mm is made by the CAV control with the recording linear set to two times the velocity of the reference velocity of the DVD, the recording linear velocity is approximately 7 m/s in the innermost circumference of the optical disk and approximately 17 m/s in the outermost circumference of the optical disk. Hence, the recording channel clock frequency is 52 MHz in the innermost circumference of the optical disk and 128 MHz in the outermost circumference of the optical disk.

It will be noted that the following problems arise when a recording which requires a change of the recording linear velocity as large as approximately 2.4 times is performed by the recording pulse signal and the same recording power for the entire recording surface (region or area) of the optical disk. In other words, as the recording linear velocity becomes higher, the pre-heating by the top heating portion becomes insufficient. As a result, the modulation factor of the RF signal may fluctuate and an increased dispersion of the asymmetry of the RF signal may occur as the recording linear velocity becomes higher (as the position moves towards the outer circumference of the optical disk). Further, the ratio ε (ε=Ptop/Prear) of the recording power of the top and tail heating portions to that of the intermediate heating portion may deviate from the optimal value, to thereby make the recording mark width uneven and deteriorate the jitter characteristic.

The sixth embodiment of the present invention is designed to achieve a jitter-reduced recording in which uniform signal characteristics are obtained in the entire recording surface (region or area) from the innermost circumference and the outmost circumference of the optical disk.

Figure 34:
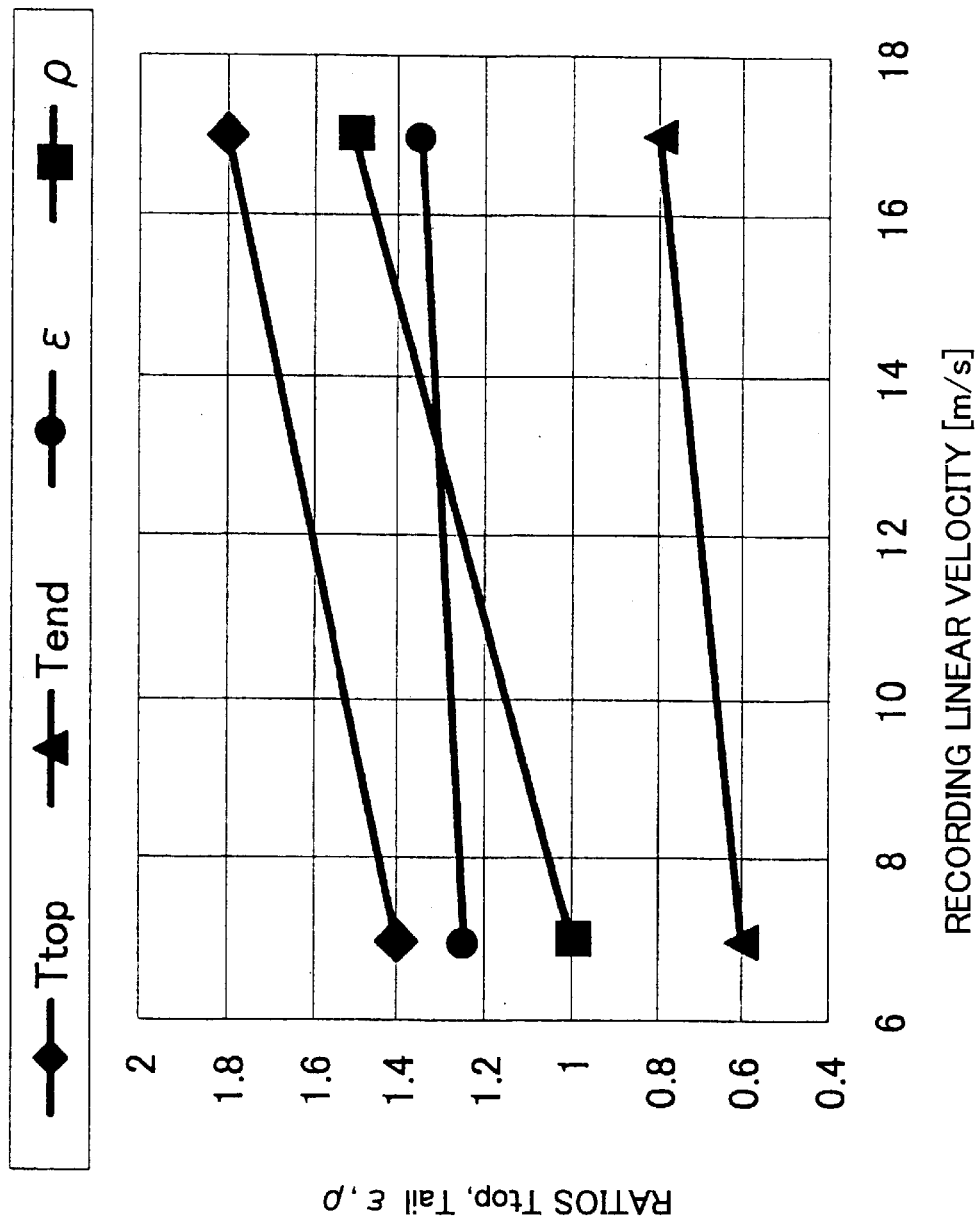
FIG. 34 is a graph showing the relationship between parameters Ttop, Tend, ρ and ε and the recording linear velocity involved in the sixth embodiment of the present invention.

In the CAV-based-recording of the sixth embodiment, the minimum recording linear velocity in the innermost circumference position is 2 times the reference velocity of the DVD, and the maximum recording linear velocity in the outermost circumference position is 4.9 times the reference velocity of the DVD. First, as shown in FIG. 34, at the minimum recording linear velocity at the innermost circumference position of the optical disk, the ratio Ttop is set to 1.4 T, the ratio Trear is set to 1.0 T+(n−3)T, and the ratio Ttail is set to 1.4 T with respect to the mark data length n, while the recording power Ptop is set to 12.5 mW and the recording power Prear is set to 10.0 mW. FIG. 34 is a graph showing the relationship between parameters Ttop, Tend, ρ and ε and the recording linear velocity involved in the sixth embodiment of the present invention The setting values of the parameters mentioned above are typical numerical values for the dye-based optical disks, and a variety of tuning and different recording materials have respective, and different optimal values. Further, by increasing both the ratio Ttop and the ratio ε (=Ptop/Prear) depending on the increase of the recording linear velocity as shown in FIG. 34, it is possible to carry out the recording at an optimal recording power which applies an optical amount of heat to the front and tail portions of the mark width, and to maintain a satisfactory jitter characteristic.

Figure 35:
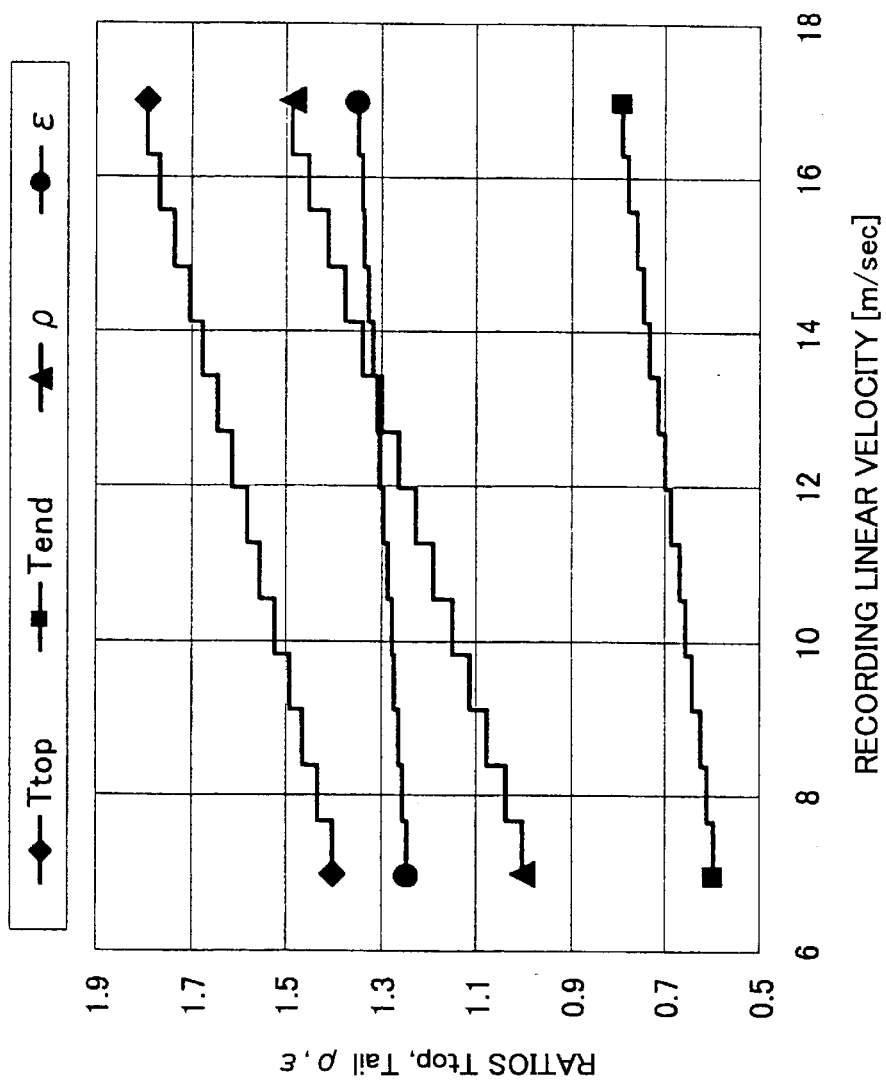
FIG. 35 is a graph showing an updating of the parameters Ttop, Tend, ρ and ε in the sixth embodiment of the present invention.

Accordingly, in the CAV-based-recording in which the recording linear velocity depends on the radial position on the optical disk, the setting values of the above described parameters can be updated as follows to achieve a satisfactory recording. For example, as shown in FIGS. 34 and 35, the ratio Ttop of the width of the top heating portion to the recording channel clock period T is changed from 1.4 T (approximately equal to 26.74 ns) in the innermost circumference position to 1.8 T (approximately equal to 14.1 ns) in the outermost circumference position of the optical disk. FIG. 35 is a graph showing an updating of the parameters Ttop, Tend, ρ and ε in the sixth embodiment of the present invention. In this case, the setting value of the ratio Ttop is updated and the pulse width of the front heating portion to the recording channel clock period T is lengthened by 0.4 T in total.

On the other hand, the ratio Ttail of the width of the tail heating portion to the recording channel clock period T is changed from 0.6 T (approximately equal to 11.5 ns) in the innermost circumference position to 0.8 T (approximately equal to 7.0 ns) in the outermost circumference position of the optical disk. In this case, the setting value of the ratio Ttail is updated and the pulse width of the tail heating portion to the recording channel clock period T is lengthened by 0.2 T in total.

The front edge (same as the rear edge of the top heating portion) of the intermediate heating portion and the rear edge (same as the front edge of the tail heating portion) of the intermediate heating portion are set to be always synchronized to the recording channel clock.

Depending on the kind of dye material used in the optical disk, the setting value of the ratio Ttail may be fixed to 0.6 T regardless of the recording linear velocity, so that the ratio Ttail is approximately 11.5 ns at the innermost circumference position and is approximately 4.7 ns at the outermost circumference position of the optical disk.

The recording power is changed so that the ratio ρ (ρ=Ptop/Prearmin) of the recording power in the arbitrary radial position (recording linear velocity) to the optimal recording power Prearmin at the minimum circumference position (that is, the minimum recording linear velocity), changes from 1 to 1.5 and thus increases by 0.5, depending on the increase in the recording linear velocity. In addition, the ratio ε (ε=Ptop/Prear) of the recording power of the top and tail heating portions to that of the intermediate heating portion changes from 1.25 at the minimum recording linear velocity in the innermost circumference position to 1.35 the maximum recording linear velocity in the outermost circumference position of the optical disk, and thus increases by 0.10, depending on the increase in the recording linear velocity. When the recording pulse signals at the innermost circumference position and the outermost circumference position of the optical disk which are set in the above described manner are relatively compared by matching the time bases, the EFM data shown in FIG. 32 is obtained. FIG. 32 shows a case where the EFM data includes 7 T mark data.

As described above, the setting values of the front edge position of the front heating portion and the recording power Ptop thereof, the rear edge position of the tail heating portion and the recording power Ptop thereof (which is the same as the recording power of the top heating portion), and the recording power Prear of the intermediate heating portion are updated depending on the recording linear velocity, so as to change the ratios Ttop, Ttail and E . More generally, as may be seen from vectors A and B indicated by arrows in FIG. 32, this means that at least the pulse widths of the top and tail heating portions and the recording power thereof are changed depending on the recording linear velocity, so as to update the shape of the pulse waveform. Moreover, as may be seen from the vectors A and B, the rate of changing the pulse width and the rate of changing the recording power (ratio ε) are different.

Of course, instead of changing the front edge position of the top heating portion of the recording pulse signal, it is possible to change the rear edge position of the front heating portion or change the front edge position of the tail heating portion, so as to change the pulse width of the front and tail heating portions. But it is possible to facilitate the control and to simplify the process, by fixing the rear edge position of the top heating portion and the front edge position of the tail heating position and changing the front edge position of the front heating portion and the rear edge position of the tail heating portion as done in this sixth embodiment.

More particularly, the setting values of the recording power may be determined as follows. That is, in a case where the optimal values of the recording power Ptopmin of the front heating portion and the recording power Prearmin of the intermediate heating portion are respectively calculated as 12.5 mW and 10.0 mW by the test write (OPC) at the minimum recording linear velocity in the innermost circumference position of the optical disk, the recording power Ptopmax of the top and tail heating portions at the outermost circumference position changes to 20.3 mW and the recording power Prearmax of the intermediate heating portion changes to 15.0 mW depending on the ratios ρ and ε.

Therefore, by setting the recording power in this manner, it is possible to easily set the optimal value of the recording power from the innermost circumference position of the optical disk while updating the ratios ρ and ε, for the entire recording surface of the optical disk, regardless of the kind of optical disk, to enable a uniformly jitter-reduced recording.

It will be noted that the above-mentioned values set in the parameters can be typically applied to optical disks that are different in terms of the dye material and tuning of the groove formation for tracking servo. Information can be recorded on a dye-based optical disk by forming a mark thereon due to a mechanism in which a laser beam is projected onto the optical disk so that a thermal decomposition and a resultant substrate deformation occur, thereby changing the optical characteristics. This mechanism of forming the mark is called the heat mode. The sixth embodiment of the present invention can suitably be applied to the heat mode recording. Typical examples of organic dyes are a polymethylene dye, cyanine-based, naphthalocyanine-based, phthalocyanine-based, squarylium-based, pyrylium-based, naphthoquinone-based, anthraquinone-based (indanthrene), xanthene-based, triphenylmethane-based, azulene-based, phenanthrene-based, and triphenothiazin-based coloring matters, and azoic color, which is a metal complex compound. The above dyes may be mixed or stacked with another organic dye, a metal or a metal compound in order to improve the optical characteristics, recording sensitivity and/or signal characteristics. Examples of metals and metal compounds used for the above purpose are In, Te, Bi, Se, Sb, Ge, Sn, Al, Be, $TeO_2$, SnO, As and Cd. The recording layer of the optical disk may be formed by evaporation, sputtering, CVD or solvent coating. When the solvent coating is used, materials including the above-mentioned dyes are solved in an organic solvent, which is coated on the underlying layer by spray, roller coating, dipping or spin coating.

It is to be noted that that the optical disks made of different dyes have respective, optimal setting values of the parameters. However, in the case of the CAV-based-control recording, the setting of the values of the pulse widths of the top, intermediate and tail heating portions of the recording pulse signal and the recording powers thereof (setting values of the ratios Ptop, Prear, ρ and ε) can be optimized with respect to the recording linear velocity Lv in the same manner.

The setting values of the recording pulse signal described above are for the optical disk using the general azo-based dye. With respect to other typical optical disks, the present inventor confirmed that the increasing values of the ratios Ttop, Ttail, and ε in the outermost circumference position with respect to the innermost circumference position respectively fall within the ranges of 0.3 T to 0.5 T, 0.1 T to 0.3 T, and 0.05 to 0.15. The present inventor found that, when the setting values fall within the above described ranges, the information can be satisfactorily recorded on the various kinds of optical disks having different recording sensitivities (powers).

With respect to the front edge position of the top heating portion of the recording pulse signal for forming the mark when the space length immediately before the recording mark has a minimum length 3 T, the present inventor confirmed that the information can be satisfactorily recorded on the various kinds of optical disks having different effects of thermal interference between the adjacent marks, by making a correction within the same range with respect to the change in the recording linear velocity, so that the pulse width of the front heating portion becomes shorter than that for other space lengths of 4 T or greater. The present inventor also confirmed that the desirable range of the amount of correction for the front edge position of the top heating portion of the recording pulse signal is −0.05 T to −0.15 T.

A more detailed description will be given of the setting values of the parameters according to the sixth embodiment of the present invention.

It is generally known that, when recording information on dye-based optical disks at different recording linear velocities, the recording power is approximately proportional to a square root of the recording linear velocity (see, for example, Japanese Laid-Open Patent Application No.10-106008 mentioned before). That is, the equation Pw=Klv √Lv stands, where Pw is the recording power, Lv is the recording linear velocity, and Klv is a constant. In contrast, as has been described previously, when all of the setting values including the ratios Ttop, Ttail and ε are optimized with respect to the recording linear velocity Lv as in the sixth embodiment of the present invention, the recording power obtained by a linear approximation using an equation ρ=Klv×Lv+Kpw, to which the optimal recording powers respectively at the minimum and maximum recording linear velocities are applied, has an adequate value with respect to the recording linear velocity Lv for the entire recording surface of the optical disk, where Kpw denotes a constant.

Also, the use of similar linear approximations makes it possible to optimize the values of the ratios Ttop, Ttail and ε with respect to the recording linear velocity Lv for the entire recording surface of the optical disk. Examples of the linear approximation equations are as follows:

$$Ttop = 0.042 \times Lv + 1.11$$

$$Ttail = 0.021 \times Lv + 0.45$$

$$Prear = Prearmin \times \rho$$

$$= Prearmin \times (0.052 \times Lv + 0.64)$$

$$\varepsilon = 0.011 \times Lv + 1.17$$

In addition to using a function of the recording linear velocity, it is possible to use a function of the radial position on the optical disk to update the setting values of the recording pulse signal. By updating the setting values in the above described manner, it is possible to obtain the optimal values of the setting values with respect to an arbitrary recording linear velocity by a simple calculation.

Of the four parameters, namely, the ratios Ttop, Ttail, ρ and ε, it is possible to obtain the effects of the present invention by updating the setting value of at least one of the four parameters. However, since the four parameters mutually affect the change in characteristic of the RF signal, it is desirable to update the setting values of all of the four parameters.

Figure 36:
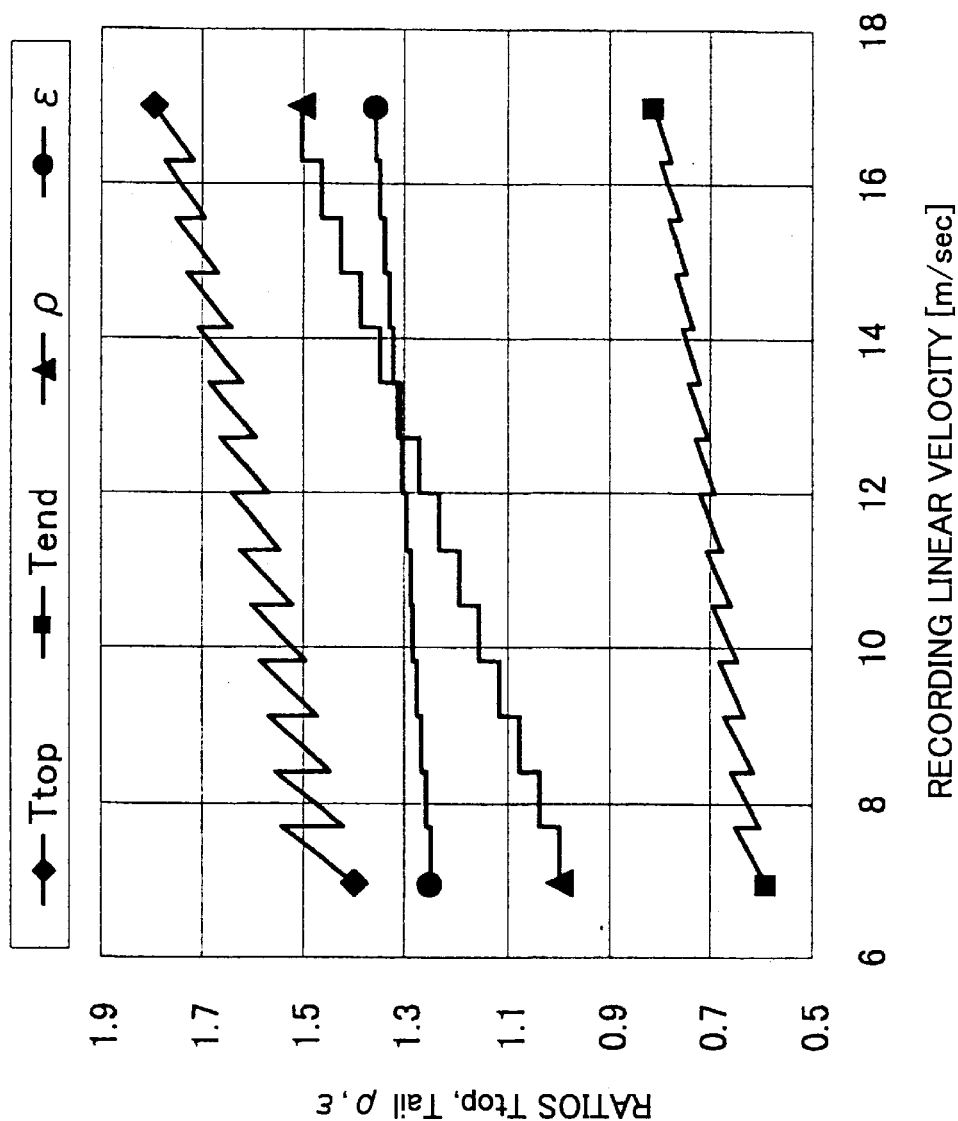
FIG. 36 is a graph showing another updating of the parameters Ttop, Tend, ρ and ε in the sixth embodiment of the present invention.

The intervals at which the setting values are updated, should be determined by taking into consideration the asymmetry difference described above. In the sixth embodiment, the parameters Ttop, Tend, ρ and ε are updated in steps at intervals of approximately 0.7 m/s of the recording linear velocity, as shown in FIGS. 35 and 36. FIG. 36 is a graph showing another updating of the parameters Ttop, Tend, ρ and ε in the sixth embodiment of the present invention. Although the updating intervals have a relatively large width, it is possible to sufficiently suppress the asymmetry difference. However, since the jitter characteristic deteriorates when the setting values deviate, it is desirable to frequently update the parameters at shorter intervals. Further, in addition to updating the recording linear velocity at constant intervals, it is possible to update the parameters in steps of a minimum resolution of a pulse edge signal generator such as a multi-stage delay element.

Generally, the optical disks such as the CDs and DVDs have a groove for obtaining a tracking error signal (push-pull signal). A wobble signal retrieved by movement of a scan beam on the groove in a zigzag direction is superimposed. At each of the recording linear velocities, the wobble signal is detected by a programmable BPF (Band-Pass Filter). Information encoded by a frequency modulation or a phase modulation is decoded by using the wobble signal. Thus, address information and disk information peculiar to each individual optical disk can be read from a virgin (unrecorded) optical disk. Alternatively, the information mentioned above can also be reproduced from pits intermittently arranged in a land section of the optical disk.

The sixth embodiment of the present invention may utilize the superimposed or preformatted information in order to record recommended values for the setting values of the parameters Ttop, Tend, $\rho$ and $\epsilon$. More particularly, the recommended values for the setting values of the parameters Ttop, Tend, $\rho$ and $\epsilon$ for a plurality of recording linear velocities including the minimum linear velocity (in the innermost circumference position), the maximum linear velocity (in the outermost circumference position), and an intermediate linear velocity (in an intermediate circumference position) may be superimposed or preformatted on the optical disk. After obtaining the optimum setting values at each circumference position on the optical disk by reading the recommended values from the optical disk or newly setting the setting values on the information recording apparatus, it is possible to calculate the amount of change or the slope (that is, variations) of the setting values, obtained by linear approximation, with respect to the linear recording velocity.

The amount of change or the slope of the setting values may be calculated depending on the characteristics of the optical disk, with a high accuracy using linear approximation, polynomial approximation equations or the like. Then, appropriate updating intervals for the setting values are calculated from the range of the recording linear velocity for the CAV-based-control recording. In the sixth embodiment, the updating intervals are approximately 0.7 m/s as in the embodiments described above.

The amount of change or the slope of the setting values is obtained with respect to the recording linear velocity, and must actually be recognized from the address information which is obtained by demodulating the wobble signal or the PLL signal described above. Specific addresses are allocated from the innermost circumference position to the outermost circumference position on the optical disk, in correspondence with the recording linear velocities.

An even more accurate setting may be made with respect to the recording powers Ptop and Prear, by obtaining optimal values from test write operations (OPC) carried out at least at two kinds of recording linear velocities respectively corresponding to the innermost circumference position and the outermost circumference position on the optical disk or by correcting the recording power information obtained from the wobble signal.

In the information recording apparatus according to the sixth embodiment, the multi-stage delay element 17 of the recording pulse train controller 14 has a part with a delay of approximately 0.2 ns and includes gate elements which function as an edge signal generator for generating a large number of edge signals corresponding to the front edges of the top heating portion of the recording pulse signal generated from the recording pulse train generator 15. The edge signals are input to the edge selector 16 which has a multiplexer configuration. The system controller 12 selects the edge pulse to be selected by the edge selector 16, so that the generated recording pulse signal has the top heating portion with variable front edge positions.

Similarly, the multi-stage delay element 17 of the recording pulse train controller 14 has a part with a delay of approximately 0.2 ns and includes gate elements which function as an edge signal generator for generating a large number of edge signals corresponding to the rear edges of the tail heating portion of the recording pulse signal generated from the recording pulse train generator 15. The edge signals are input to the edge selector 16 which has the multiplexer configuration. The system controller 12 selects the edge pulse to be selected by the edge selector 16, so that the generated recording pulse signal has the tail heating portion with variable rear edge positions.

Accordingly, the information recording apparatus operates so that the setting values are determined as described above, the optimum edge positions (pulses) are selected for the desired recording linear velocity, and the desired recording pulse signal is generated. When the recording pulse signal which is generated in this manner is updated at predetermined intervals, the setting values undergo a step-shaped change as shown in FIG. 35. Hence, when the multi-stage delay element 17 is used, each pulse width assumes a fixed value during the updating and the ratios of the pulse widths and the duty ratios change depending on the change in the recording channel clock frequency.

The recording pulse train controller 14 which uses the multi-stage delay element 17 may be replaced by a recording pulse train controller employing a PLL configuration including a phase comparator, a loop filter, a voltage controller oscillator (VCO) and a frequency divider. In this case, a high-resolution clock having 20 times the frequency of the recording channel clock used in the recording pulse train controller 14 is generated by the PLL structure, so that the edge signals have a resolution of approximately 0.05 T. The edge signals are input to the edge selector 16 which has the multiplexer configuration. The system controller 12 selects the edge pulse to be selected by the edge selector 16, so that the generated recording pulse signal has the top heating portion with variable front edge positions. By carrying out a similar processing with respect to the rear edge position of the tail heating portion, the system controller 12 similarly selects the edge pulse to be selected by the edge selector 16, so that the generated recording pulse signal has the tail heating portion with variable rear edge positions.

Accordingly, in this latter case, the information recording apparatus operates so that the setting values are determined as described above, the optimum edge positions (pulses) are selected for the desired recording linear velocity, and the desired recording pulse signal is generated. When the recording pulse signal which is generated in this manner is updated at predetermined intervals, the setting values undergo a sawtooth-shaped change as shown in FIG. 36. Hence, when the PLL configuration is used, each of the ratios Ttop and Ttail assumes a fixed value during the updating even with respect to a change in the recording channel clock frequency.

Therefore, according to the information recording apparatus of the sixth embodiment, it is possible to realize a uniform recording during the CAV-based-control recording, and various circuit configurations may be used for the recording pulse train generating section which generates the recording pulse signal.

In addition, the CAV-based-control recording which updates the setting values of the parameters Ttop, Ttail, $\rho$ and $\epsilon$ can be realized by a relatively simple and small-scale circuit.

Although the sixth embodiment is described on the precondition that the CAV-based-control recording is carried out, it is also possible to apply this embodiment to the CLV-based-control recording which carries out the recording on the entire recording surface of the optical disk at the recording linear velocity which is fixed within the ranges of the recording linear velocity shown in FIGS. 34 through 36. In this case, it is possible to carry out the recording in a wide range of multi-speeds (X-times speeds), using the settings for the recording pulse widths and recording powers of this embodiment, thereby easily realizing an information recording apparatus which can cope with multi-speed recording.

In other words, the first through fifth embodiments update the pulse setting values at predetermined intervals depending on the radial position on the optical disk to carry out the CAV-based-control recording, but the sixth embodiment updates the setting values of the parameters Ttop, Ttail, $\rho$ and $\epsilon$ even when the recording linear velocity changes due to X-times speed recording performed in the information recording apparatus having the multi-speed function.

What is claimed is:

1. An information recording method for recording information on an optical disk by a recording pulse signal of an optical beam that is emitted from an optical source, comprising:

changing a recording channel clock period T depending on a change of a recording linear velocity so that a recording linear density is maintained approximately constant; and updating a shape of a pulse waveform of a top heating portion of the recording pulse signal which includes a rear heating portion, at predetermined intervals depending on a desired recording linear velocity, so that a width of the top heating portion and a recording power thereof are changed.

2. The information recording method as claimed in claim 1, further comprising:

obtaining an amount of change or a slope of setting values of the recording pulse signal which is updated at the predetermined intervals, based on optimal values of the setting values of the recording pulse signal preformatted on the optical disk for each of a plurality of recording linear velocities.

3. The information recording method as claimed in claim 1, further comprising:

obtaining an amount of change or a slope of setting values of the recording pulse signal which is updated at the predetermined intervals, based on optimal values of the setting values of the recording pulse signal included in disk information which is prerecorded in a predetermined area of the optical disk for each of a plurality of recording linear velocities.

4. The information recording method as claimed in claim 1, further comprising:

obtaining an amount of change or a slope of setting values of the recording pulse signal which is updated at the predetermined intervals, based on optimal values of the setting values of the recording pulse signal registered in an information recording apparatus for each of a plurality of recording linear velocities.

5. The information recording method as claimed in claim 1, further comprising:

detecting address information preformatted on the optical disk;

obtaining setting values of the recording pulse signal corresponding to the address information based on an amount of change or a slope of the recording pulse signal which is updated at the predetermined intervals; and obtaining the setting values of the recording pulse signal depending on the address signal, by making the predetermined intervals and a range of the address information correspond to each other.

6. An information recording method for recording information on an optical disk by a recording pulse signal of an optical beam that is emitted from an optical source, comprising:

changing a recording channel clock period T depending on a change of a recording linear velocity so that a recording linear density is maintained approximately constant; and updating setting values of a front edge position of a top heating portion of the recording pulse signal, a recording power of the top heating portion and a recording power of a rear heating portion of the recording pulse signal at predetermined intervals depending on a desired recording linear velocity, so that both Ttop and $\epsilon$ change, where Ttop denotes a ratio of a width of the top heating pulse to the recording channel clock period T, $\epsilon$ denotes a ratio Ptop/Prear, Ptop denotes a recording power of the top heating portion, and Prear denotes a recording power of the rear heating portion.

7. The information recording method as claimed in claim 6, further comprising:

obtaining an amount of change or a slope of setting values of the recording pulse signal which is updated at the predetermined intervals, based on optimal values of the setting values of the recording pulse signal preformatted on the optical disk for each of a plurality of recording linear velocities.

8. The information recording method as claimed in claim 6, further comprising:

obtaining an amount of change or a slope of setting values of the recording pulse signal which is updated at the predetermined intervals, based on optimal values of the setting values of the recording pulse signal included in disk information which is prerecorded in a predetermined area of the optical disk for each of a plurality of recording linear velocities.

9. The information recording method as claimed in claim 6, further comprising:

obtaining an amount of change or a slope of setting values of the recording pulse signal which is updated at the predetermined intervals, based on optimal values of the setting values of the recording pulse signal registered in an information recording apparatus for each of a plurality of recording linear velocities.

10. The information recording method as claimed in claim 6, further comprising:

detecting address information preformatted on the optical disk;

obtaining setting values of the recording pulse signal corresponding to the address information based on an amount of change or a slope of the recording pulse signal which is updated at the predetermined intervals; and obtaining the setting values of the recording pulse signal depending on the address signal, by making the predetermined intervals and a range of the address information correspond to each other.

11. An information recording method for recording information on an optical disk by a recording pulse signal of an optical beam that is emitted from an optical source, comprising:

changing a recording channel clock period T depending on a change of a recording linear velocity so that a recording linear density is maintained approximately constant; and updating setting values of a pulse width and a recording power of a top heating portion of the recording pulse signal and a pulse width and a recording power of a tail heating portion of the recording pulse signal at predetermined intervals, so that a front edge position of the top heating portion, a rear edge position of the tail heating portion and the recording powers of the top and tail heating portions change at approximately constant rates depending on a desired recording linear velocity.

12. The information recording method as claimed in claim 11, further comprising:

obtaining an amount of change or a slope of setting values of the recording pulse signal which is updated at the predetermined intervals, based on optimal values of the setting values of the recording pulse signal preformatted on the optical disk for each of a plurality of recording linear velocities.

13. The information recording method as claimed in claim 11, further comprising:

obtaining an amount of change or a slope of setting values of the recording pulse signal which is updated at the predetermined intervals, based on optimal values of the setting values of the recording pulse signal included in disk information which is prerecorded in a predetermined area of the optical disk for each of a plurality of recording linear velocities.

14. The information recording method as claimed in claim 11, further comprising:

obtaining an amount of change or a slope of setting values of the recording pulse signal which is updated at the predetermined intervals, based on optimal values of the setting values of the recording pulse signal registered in an information recording apparatus for each of a plurality of recording linear velocities.

15. The information recording method as claimed in claim 11, further comprising:

detecting address information preformatted on the optical disk;

obtaining setting values of the recording pulse signal corresponding to the address information based on an amount of change or a slope of the recording pulse signal which is updated at the predetermined intervals; and obtaining the setting values of the recording pulse signal depending on the address signal, by making the predetermined intervals and a range of the address information correspond to each other.

16. An information recording method for recording information on a recording layer of an optical disk by a recording pulse signal of an optical beam that is emitted from an optical source, comprising:

changing a recording channel clock period T depending on a change of a recording linear velocity so that a recording linear density is maintained approximately constant; and updating setting values of a ratio Ttop of a pulse width of a top heating portion of the recording pulse signal with respect to the recording channel clock period T, a ratio Ttail of a tail heating portion of the recording pulse signal with respect to the recording channel clock period T, and a recording power Pw of the top and tail heating portions so as to increase at predetermined intervals, depending on an increase in the recording linear velocity.

17. The information recording method as claimed in claim 16, further comprising:

obtaining an amount of change or a slope of setting values of the recording pulse signal which is updated at the predetermined intervals, based on optimal values of the setting values of the recording pulse signal preformatted on the optical disk for each of a plurality of recording linear velocities.

18. The information recording method as claimed in claim 16, further comprising:

obtaining an amount of change or a slope of setting values of the recording pulse signal which is updated at the predetermined intervals, based on optimal values of the setting values of the recording pulse signal included in disk information which is prerecorded in a predetermined area of the optical disk for each of a plurality of recording linear velocities.

19. The information recording method as claimed in claim 16, further comprising:

obtaining an amount of change or a slope of setting values of the recording pulse signal which is updated at the predetermined intervals, based on optimal values of the setting values of the recording pulse signal registered in an information recording apparatus for each of a plurality of recording linear velocities.

20. The information recording method as claimed in claim 16, further comprising:

detecting address information preformatted on the optical disk;

obtaining setting values of the recording pulse signal corresponding to the address information based on an amount of change or a slope of the recording pulse signal which is updated at the predetermined intervals; and obtaining the setting values of the recording pulse signal depending on the address signal, by making the predetermined intervals and a range of the address information correspond to each other.

21. An information recording apparatus for recording information on an optical disk by a recording pulse signal of an optical beam that is emitted from an optical source, wherein a recording channel clock period T is changed depending on a change of a recording linear velocity so that a recording linear density is maintained approximately constant, said information recording apparatus comprising:

an optical head having the optical source; and a control part updating a shape of a pulse waveform of a top heating portion of the recording pulse signal which includes a rear heating portion, at predetermined intervals depending on a desired recording linear velocity, so that a width of the top heating portion and a recording power thereof are changed.

22. An information recording apparatus for recording information on an optical disk by a recording pulse signal of an optical beam that is emitted from an optical source, wherein a recording channel clock period T is changed depending on a change of a recording linear velocity so that a recording linear density is maintained approximately constant, said information recording apparatus comprising:

an optical head having the optical source; and a control part updating setting values of a front edge position of a top heating portion of the recording pulse signal, a recording power of the top heating portion and a recording power of a rear heating portion of the recording pulse signal at predetermined intervals depending on a desired recording linear velocity, so that both Ttop and ϵ change, where Ttop denotes a ratio of a width of the top heating pulse to the recording channel clock period T, ϵ denotes a ratio Ptop/Prear, Ptop denotes a recording power of the top heating portion, and Prear denotes a recording power of the rear heating portion.

23. An information recording apparatus for recording information on an optical disk by a recording pulse signal of an optical beam that is emitted from an optical source, wherein a recording channel clock period T is changed depending on a change of a recording linear velocity so that a recording linear density is maintained approximately constant, said information recording apparatus comprising:

an optical head having the optical source; and a control part updating setting values of a pulse width and a recording power of a top heating portion of the recording pulse signal and a pulse width and a recording power of a rear heating portion of the recording pulse signal at predetermined intervals, so that a front edge position of the top heating portion, a rear edge position of the rear heating portion and the recording powers of the top and rear heating portions change at approximately constant rates depending on a desired recording linear velocity.

24. An information recording apparatus for recording information on a recording layer of an optical disk by a recording pulse signal of an optical beam that is emitted from an optical source, wherein a recording channel clock period T is changed depending on a change of a recording linear velocity so that a recording linear density is maintained approximately constant, said information recording apparatus comprising:

an optical head having the optical source; and a control part updating setting values of a ratio Ttop of a pulse width of a top heating portion of the recording pulse signal with respect to the recording channel clock period T, a ratio Ttail of a rear heating portion of the recording pulse signal with respect to the recording channel clock period T, and a recording power Pw of the top and rear heating portions so as to increase at predetermined intervals, depending on an increase in the recording linear velocity.

* * * * *